(12) United States Patent
Hoshino et al.

(10) Patent No.: US 8,174,727 B2
(45) Date of Patent: May 8, 2012

(54) IMAGE FORMING APPARATUS THAT DISPLAYS FINISHED GRAPHICAL IMAGE INDICATING MULTIPLE DRAFT IMAGES ARRANGED IN MATRIX FORM

(75) Inventors: Naoki Hoshino, Ageo (JP); Yuko Kimoto, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1245 days.

(21) Appl. No.: 11/373,013

(22) Filed: Mar. 9, 2006

(65) Prior Publication Data

US 2007/0211263 A1   Sep. 13, 2007

(51) Int. Cl.
*G06F 15/00* (2006.01)
*G06K 1/00* (2006.01)
*G03G 15/00* (2006.01)

(52) U.S. Cl. ............................ 358/1.9; 358/1.18; 399/81
(58) Field of Classification Search .................. None
See application file for complete search history.

(56) References Cited

U.S. PATENT DOCUMENTS

| | | | |
|---|---|---|---|
| 6,285,842 B1 * | 9/2001 | Katamoto et al. ............... | 399/81 |
| 6,748,185 B2 * | 6/2004 | Song ................................ | 399/81 |
| 2002/0071689 A1 * | 6/2002 | Miyamoto ....................... | 399/53 |
| 2002/0080405 A1 * | 6/2002 | Kuroda .......................... | 358/1.18 |
| 2006/0123341 A1 * | 6/2006 | Smirnov ......................... | 715/708 |

OTHER PUBLICATIONS

Hoshino, Naoki, Pending U.S. Appl. No. 11/373,645, filed Mar. 9, 2006.
Kimoto, Yuko, Pending U.S. Appl. No. 11/373,000, filed Mar. 9, 2006.
Hoshino, Naoki, Pending U.S. Appl. No. 11/373,403, filed Mar. 9, 2006.
Hoshino, Naoki, Pending U.S. Appl. No. 11/373,011, filed Mar. 9, 2006.
Kimoto, Yuko, Pending U.S. Appl. No. 11/373,799, filed Mar. 9, 2006.
Hoshino, Naoki, Pending U.S. Appl. No. 11/373,395, filed Mar. 9, 2006.
Kimoto Yuko, Pending U.S. Appl. No. 11/373,012, filed Mar. 9, 2006.

* cited by examiner

*Primary Examiner* — King Poon
*Assistant Examiner* — Ming Hon
(74) *Attorney, Agent, or Firm* — Patterson & Sheridan, LLP

(57) ABSTRACT

A first display area and a second display area are disposed in each setting screen concerning setting of photocopy processing, a draft graphical image and a finished graphical image are set in which present set contents are reflected every time the set contents are changed in response to user's operation, the set draft graphical image is displayed in the first display area, and the set finished graphical image is displayed in the second display area.

21 Claims, 24 Drawing Sheets

US 8,174,727 B2

IMAGE FORMING APPARATUS THAT DISPLAYS FINISHED GRAPHICAL IMAGE INDICATING MULTIPLE DRAFT IMAGES ARRANGED IN MATRIX FORM

BACKGROUND OF THE INVENTION

1. Field of the Invention

The present invention relates to an operation device for a user to set photocopy processing, and an image forming apparatus which performs photocopy processing based on user's designated setting of the photocopy processing.

2. Description of the Related Art

Heretofore, an image forming apparatus such as a photocopier is provided with an operation panel to perform various settings. However, in the conventional operation panel, an operation for setting predetermined photocopy processing is complicated or is not easy to understand. Therefore, in the image forming apparatus provided with the operation panel, it is difficult to set the desired photocopy processing, and a result of the photocopy processing becomes different from that intended by a user in many cases.

BRIEF SUMMARY OF THE INVENTION

In an aspect of the present invention, an object is to provide an operation device and an image forming apparatus in which operability in setting photocopy processing has been improved.

An image forming apparatus of one aspect of the present invention has: a scanner which reads an image of a draft; a printer which prints the image on an image forming medium; a display unit which displays a setting screen of photocopy processing to print, on the image forming medium by the printer, the draft image read by the scanner; an operation unit which inputs setting information on the photocopy processing in a state in which the setting screen of the photocopy processing is displayed by the display unit; a photocopy setting unit which sets the photocopy processing in accordance with contents input by the operation unit; a draft graphical image setting unit which sets a draft graphical image indicating set contents concerning the draft in the set contents every time the set contents of the photocopy processing are changed by the photocopy setting unit; a finished graphical image setting unit which sets a finished graphical image indicating set contents concerning the image forming medium in the set contents every time the set contents of the photocopy processing are changed by the photocopy setting unit; and a display control unit which displays, in the setting screen of the photocopy processing, the draft graphical image set by the draft graphical image setting unit and the finished graphical image set by the finished graphical image setting unit.

In another aspect of the present invention, a method of setting an image forming apparatus is a method of setting an image forming apparatus having: a scanner which reads an image of a draft; a printer which prints the image on an image forming medium; a display unit which displays a setting screen of photocopy processing; and an operation unit which inputs setting information on the photocopy processing, the method comprising: setting the photocopy processing in accordance with contents input by the operation unit; setting a draft graphical image indicating set contents concerning the draft in the set contents every time the set contents of the photocopy processing are changed; setting a finished graphical image indicating set contents concerning the image forming medium in the set contents every time the set contents of the photocopy processing are changed; and displaying the draft graphical image and the finished graphical image in the setting screen of the photocopy processing displayed in the display unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described hereinafter with reference to the drawings.

Figure 1:
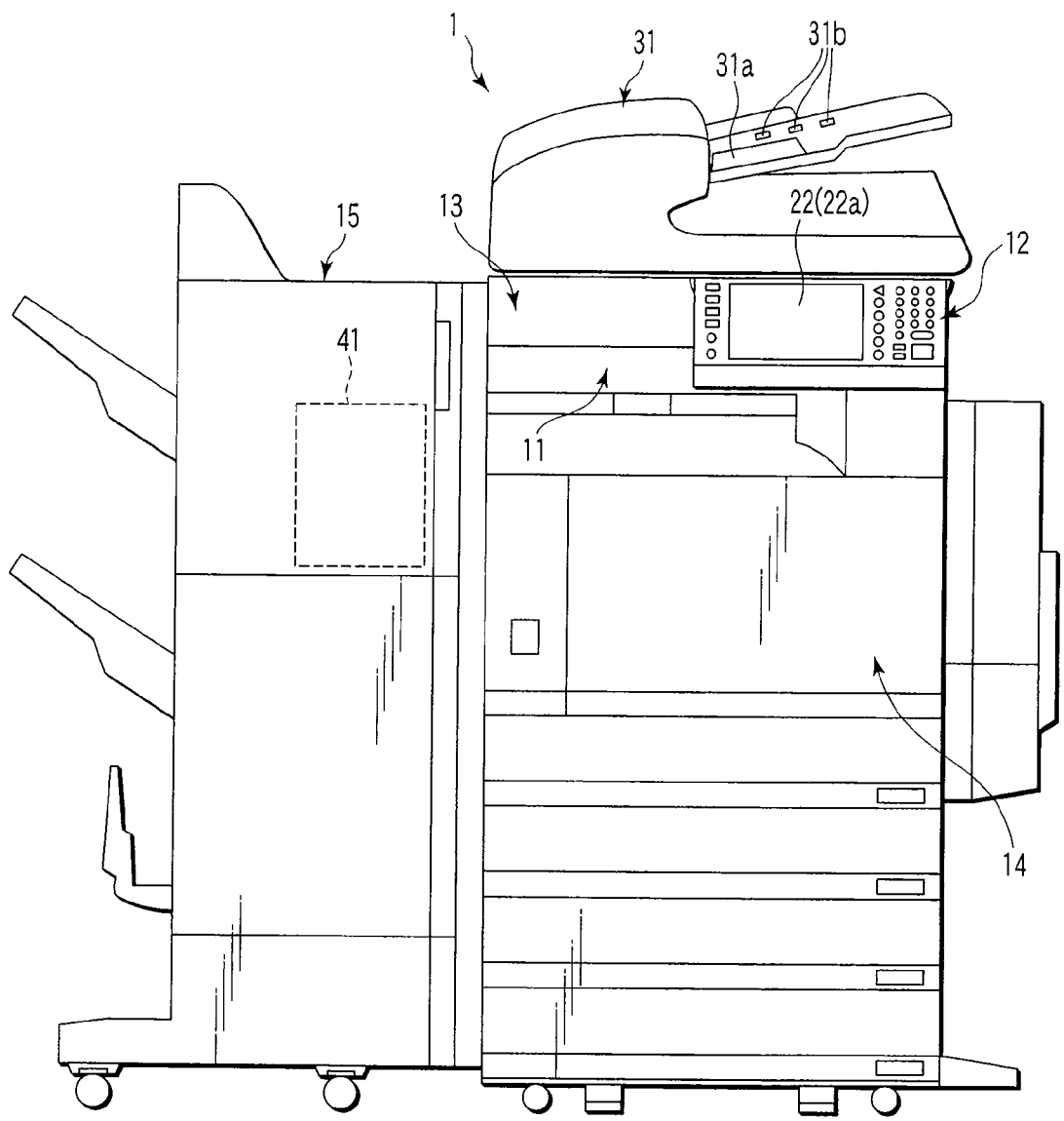
FIG. 1 is a diagram showing an appearance constitution of a digital multifunction peripherals 1 as an image forming apparatus in an embodiment of the present invention.

FIG. 1 is a diagram showing an appearance constitution of a digital multifunction peripherals 1 as an image forming apparatus in the embodiment of the present invention.

As shown in FIG. 1, this digital multifunction peripherals 1 is constituted of a system control unit 11, an operation panel 12, a scanner unit 13, a printer unit 14, a finisher unit 15 and the like.

The system control unit 11 controls the whole digital multifunction peripherals 1. The system control unit 11 is disposed in a main body of the digital multifunction peripherals 1. The system control unit 11 is connected to the operation panel 12, the scanner unit 13, the printer unit 14, the finisher unit 15 and the like. Accordingly, the system control unit 11 performs various controls with respect to the respective units.

The operation panel 12 is disposed on a front surface of the digital multifunction peripherals main body. The operation panel 12 is a user interface. An operation surface of the operation panel 12 is provided with hardware keys 21 as an operating section, a display section 22 in which a touch panel 22a is built and the like.

The scanner unit 13 functions as an image reading unit which reads an image of a draft. The scanner unit 13 is disposed in an upper part of the digital multifunction peripherals main body. The scanner unit 13 main body is constituted of: a scanning section (not shown) which optically scans a draft surface; a photoelectric converting section (not shown) such as a CCD line sensor which converts, into an electric signal, light reflected by the draft surface optically scanned by the scanning section and the like.

Moreover, the scanner unit 13 has an auto document feeder (ADF) 31. The ADF 31 conveys the surface of the draft to be read to an image reading position of the scanner unit 13 main body. That is, the image of the draft conveyed by the ADF 31 is read by the scanner unit 13 main body. The ADF 31 has: a draft table on which the draft is to be set; a conveying mechanism which conveys the drafts set on the draft table one by one; and a draft discharge section to which the draft conveyed by the conveying mechanism is discharged. The draft table of the ADF 31 is provided with a guide section 31a which guides the conveyed drafts and a plurality of sensors 31b for detecting a size of the draft. The guide section 31a and each sensor 31b function as a detector for detecting the size of the draft on the draft table.

The printer unit 14 forms an image on a sheet (photocopy sheet) as an image forming medium. The printer unit 14 is constituted of, for example, a conveying section which conveys the sheet, an image forming section which forms an image on the sheet conveyed by the conveying section and the like.

The finisher unit 15 performs various types of finish processing with respect to the sheet as the image forming medium printed by the printer unit 14. The finisher unit 15 has finishing functions such as: a stapling function of stapling together a plurality of sheets printed by the printer unit 14; a sorting function of sorting the sheets printed by the printer unit 14 based on a set sorting method; and a stacking function of discharging the sheet printed by the printer unit 14 based on a set sheet discharging order or a set sheet discharging method. The finisher unit 15 has finishing functions realized by a control similar to that of the stapling function, such as: a hole punching function of making a hole in a predetermined position in the sheet printed by the printer unit 14; and a saddle stitching function of folding back a plurality of sheets printed by the printer unit 14 along the center line of each sheet to staple together the sheets.

The finisher unit 15 has a stapler 41 or the like as a mechanism for performing the stapling function. For example, the stapler 41 staples together the plurality of sheets sorted by the sorting function. The stapler 41 has a function of stapling together the sheets by multi-positions thereof. Therefore, the stapling function staples together the positions to be stapled, selected by the user, with respect to the plurality of sheets sorted by the sorting function.

Figure 2:
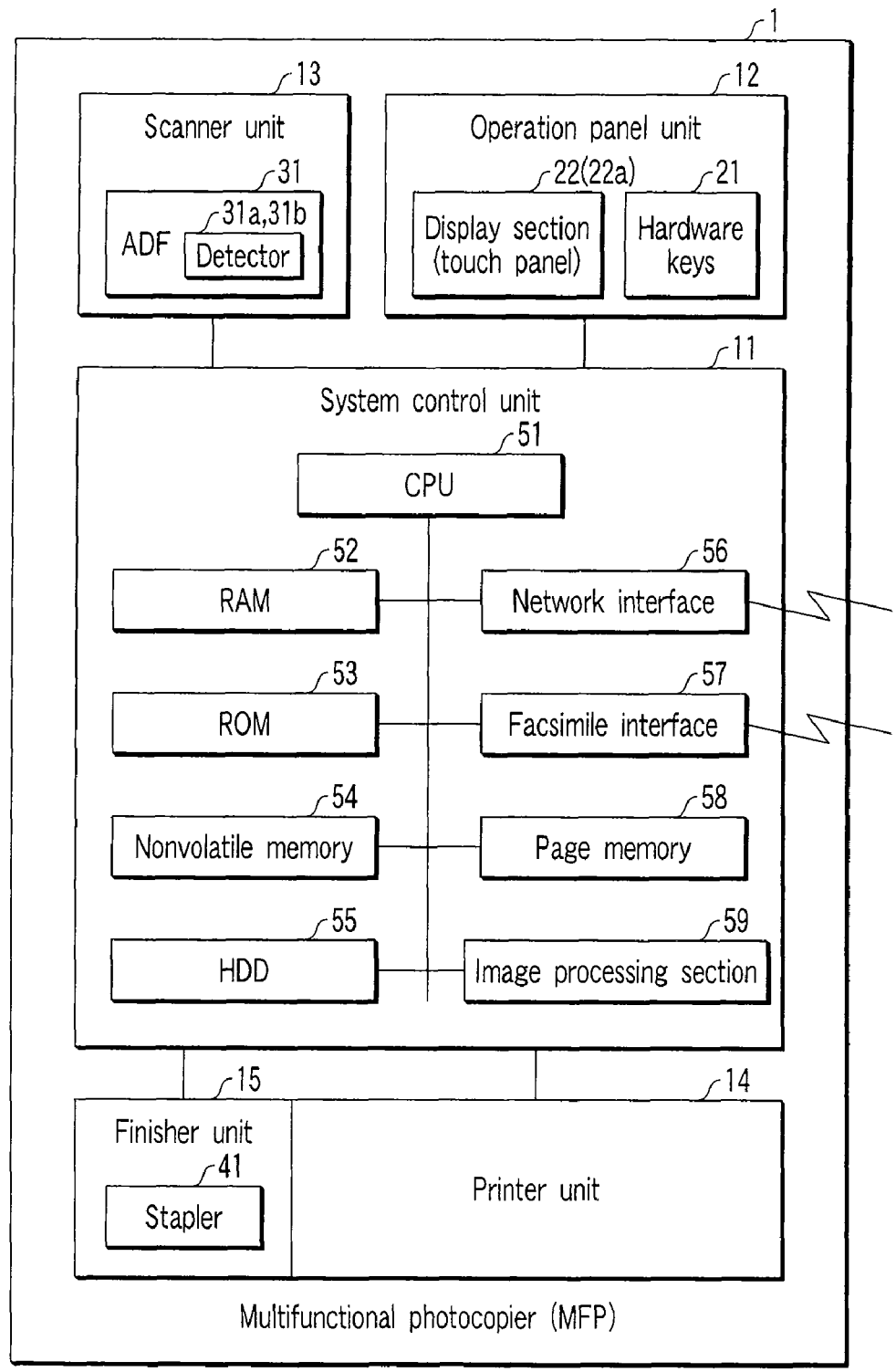
FIG. 2 is a block diagram showing a constitution of a control system of the digital multifunction peripherals 1 as the image forming apparatus in the embodiment of the present invention.

FIG. 2 is a block diagram showing a constitution of a control system of the digital multifunction peripherals 1 as an image forming apparatus in the embodiment of the present invention.

As shown in FIG. 2, in this digital multifunction peripherals 1, the system control unit 11 is connected to the operation panel 12, the scanner unit 13, the printer unit 14, and the finisher unit 15.

The system control unit 11 controls the operation panel 12, the scanner unit 13, the printer unit 14, the finisher unit 15 and the like. The system control unit 11 has various functions of performing various types of processing based on signals supplied from the operation panel 12, the scanner unit 13, the printer unit 14 and the finisher unit 15.

The operation panel 12 has the hardware keys 21, the display section 22 in which the touch panel 22a is built and the like. In the display section 22, there are displayed an operation guidance, keys (icons) selectable by the touch panel 22a and the like under a display control of the system control unit 11. In the operation panel 12, the user operates the hardware keys 21, or inputs the icon selectable by the touch panel 22a. The operation panel 12 supplies, to the system control unit 11, information input by the user (the information indicating the hardware key 21 pressed by the user or the icon selectable by the touch panel 22a touched by the user).

The scanner unit 13 converts the image of the draft into image data under the control of the system control unit 11. The scanner unit 13 converts the draft image into color or monochromatic digital image data. The scanner unit 13 supplies the digital image data as the read draft image to the system control unit 11.

Moreover, the scanner unit 13 has the ADF 31 provided with the detectors 31a, 31b. Detection signals of the detectors 31a, 31b of the ADF 31 are supplied to the system control unit 11. The system control unit 11 realizes an ADF draft size detecting function of detecting a size of the draft set in the ADF 31 based on the detection signals of the detectors 31a, 31b.

The printer unit 14 prints the image on the sheet as the image forming medium under the control of the system control unit 11. A result of the print processing performed by the printer unit 14 and the like are notified to the system control unit 11. The printer unit 14 performs color printing to form a color image on the image forming medium based on the color image data, or monochromatic printing to form a monochromatic image on the image forming medium based on the monochromatic image data. The printer unit 14 is constituted of: for example, the conveying section (not shown) which conveys the image forming medium; the image forming section (not shown) which forms the color image or the monochromatic image on the image forming medium conveyed by the conveying section and the like.

The finisher unit 15 performs various types of processing with respect to the sheet as the image forming medium printed by the printer unit 14 under the control of the system control unit 11. The processing result and the like of the finisher unit 15 are notified to the system control unit 11. The finisher unit 15 executes a finishing function such as the stapling function, the sorting function, or the stacking function based on the control by the system control unit 11.

Moreover, as shown in FIG. 1, the system control unit 11 is constituted of: a central processing unit (CPU) 51; a random access memory (RAM) 52; a read only memory (ROM) 53; a nonvolatile memory 54; a hard disk drive (HDD) 55; a network interface (I/F) 56; a facsimile interface (I/F) 57; a page memory 58; an image processing section 59 and the like.

The CPU 51 controls the whole system control unit 11. The CPU 51 executes a program stored in the ROM 53, the nonvolatile memory 54 or the HDD 55 to thereby perform various types of processing. For example, the CPU 51 executes the control program to thereby realize the ADF draft size detecting function. A display control of the display section 22 of the operation panel 12 is executed by the CPU 51 based on the program and control data stored in the ROM 53, the nonvolatile memory 54, or the HDD 55.

The RAM 52 is a memory which temporarily stores data for working or which stores data to be referred to. The RAM 52 is used as a main memory for executing various types of processing based on various control programs. In the RAM 52, there is held information indicating various set contents during an operation of the digital multifunction peripherals. For example, the information indicating the set contents of the photocopy processing is also held by the RAM 52.

It is to be noted that the set contents of the photocopy processing include set particulars such as a photocopy magnification, the number of sheets to be photocopied and a finishing mode (position to be stapled, etc.) in addition to a draft setting and a sheet setting. The draft setting includes a size of a draft, a draft setting direction, a direction of the image in the draft, the surface of the draft to be read (a draft reading mode is single-sided or double-sided) and the like. The sheet setting includes a size of the sheet, a direction of the sheet, a direction of the image in the sheet, the surface of the sheet to be printed (a sheet printing mode is single-sided or double-sided) and the like.

The ROM 53 is a nonvolatile memory. In the ROM 53, there are stored, for example, a control program, control data and the like for controlling the digital multifunction peripherals 1. In the ROM 53, there may be stored display data and the like to be displayed in the display section 22 of the operation panel 12.

The nonvolatile memory 54 is a rewritable nonvolatile memory. In the nonvolatile memory 54, there is stored data such as system setting information. The nonvolatile memory 54 may store display data and the like to be displayed in the display section 22 of the operation panel 12.

The HDD 55 is a large-capacity storage device. In the HDD 55, there are stored various data such as various setting data, management data, control program and control data. In the HDD 55, there are also stored display data and the like to be displayed in the display section 22 of the operation panel 12. In the HDD 55, there are also stored image data and the like read by the scanner unit 13. Furthermore, the HDD 55 may be used as a backup memory for various memories.

The network interface 56 performs data communication via the network. The network interface 56 is constituted of, for example, a network interface card (NIC) and the like. The digital multifunction peripherals 1 realizes a network printing function of printing, on the sheet, print data from an external device connected to the network interface 56 via the network.

The facsimile interface 57 transmits and receives facsimile data. In the digital multifunction peripherals 1, a facsimile function is realized using the facsimile interface 57. For example, facsimile reception processing is realized by monochromatically printing, by the printer unit 14, the facsimile data received by the facsimile interface 57. Moreover, the facsimile interface 57 realizes facsimile transmission processing by transferring, to a destination, the facsimile data converted from the image data of the draft read by the scanner unit 13.

The page memory 58 is a memory in which the image data to be printed by the printer unit 14 and the like are stored. The page memory 58 is controlled by a page memory controller (not shown). For example, in a case where the printer unit 14 performs the print processing, in the page memory 58 there is developed (stored) the color image data or the monochromatic image data of each page to be printed by the printer unit 14.

The image processing section 59 subjects the image data to various types of image processing. The image processing section 59 is constituted of an image processing circuit and the like. The image processing section 59 performs image processing such as correction, compression, or extension of the image data.

Next, there will be described a constitution of the operation panel 12.

Figure 3:
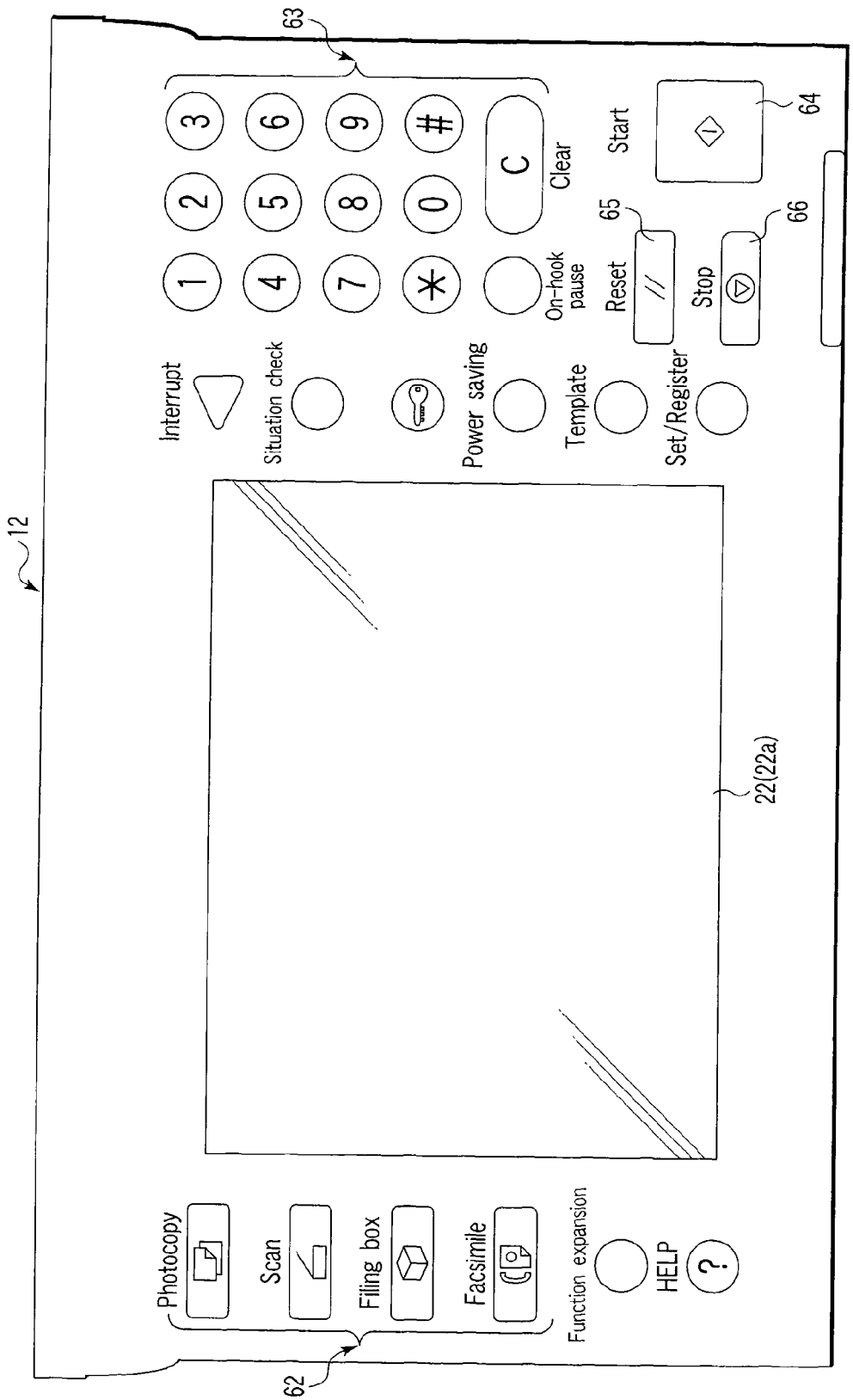
FIG. 3 is an appearance diagram showing a constitution example of an operation panel.

FIG. 3 is an appearance diagram showing a constitution example of the operation panel 12.

As shown in FIG. 3, the operation panel 12 is provided with various hardware keys 21, the display section 22 in which the touch panel 22*a* is built and the like. Examples of the hardware keys 21 include function selecting keys 62, ten keys 63, a start key 64, a reset key 65 and a stop key 66.

The function selecting keys 62 are hardware keys for selecting various functions. Examples of the function selecting keys 62 include a scanning function selecting key for selecting a scanning function, a photocopy function selecting key for selecting a photocopy function and a FAX function selecting key for selecting a facsimile function.

The ten keys 63 are hardware keys for inputting numerals and the like. The ten keys 63 are used in inputting information such as the number of sheets to be photocopied, a photocopy magnification and a personal identification number for management. The start key 64 is a hardware key for instruction start of an operation. For example, in the photocopy function, a photocopy operation is started in response to an instruction of the start key 64. The reset key 65 is a hardware key for instructing reset of the set contents and the like. For example, when the reset key 65 is input, the set contents and the like designated by the user are reset, and changed into a default set value. The stop key 66 is a hardware key for instructing discontinuation of the operation being executed by the digital multifunction peripherals. For example, when the stop key 66 is indicated during the photocopy operation of the digital multifunction peripherals, the photocopy operation is stopped.

Moreover, in addition to the above-described keys, the operation panel 12 shown in FIG. 3 includes, as the hardware keys 21: a help (HELP) key to instruct display of a user guidance; a set/register key to instruct execution of setting or registering; a template key to select a template as data registered beforehand; an interrupt key to demand an interrupt of an operation; a situation check key to confirm a state of the digital multifunction peripherals; a key to perform security setting or the like; a power saving key for switching a power saving operation mode to reduce power consumption and a usual operation mode; an on-hook/pause key to bring a phone function into an on-hook state; a clear key to clear numerals and the like input by the ten keys and the like. Furthermore, the operation panel 12 shown in FIG. 3 also includes an alarm display to notify an abnormality of the digital multifunction peripherals and the like.

The display section 22 is constituted of a liquid crystal display in which the touch panel 22a is built. In the display section 22, various operation screens are displayed. Each operation screen displayed in the display section 22 displays a key (icon) selectable by the touch panel 22a in addition to the operation guidance and the like. An example of a screen displayed in the display section 22 will be described later in detail.

The display contents displayed in the display section 22 are controlled by, for example, the system control unit 11. The display data to be displayed in the display section 22 is stored in a storage device of the system control unit 11, such as the HDD 55, the nonvolatile memory 54 or the ROM 53. That is, the storage device (the HDD 55, the nonvolatile memory 54 or the ROM 53) of the system control unit 11 stores data such as the screen, guidance, icon or graphical image to be displayed in the display section 22.

The CPU 51 of the system control unit 11 judges user's operation contents or display contents in accordance with an operation situation of each component. Based on this judgment, the CPU 51 of the system control unit 11 executes a control in reading the display data to be displayed in the display section 22 from the HDD 55, the nonvolatile memory 54 or the ROM 53 to display the data in the display section 22. That is, the CPU 51 of the system control unit 11 controls the display of the display section 22 in accordance with the user's operation contents or the operation situation of each component. The guidance, the icon, the graphical image and the like displayed in the screen of the display section 22 are controlled by the CPU 51 of the system control unit 11 in accordance with the user's operation contents or the operation situation of each component.

Next, there will be described various operation screens to be displayed in the display section 22 of the operation panel 12, and processing in a state in which each operation screen is displayed.

First, there will be described a display example of a basic screen 70 displayed in the display section 22 of the operation panel 12, and a processing example in a state in which the basic screen 70 is displayed.

Figure 4:
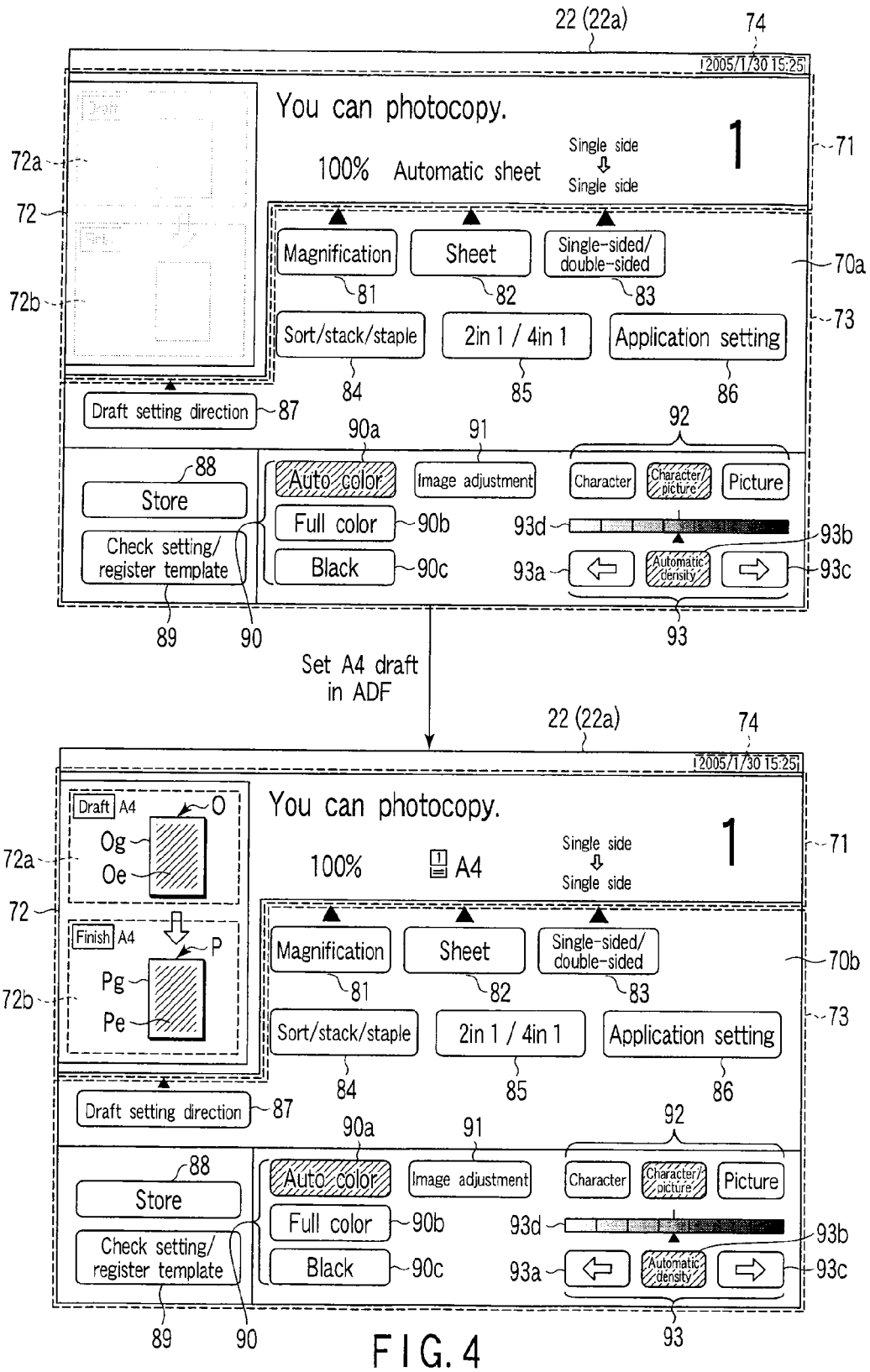
FIG. 4 is a diagram showing a display example of a basic screen in a photocopy mode.
Figure 5:
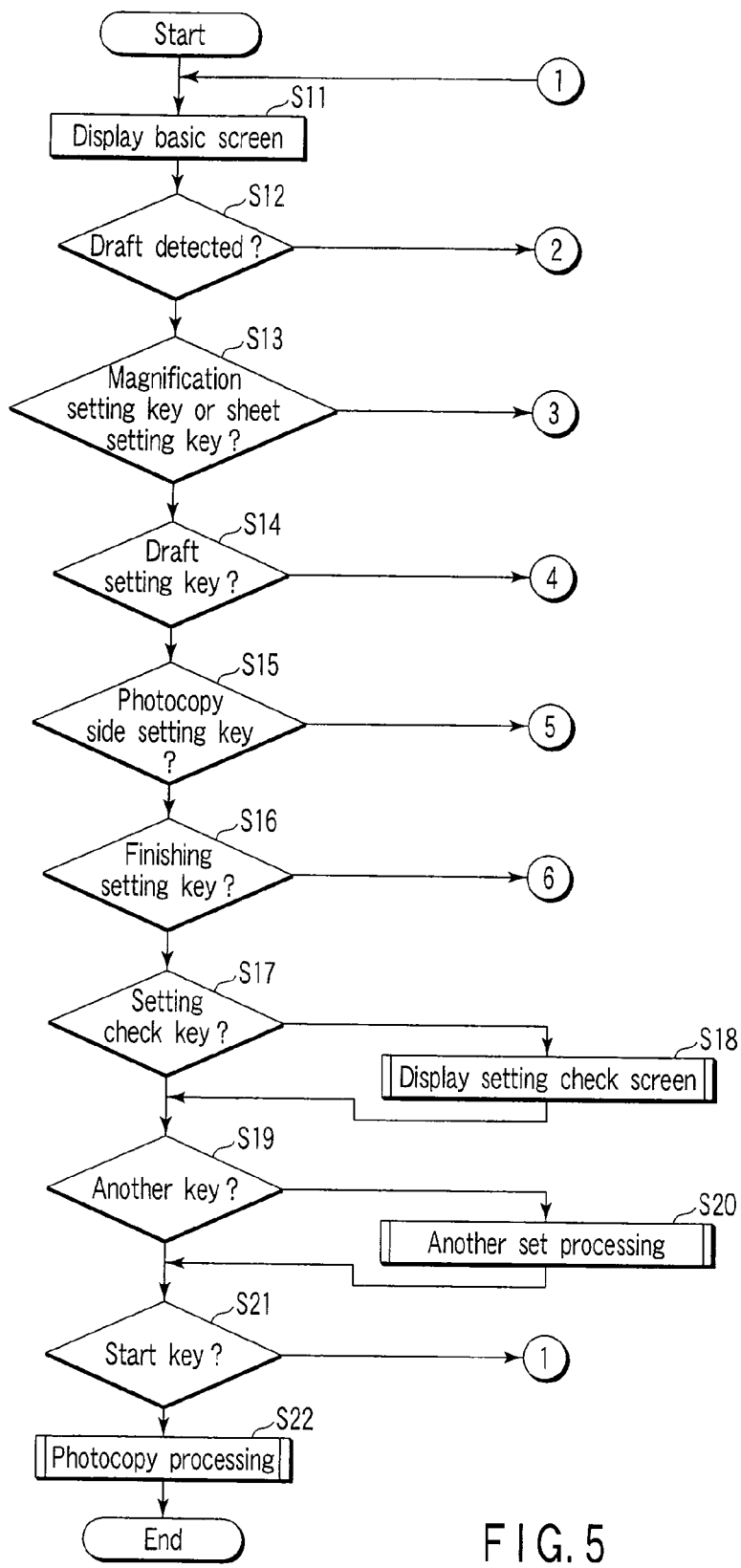
FIG. 5 is a flowchart showing a processing example in a state in which the basic screen is displayed.

FIG. 4 is a diagram showing a display example of the basic screen 70 (70a, 70b) in a photocopy mode. FIG. 5 is a flowchart showing a processing example in a state in which the basic screen 70 is displayed. It is to be noted that in the following description, there is assumed a case where the draft is set in the ADF 31.

The basic screen 70 is displayed in the display section 22 in a case where the digital multifunction peripherals has a photocopy mode. Even in a case where various set contents are set in the photocopy mode, the basic screen 70 is displayed in a state in which the set contents are reflected. The basic screen 70a shown in FIG. 4 shows a display example of the basic screen displayed in the display section 22 in a case where the digital multifunction peripherals is brought into a standby state in the photocopy mode (i.e., a case where various settings are brought into default set states). The basic screen 70b shown in FIG. 4 shows a display example of the basic screen displayed in the display section 22 in a case where an "A3" draft is set in the ADF 31 of the digital multifunction peripherals brought into the standby state.

First, in a case where the digital multifunction peripherals is brought into the photocopy mode, the CPU 51 of the system control unit 11 displays the basic screen 70a shown in FIG. 4 in the display section 22 of the operation panel 12 in the standby state (step S11). When the draft is set on the ADF 31 in this state (step S12, YES), the CPU 51 of the system control unit 11 performs draft size detection processing by the ADF draft size detecting function, and performs draft set processing and sheet set processing based on a detection result of the draft size. There will be described later in detail the draft set processing and the sheet set processing based on the detection result of this draft size.

In the display example shown in FIG. 4, the basic screen 70a or 70b has display areas such as a guidance display area 71, a draft and sheet setting display area 72, and a function setting button display area 73.

In the display area 71, there are displayed a message, a magnification, a sheet size, a photocopy side (single-sided/double-sided), the number of sheets to be photocopied and the like. As the message, a present state of the digital multifunction peripherals or the like is displayed. As the magnification, the presently set magnification is displayed. As the sheet size, the presently set sheet size is displayed. As the photocopy side, the presently set mode is displayed: a mode (single-sided/single-sided mode) to photocopy a single side of the draft on a single side of the sheet; a mode (single-sided/double-sided mode) to photocopy the single side of the draft on double sides of the sheet; a mode (double-sided/single-sided mode) to photocopy the double sides of the draft on the single side of the sheet; or a mode (double-sided/double-sided mode) to photocopy the double sides of the draft on the double sides of the sheet. As the number of the sheets to be photocopied, the presently set print number (photocopy number) is displayed.

The display area 72 is provided with a first display area 72a and a second display area 72b.

In the first display area 72a, there is displayed information indicating the presently set draft. For example, in the first display area 72a, a draft graphical image O is displayed together with character information indicating the draft size. The draft graphical image O displayed in the first display area 72a shows the draft size, the draft disposing direction (setting direction), the direction of the image in the draft (portrait or landscape), the surface of the draft to be read (one surface or both surfaces), a state of a special setting (staple setting or the like) and the like.

The draft graphical image O is an image obtained by superimposing (synthesizing), on a graphical image (draft state image) Oa indicating the whole draft state as a draft setting, an area image (draft image area image) Ob indicating an area of the draft image on the draft and a mark (image direction mark) Oc (see, e.g., FIGS. 10 and 11) indicating the direction of the image on the draft. On the draft graphical image O, there is also superimposed and displayed a mark (staple region mark) Od (see, e.g., FIG. 18) indicating a staple position setting. For example, in the basic screen 70b of FIG. 4, in the draft graphical image O, the draft image area image Ob is synthesized with the draft state image Oa indicating that the draft setting is "A4, vertically disposed, and single-sided".

According to such draft graphical image O, the user can visually, intuitively, and easily recognize the present draft setting.

The second display area 72b displays information indicating finish (sheet as a photocopy result), in a case where the sheet is printed with the present set contents. The second display area 72b displays a graphical image P of the finish together with the character information indicating a finish size (photocopy sheet size). The finished graphical image P displayed in the second display area 72b shows the size of the sheet (photocopy sheet) on which the draft image is to be printed, the direction of the sheet, the direction of the image (portrait or landscape) to be printed on the sheet, the side of the sheet to be printed (single-sided/double-sided) and the like.

The finished graphical image P is an image obtained by superimposing (synthesizing), on a graphical image (finished state image) Pa indicating the whole finish (sheet) state as a sheet setting, a graphical image (printed image area image) Pb indicating an area (printed region) of the draft image to be printed on the sheet and a mark (image direction mark) Pc (see, e.g., FIG. 10 or 11) indicating the direction of the image to be printed on the sheet. On the finished graphical image P, there is also superimposed and displayed a mark (staple region mark) Pd (see, e.g., FIG. 18) indicating a staple position setting. For example, in the basic screen 70b of FIG. 4, in the finished graphical image P, the printed image area image Pb is synthesized with the finished state image Pa indicating that the sheet setting is "A4, vertically disposed, and single-sided".

According to such finished graphical image P, the user can visually, intuitively, and easily recognize the present sheet setting, and can further easily predict the finished state.

Moreover, as shown in FIG. 4, the first display area is adjacent to the second display area. Furthermore, the draft graphical image O displayed in the first display area is associated with the finished graphical image P displayed in the second display area by a mark such as an arrow. Therefore, the user can visually and intuitively associate the set contents of the draft with those of the sheet (finish) to confirm them.

In the display area 73, there are displayed keys for setting various functions selectable by the touch panel 22a. The various keys displayed in the display area 73 are keys for performing various settings. The various keys displayed in the display area 73 are characters indicating the set contents and the like and icons in which patterns, graphics or the like are displayed.

The display area 73 displays: a magnification key 81; a sheet key 82; a photocopy side (single-sided/double-sided) key 83; a finishing setting (sort/stack/staple) key 84; an Nin1 (2in1/4in1) key 85; an application setting key 86; a draft setting (draft setting direction) key 87; a store key 88; a setting check key 89; a color mode setting portion (an auto color key 90a, a full color key 90b, and a black key 90c) 90, an image adjustment key 91; a draft mode setting portion (a character key 92a, a character picture key 92b, and a picture key 92c) 92; a density adjustment portion (a density down key 93a, a density up key 93b, an automatic density key 93c, and a density display portion 93d) 93 and the like.

The magnification key 81 is constituted of an icon in which "magnification" is displayed. The magnification key 81 is a key to be touched by the user in setting the magnification of the image to be printed on the sheet with respect to the image on the draft. When the magnification key 81 is touched (step S13, YES), the CPU 51 of the system control unit 11 displays a setting screen (magnification setting screen) for setting the magnification in the display section 22. In this case, the CPU 51 performs magnification set processing in response to the key input by the user in a state in which the magnification setting screen is displayed. It is to be noted that there will be described later in detail the magnification setting screen and the magnification set processing.

The sheet key 82 is constituted of an icon in which "sheet" is displayed. The sheet key 82 is a key to be touched by the user in setting the sheet size or the draft size. When the sheet key 82 is touched (step S13, YES), the CPU 51 of the system control unit 11 displays, in the display section 22, a setting screen (sheet setting screen) for setting the photocopy sheet size or the draft size. In this case, the CPU 51 performs the sheet set processing in response to the key input in a state in which the sheet setting screen is displayed. It is to be noted that there will be described later in detail the sheet setting screen and the sheet set processing.

The draft setting key 87 is constituted of an icon in which the "draft setting direction" is displayed. The draft setting key 87 is a key to be touched by the user in setting a direction in which the draft is to be set. When the draft setting key 87 is touched (step S14, YES), the CPU 51 of the system control unit 11 displays, in the display section 22, a draft direction setting screen for setting the draft setting direction. In this case, the CPU 51 performs the draft set processing in response to the key input in a state in which the draft direction setting screen is displayed. It is to be noted that there will be described later in detail the draft direction setting screen and the draft direction set processing.

It is to be noted that in a case where the ADF draft size detecting function is invalid, the draft setting key 87 is constituted of an icon in which the "draft size/setting direction" is displayed. In this case, when the draft setting key 87 is touched, the CPU 51 of the system control unit 11 displays, in the display section 22, the draft setting screen (draft direction setting screen) for setting the draft size and the draft setting direction in the ADF. In this case, the CPU 51 performs the draft set processing in response to the input key in a state in which the draft setting screen (draft direction setting screen) is displayed. It is to be noted that there will be described later in detail the draft setting screen and the draft set processing.

The photocopy side key 83 is constituted of an icon in which "single-sided/double-sided" is displayed. The photocopy side key 83 is a key to be touched by the user in setting the photocopy side. When the photocopy side key 83 is touched (step S15, YES), the CPU 51 of the system control unit 11 displays, in the display section 22, a setting screen (photocopy side setting screen) for setting one of the single-sided/single-sided mode, the single-sided/double-sided mode, the double-sided/single-sided mode and the double-sided/double-sided mode as a photocopy side mode. In this case, the CPU 51 performs the photocopy side set processing in response to the key input in a state in which the photocopy side setting screen is displayed. It is to be noted that there will be described later in detail the photocopy side setting screen and the photocopy side set processing.

Moreover, the magnification key 81, the sheet key 82 and the photocopy side key 83 are disposed in the vicinity of the guidance display area 71. The magnification key 81, the sheet key 82 and the photocopy side key 83 are associated with the magnification, the sheet, and the photocopy side displayed in the guidance display area 71. The magnification setting, the sheet setting, and the photocopy side setting are basic set particulars for frequent use in the photocopy mode. Therefore, the magnification key 81, the sheet key 82 and the photocopy side key 83 are disposed in the vicinity of the guidance display area 71 so that the user easily touches the keys, and easily check the set contents.

The finishing (sort/stack/staple) setting key 84 is constituted of an icon in which the "sort/stack/staple" is displayed. The finishing (sort/stack/staple) setting key 84 is a key to be touched by the user in setting contents of finishing processing performed by the finisher unit 15.

In a case where the finishing setting key 84 is touched (step S16, YES), the CPU 51 of the system control unit 11 displays, in the display section 22, a setting screen (finishing setting screen) for setting the finishing (sort/stack/staple). In this case, the CPU 51 performs the finishing set processing in response to the key input in a state in which the finishing setting screen is displayed. It is to be noted that there will be described later in detail the finishing setting screen and the finishing set processing.

The Nin1 (2in1/4 in1) key 85 is constituted of an icon in which "2in1/4 in1" is displayed. The Nin1 key 85 is a key to be touched by the user in setting photocopy in an Nin mode in which an image for N (e.g., 2 or 4) pages of the draft is to be printed on one sheet. When the Nin1 key 85 is touched (step S19, YES), the CPU 51 of the system control unit 11 displays, in the display section 22, an Nin1 setting screen for setting an Nin1 mode. In this case, the CPU 51 performs Nin2 set processing in response to the key input in a state in which the Nin1 setting screen is displayed (step S20).

The application setting key 86 is constituted of an icon in which "application setting" is displayed. The application setting key 86 is a key to be touched by the user in setting contents other than those set by each key displayed in the display area 73 or the hardware key 21. When the application setting key 86 is touched (step S19, YES), the CPU 51 of the system control unit 11 displays, in the display section 22, an application setting screen for setting application. In this case, the CPU 51 performs application set processing in response to the key input in a state in which the application setting screen is displayed (step S20).

It is to be noted that when the application setting key 86 is touched, an operation screen (application menu) is displayed to perform various settings as application settings. This application menu displays operation keys to set, for example, a binding margin, border erase, eliminating of booklet center joints, continuous page photocopy, magazine sorting (bookbinding mode), mirror image, negative/positive reversing, independent scaling, addition of date and time, addition of pages and the like. The Nin1 photocopy may be set in an operation screen (operation menu) for application setting.

The color mode setting portion 90 is constituted of keys for designating a color mode. The color mode setting portion 90 is constituted of the auto color key 90*a*, the full color key 90*b*, and the black key 90*c*. The auto color key 90*a* is constituted of an icon in which "auto color" is displayed. The full color key 90*b* is constituted of an icon in which "full color" is displayed. The black key 90*c* is constituted of an icon in which "monochromatic photocopy" is displayed.

The auto color key 90*a* is a key for judging whether the draft is chromatic or monochromatic, and setting color photocopy or monochromatic photocopy in accordance with the judgment result. The full color key 90*b* is a key for setting the color photocopy. The black key 90*c* is a key for setting the monochromatic photocopy.

The image adjustment key 91 is constituted of an icon in which "image adjustment" is displayed. The image adjustment key 91 is a key to be touched in performing setting to adjust the image. In a case where the image adjustment key 91 is touched (step S19, YES), the CPU 51 displays, in the display section 22, a setting screen for setting color balance, RGB adjustment, image quality adjustment, substrate adjustment, sharpness, two-color photocopy and the like (step S20).

The draft mode setting portion 92 is a key for selecting a type of the image to be photocopied. The draft mode setting portion 92 is constituted of the character key 92*a*, the character picture key 92*b*, and the picture key 92*c*. The character key 92*a* is constituted of an icon in which "character" is displayed. The character picture key 92*b* is constituted of an icon in which "character picture" is displayed. The picture key 92*c* is constituted of an icon in which "picture" is displayed.

The character key 92*a* is a key to be selected in a case where the image to be photocopied is a binary image (image constituted of white or black pixels) or an image to be processed as the binary image. For example, since the image constituted of characters has less grey-level pixels, the image is preferably photocopied as the binary image. Therefore, in a case where the image to be photocopied is constituted of the characters, the character key 92*a* is selected.

The picture key 92*c* is a key to be selected in a case where the image to be photocopied is an image having multiple tones. For example, since an image such as a picture has many grey-level pixels, the image is preferably photocopied as the multiple-tone image. Therefore, when the image to be photocopied is constituted of the picture, the picture key 92*c* is selected.

The character picture key 92*b* is a key to be selected in a case where the image to be photocopied is an image mixed with the binary image and the multiple-tone image. For example, the character picture key 92*b* is selected, in a case where the image to be photocopied is an image mixed with the characters and the picture.

The density adjustment portion 93 is constituted of keys for setting a photocopy density. The density adjustment portion 93 is constituted of the density down key 93*a*, the density up key 93*b*, the automatic density key 93*c*, the density display portion 93*d* and the like. The density down key 93*a* is constituted of an icon in which "←" is displayed. The density up key 93*b* is constituted of an icon in which "→" is displayed. The automatic density key 93*c* is constituted of an icon in which "automatic density" is displayed. In the density display portion 93*d*, the presently set photocopy density is displayed.

The density down key 93*a* is a key to be touched in a case where the photocopy density is reduced. Every time the density down key 93*a* is touched, the photocopy density is set to gradually decrease from the presently set photocopy density. The density up key 93*b* is a key to be touched in a case where the photocopy density is increased. Every time the density up key 93*b* is touched, the photocopy density is set to gradually increase from the presently set photocopy density. The automatic density key 93*c* is a key to be touched in a case where the photocopy density is set based on a predetermined reference value.

Moreover, in a case where any key of the color mode setting portion 90, the image adjustment key 91, the draft mode setting portion 92 and the density adjustment portion 93 is touched (step S19, YES), the CPU 51 of the system control unit 11 performs processing to change the set contents in response to the input key (step S20), and the set contents are reflected in the basic screen 70.

The store key 88 is constituted of an icon in which "store" is displayed. The store key 88 is a key to be touched by the user in storing the present set contents. The setting check key 89 is constituted of an icon in which "check setting/register template" is displayed. The setting check key 89 is a key to be touched in a case where the present set contents are checked, or registered as a template. When the setting check key 89 is touched (step S17, YES), the CPU 51 of the system control unit 11 displays, in the display section 22, a setting check screen displaying the present set contents (step S18).

Furthermore, in a case where the start key as the hardware key 21 is input in a state in which the basic screen 70 is displayed (step S21, YES), the CPU 51 of the system control unit 11 executes photocopy processing based on the set contents displayed in the basic screen 70 (step S22). It is to be noted that the set contents concerning the photocopy processing are held as information set in the RAM 52 as described above.

Next, there will be described a processing example of automatic draft set processing based on a detection result of the ADF draft size detecting function.

Figure 6:
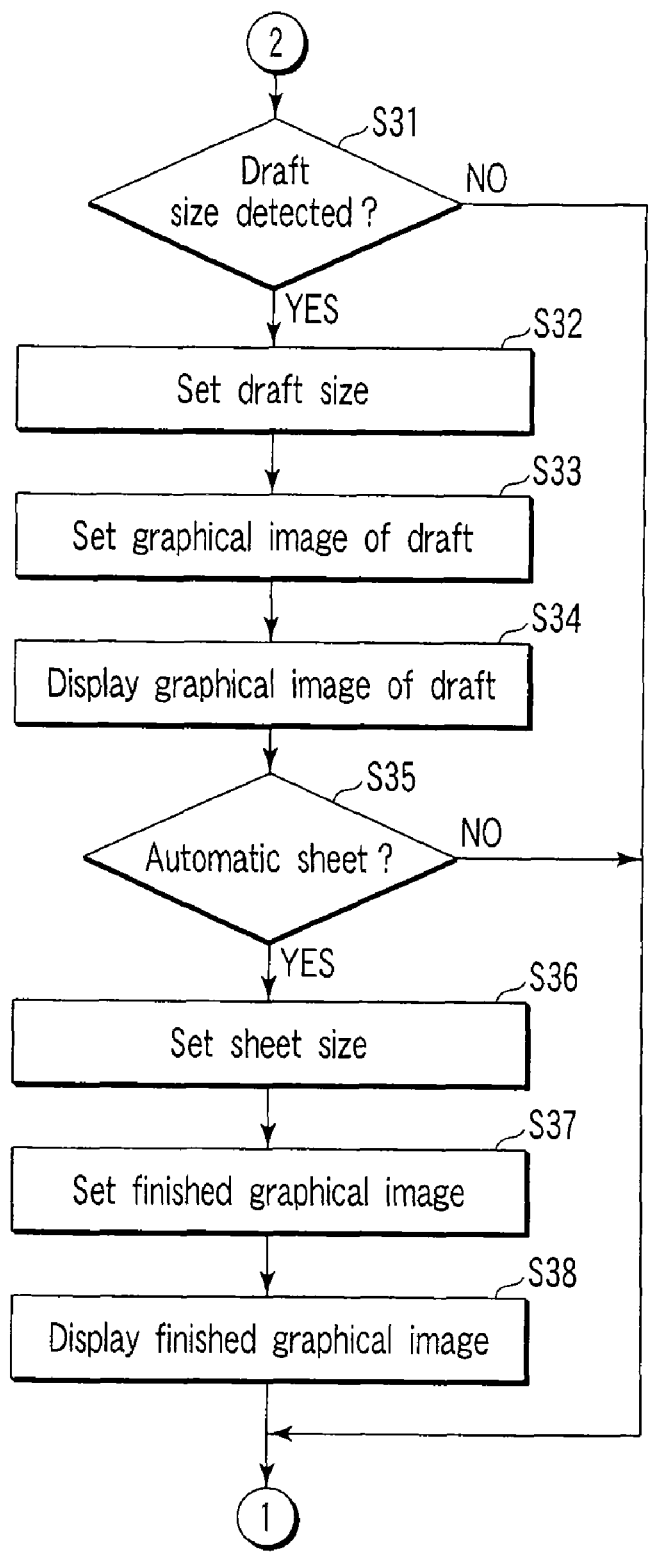
FIG. 6 is a flowchart showing a processing example of automatic draft set processing.

FIG. 6 is a flowchart showing a processing example of the automatic draft set processing. Here, it is assumed that the ADF draft size detecting function is valid. In the following description, it is assumed that the basic screen 70 is displayed in the display section 22 of the operation panel 12.

In a case where the draft is set on the draft table of the ADF 31, when the ADF draft size detecting function is effective, the CPU 51 of the system control unit 11 performs the automatic draft set processing.

First, when the draft is set on the draft table of the ADF 31, among a plurality of sensors 31b disposed on the draft table of the ADF 31, the sensor 31b corresponding to a position where the draft has been set supplies a detection signal indicating that the draft has been detected to the CPU 51 of the system control unit 11. On receiving, from any sensor 31b, the detection signal indicating that the draft has been detected, the CPU 51 of the system control unit 11 judges that the draft has been set on the draft table.

When it is judged that the draft has been set on the draft table of the ADF 31, the CPU 51 judges whether or not the ADF draft size detecting function is valid (step S31). In a case where the ADF draft size detecting function is invalid (step S31, NO), processing of steps S32 to S38 described later is cancelled. When the ADF draft size detecting function is valid (step S31, YES), the CPU 51 detects the size of the draft set on the draft table based on a signal indicating a position of the guide section 31a functioning as a draft size detector and a detection signal of each sensor 31b indicating whether or not the draft exists.

For example, the ADF draft size detecting function judges a length of the draft in a direction perpendicular to a direction in which the draft is conveyed by the ADF 31 based on a signal indicating the position of the guide section 31a. Furthermore, the ADF draft size detecting function judges a length of the draft in a direction parallel to the direction in which the draft is conveyed by the ADF 31 based on the detection signal of each sensor 31b indicating the presence of the draft. Therefore, the CPU 51 of the system control unit 11 judges the draft size and the draft direction based on the length of the draft in the direction perpendicular to the direction of the draft conveyed by the ADF 31 and that in the direction parallel to the direction of the draft conveyed by the ADF 31.

On judging the size and the disposing direction of the draft set in the ADF 31, the CPU 51 sets the draft size and a draft setting method as draft settings based on the judgment result (step S32). When the draft size and the draft setting direction are set, the CPU 51 performs draft graphical image set processing to set the draft graphical image O in accordance with the set draft size and setting method (step S33). When the draft graphical image O is set, the CPU 51 displays the draft graphical image O in the first display area 72a (step S34).

In this automatic draft set processing, there are set the draft size and the draft setting direction which are judged by the ADF draft size detecting function. Therefore, in the draft graphical image set processing, as the draft graphical image O, the draft state image Oa is set which indicates at least the draft size and the draft setting direction. The draft graphical image set processing will be described later in detail.

Moreover, when the draft size is judged by the ADF draft size detecting function, the CPU 51 judges whether or not the sheet setting mode is set to "automatic sheet" (step S35). Here, the "automatic sheet" as the sheet setting mode is a mode to set the sheet size matched with the draft size as the sheet setting. For example, when the magnification is 100%, the sheet having a size equal to that of the draft is set. It is to be noted that when the sheet setting mode is not the "automatic sheet" (step S35, NO), the CPU 51 cancels processing of steps S35 to S37 described later.

When the sheet setting mode is the "automatic sheet" (step S35, YES), the CPU 51 sets the sheet size as the sheet setting to the size (magnitude and direction) in accordance with the draft size (step S36). After setting the sheet size, the CPU 51 determines the finished graphical image P in accordance with the set sheet size (step S37).

The finished graphical image P shows a graphical image of the sheet (finish) printed based on the present set contents. Here, the sheet size (magnitude and direction) is set. Therefore, as the finished graphical image P, the graphical image is determined which indicates at least the sheet size (magnitude and direction).

As the finished graphical image P, the image matched with the sheet size is selected from a plurality of types of graphical images stored beforehand in the HDD 55, the nonvolatile memory 54, or the ROM 53. In a case where sizes such as A3, A4, A4-R, and B4 are presumed as the sheet sizes, graphical images of various sizes corresponding to the presumed sheet sizes are stored beforehand in the HDD 55, the nonvolatile memory 54, or the ROM 53. The finished graphical image P may be prepared by the CPU 51 every time the sheet size setting is changed.

In a case where the image is determined which is to be displayed as the finished graphical image P, the CPU 51 displays the determined image as the finished graphical image P in the second display area 72b (step S38).

According to the above-described automatic draft set processing, the size judged by the ADF draft size detecting function is set as the draft size, and the draft graphical image indicating the draft size is displayed in the first display area. Accordingly, the user can visually and intuitively confirm the draft size (magnitude and direction) judged by the ADF draft size detecting function.

Furthermore, in a case where the "automatic sheet" is set as the sheet setting mode, the size judged by the ADF draft size detecting function in accordance with the draft size is set as the sheet size, and the finished graphical image indicating the sheet size is displayed in the second display area. Accordingly, the user can visually confirm the size of the photocopy sheet (finish) together with the draft size (magnitude and direction).

Next, there will be described photocopy magnification and sheet set processing.

Here, there will be described a display example of the magnification and sheet setting screen (magnification/sheet setting screen) and processing examples of the magnification set processing and the sheet set processing in a state in which the magnification/sheet setting screen is displayed.

Figure 7:
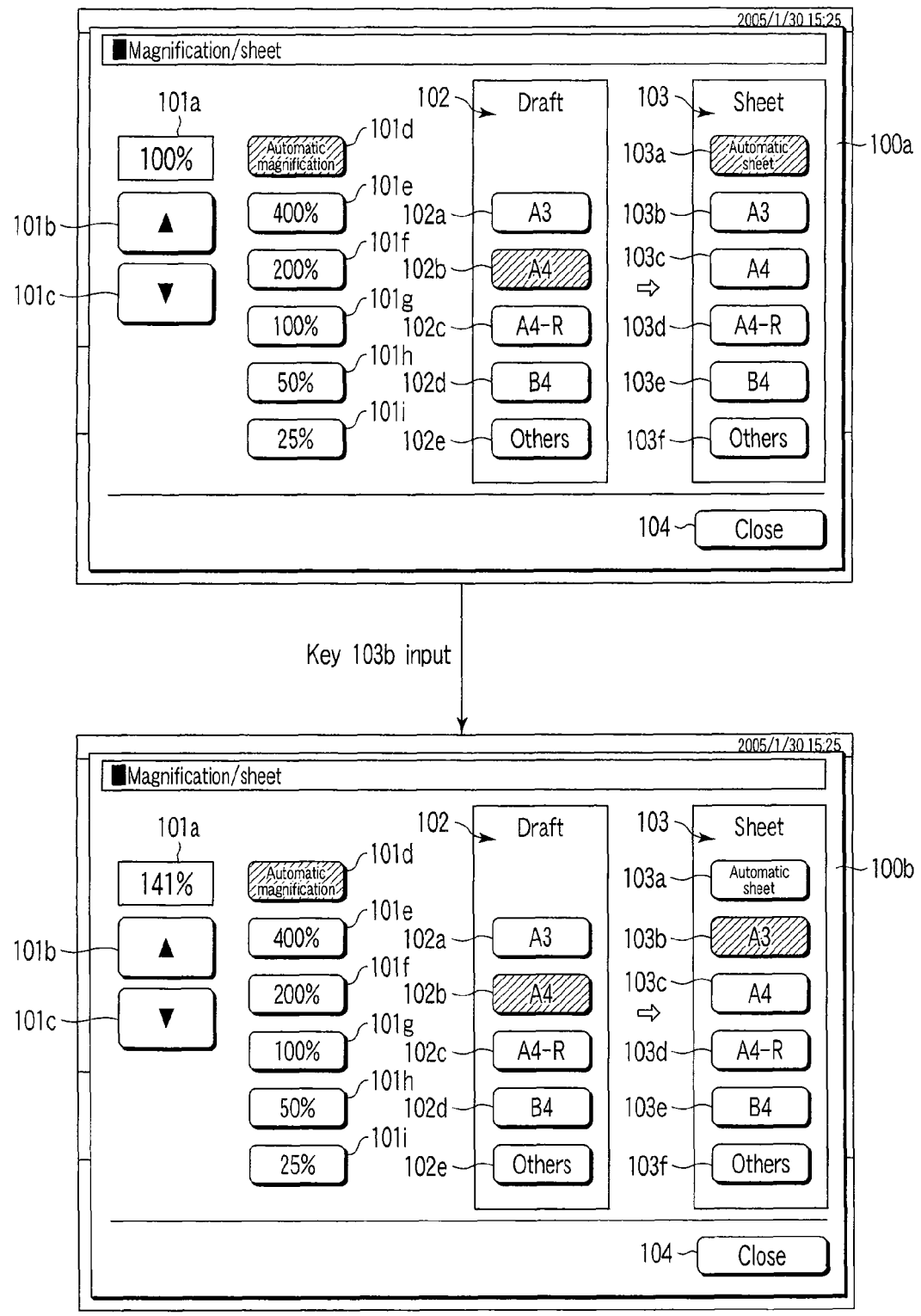
FIG. 7 is a diagram showing a first display example of a magnification/sheet setting screen.
Figure 8:
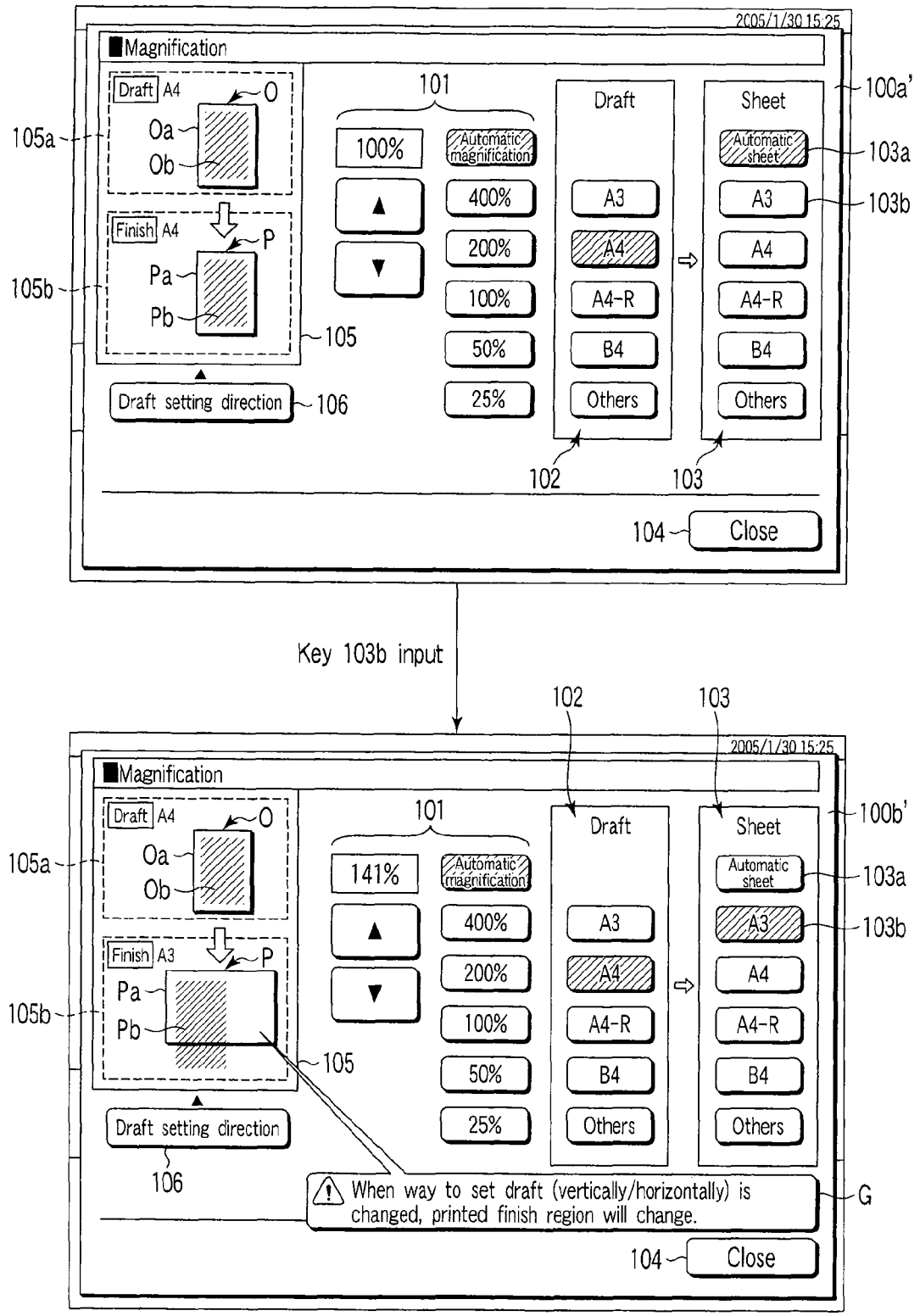
FIG. 8 is a diagram showing a second display example of a magnification/sheet setting screen.

FIG. 7 is a diagram showing a first display example of a magnification/sheet setting screen 100. FIG. 8 is a diagram showing a second display example of a magnification/sheet setting screen 100'. FIG. 7 shows, as first display examples, display examples of a magnification/sheet setting screen 100a in a case where the draft setting is "A4 and vertical" and the sheet setting is the "automatic sheet" and a magnification/sheet setting screen 100b in a case where the sheet setting is changed to "A3 and horizontal". FIG. 8 shows, as second display examples, display examples of a magnification/sheet setting screen 100a' in a case where the draft setting is "A4 and vertical" and the sheet setting is the "automatic sheet" and a magnification/sheet setting screen 100b' in a case where the sheet setting is changed to "A3 and horizontal".

It is to be noted that in the magnification/sheet setting screen 100' shown in FIG. 8, display contents of the magnification/sheet setting screen 100 shown in FIG. 7 further include a display area 105 having a first display area 105a and a second display area 105b, and a draft setting key 106. The first display area 105a and the second display area 105b are areas where contents are displayed which are similar to those of the first display area 72a and the second display area 72b displayed in the basic screen 70, respectively. That is, the draft graphical image O is displayed in the first display area 72a, and the finished graphical image P is displayed in the second display area 72b. The draft setting key 106 is a key to be touched in a case where the direction of the image in the draft is set in the same manner as in the draft setting key 87 of the basic screen 70b.

In the display examples shown in FIGS. 7 and 8, the same setting screen (magnification/sheet setting screen) is used as a photocopy magnification setting screen and a sheet size and draft size setting screen. This is because, for example, in a case where the draft size and the sheet size are determined, a photocopy magnification (optimum photocopy magnification) is determined at which the whole draft image just fits the photocopy sheet. Conversely, in a case where the draft size and the photocopy magnification are determined, a sheet size (optimum sheet size) is determined in which the whole draft image can be printed. Since the photocopy magnification setting is closely related to the photocopy sheet setting in this manner, the photocopy magnification and the sheet size can be set in the same screen.

In the magnification/sheet setting screen 100 shown in FIG. 7 or the magnification/sheet setting screen 100' shown in FIG. 8, there are displayed a magnification setting section 101, a draft size setting section 102, a sheet size setting section 103, and a close key 104.

The magnification setting section 101 is constituted of a magnification display portion 101a, a magnification up key 101b, a magnification down key 101c, an automatic magnification key 101d, a 400% key 101e, a 200% key 101f, a 100% key 101g, a 50% key 101h, a 25% key 101i and the like. In the magnification display portion 101a, the presently set photocopy magnification is displayed. The magnification up key 101b is touched when increasing the photocopy magnification every percentage. The magnification down key 101c is touched when decreasing the photocopy magnification every percentage. The automatic magnification key 101d is a key brought into a selected state, in a case where the magnification is set in accordance with the draft size and the sheet size. The 400% key 101e, the 200% key 101f, the 100% key 101g, the 50% key 101h, and the 25% key 101i are touched in a case where the photocopy magnification is set to 400%, 200%, 100%, 50%, and 25%, respectively.

The draft size setting section 102 is constituted of an A3 key 102a, an A4 key 102b, an A4-R key 102c, a B4 key 102d, another key 102e and the like. The A3 key 102a, the A4 key 102b, the A4-R key 102c, and the B4 key 102d are keys to be touched in a case where the draft setting is set to A3 (A3 and horizontal), A4 (A4 and vertical), A4-R (A4 and horizontal), and B4 (B4 and vertical), respectively. The other key 102e is a key to be touched in a case where the draft size is set to a size other than A3, A4, A4-R, and B4. In a case where the draft size detecting function is valid, in an initial state, the key is brought into the selected state in the draft size setting section 102, the key corresponding to the draft having a size and a direction (setting direction) detected by the draft size detecting function.

The sheet size setting section 103 is constituted of an automatic sheet setting key 103a, an A3 key 103b, an A4 key 103c, an A4-R key 103d, a B4 key 103e, another key 103f and the like. The automatic sheet setting key 103a is a key brought into the selected state in a case where the sheet is set in accordance with the draft size and the photocopy magnification. For example, in a case where the automatic sheet setting key 103a is brought into the selected state, when the photocopy magnification is 100%, a sheet is selected which has a size equal to that of the draft. The A3 key 103b, the A4 key 103c, the A4-R key 103d, and the B4 key 103e are keys to be touched in a case where the sheet size is set to A3 (A3 and horizontal), A4 (A4 and vertical), A4-R (A4 and horizontal), and B4 (B4 and vertical), respectively. The other key 103f is a key to be touched in a case where the sheet having a size other than A3, A4, A4-R, and B4 is set.

The close key 104 is a key to be touched in a case where the settings of the magnification and the sheet have been completed. When the close key 104 is touched, the display section 22 displays the basic screen 70 in which the settings of the magnification and the sheet set in the magnification/sheet setting screen have been reflected.

Next, there will be described processing examples of the magnification set processing and the sheet set processing.

Figure 9:
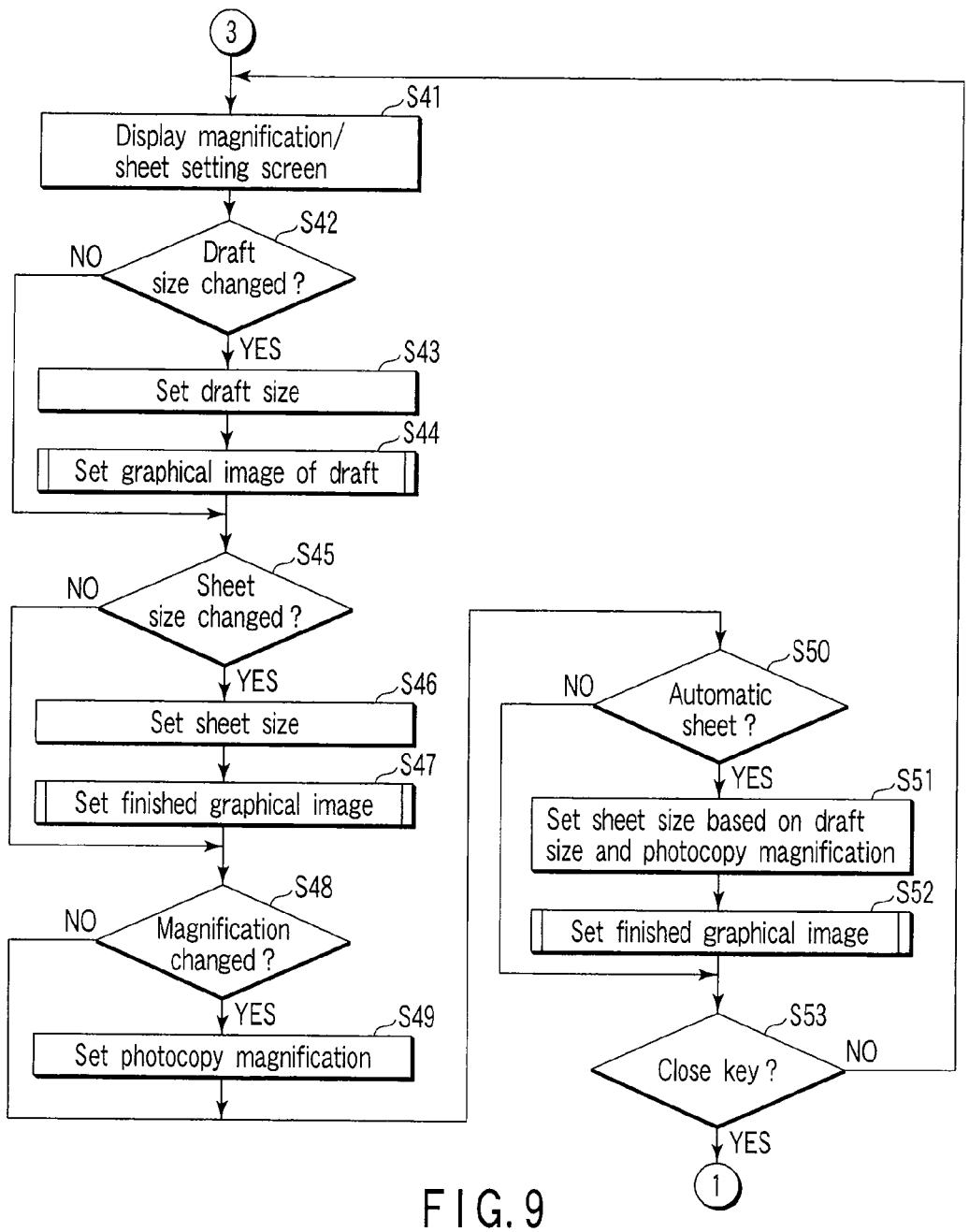
FIG. 9 is a flowchart showing processing examples of magnification set processing and sheet set processing.

FIG. 9 is a flowchart showing the processing examples of the magnification set processing and the sheet set processing in a state in which the magnification/sheet setting screen 100 shown in FIG. 7 or the magnification/sheet setting screen 100' shown in FIG. 8 is displayed.

When the magnification key 81 or the sheet key 82 is touched in the basic screen 70, the CPU 51 of the system control unit 11 displays, in the display section 22, the magnification/sheet setting screen 100 in which the present set contents have been reflected (step S41). For example, when the magnification is "100%", the draft setting is "A4 and vertical", and the sheet setting (sheet setting mode) is "automatic sheet", as shown in FIG. 7, the display section 22 displays the magnification/sheet setting screen 100 in which the magnification is "100%", the draft setting is "A4 (A4 vertical)", and the sheet is "automatic sheet".

In a case where any key (102a to 102e) of the draft setting section 102 is input in a state in which the magnification/sheet setting screen 100 is displayed, the CPU 51 brings the input key into the selected state (a display color of the key is changed), and judges that the draft setting has been changed (step S42, YES). When it is judged that the draft setting has been changed, the CPU 51 sets the draft setting (magnitude or setting direction) corresponding to the input key (step S43). Furthermore, when the draft setting is changed, the CPU 51 sets the draft graphical image O in accordance with the draft setting (step S44).

For example, as shown in FIGS. 7 and 8, in a case where the "A4" key 102b is brought into the selected state, the CPU 51 sets the draft setting to be "A4 and vertical". When the draft is set to be "A4 and vertical", the CPU 51 sets the graphical image corresponding to "A4 and vertical" as the draft state image Oa of the draft graphical image O. The CPU 51 sets the image of the draft image area in the "A4 and vertical" draft as the draft image area image Ob of the draft graphical image O.

It is to be noted that as shown in FIG. 8, in a case where the magnification/sheet setting screen 100' is provided with the first display area 105a, the CPU 51 displays the set draft graphical image O in the first display area 105a.

Moreover, when any key (103b to 103f) of the sheet setting section 103 is input, the CPU 51 brings the input key into the selected state (changes the display color of the key), and judges that the sheet setting (finished sheet setting) has been changed (step S45, YES). When it is judged that the sheet setting has been changed, the CPU 51 changes the sheet setting to the set contents corresponding to the input key (step S46). It is to be noted that when the "automatic sheet" key 103a is input, the CPU 51 performs the sheet setting as described later in steps S51, S52. When the sheet size setting is changed, the CPU 51 sets the finished graphical image P in accordance with the sheet setting (step S47).

For example, in a case where the user touches the "A3" key 103b in the magnification/sheet setting screen 100 in which the "automatic magnification" key 103a is brought into the selected state, the CPU 51 brings the "A3" key 103b into the selected state, and sets the sheet setting to be "A3 and horizontal". When the sheet setting is set to be "A3 and horizontal", the CPU 51 sets the graphical image indicating "A3 and horizontal" as the finished state image Pa of the finished graphical image P.

Moreover, in this case, since the magnification setting (magnification setting mode) is set to the "automatic magnification", the photocopy magnification is set to "141%" based on the draft size "A4" and the sheet size "A3". Therefore, the CPU 51 sets an image area image obtained by enlarging the draft image area image Ob to 141% as the printed image area image Pb of the finished graphical image P.

It is to be noted that in the finished graphical image P, the printed image area image Pb is superimposed on the finished state image Pa in a state in which an upper left portion of the printed image area image is aligned with that of the finished state image. For example, when the magnification/sheet setting screen 100' is provided with the second display area 105b as shown in FIG. 8, the CPU 51 displays the set finished graphical image P in the second display area 105b.

Moreover, in the example shown in FIG. 8, the printed image area image Pb of the finished graphical image P protrudes from a region of the finished state image Pa. In such case, as shown in FIG. 8, there is displayed the guidance display section G associated with the finished graphical image P. In the example shown in FIG. 8, the guidance display section G displays a guidance indicating "when a way (vertical/horizontal) to set the draft is changed, a printed region of the finish changes". Such guidance display section G is set together with the finished graphical image P in the set processing of the finished graphical image as described later.

Furthermore, when any key (101b to 101i) of the magnification setting section 101 is input, the CPU 51 of the system control unit 11 judges that the photocopy magnification has been changed (step S48, YES). When it is judged that the photocopy magnification has been changed, the CPU 51 of the system control unit 11 displays the magnification in response to the input key in the magnification display portion 101a, and sets the photocopy magnification in response to the input key (step S49). When the "automatic magnification" key 101d is input, the CPU 51 calculates an optimum magnification in accordance with the draft size and the sheet size. This calculated magnification is displayed in the magnification display portion 101a, and set as the photocopy magnification.

Moreover, in a case where the draft size or the photocopy magnification is changed in a state in which the "automatic sheet" is set as the sheet setting mode (step S50, YES), the CPU 51 performs the processing (automatic sheet set processing) to set the sheet in accordance with the draft size and the photocopy magnification. Even in a case where the "automatic sheet" key 103a is input in a state in which a specific sheet is set (step S50, YES), the CPU 51 performs the processing (automatic sheet set processing) to set the sheet in accordance with the draft size and direction and the photocopy magnification.

In the automatic sheet set processing, the CPU 51 judges an optimum sheet (size and direction) based on the draft size, the draft setting direction, and the photocopy magnification. On judging the optimum sheet, the CPU 51 sets the judged sheet (step S51). Furthermore, when the sheet setting is changed, the CPU 51 sets the finished graphical image P in accordance with the set sheet setting (step S52).

It is to be noted that when the magnification/sheet setting screen 100' is provided with the second display area 105b as shown in FIG. 8, the CPU 51 displays the set finished graphical image P in the second display area 105b.

Moreover, when the close key 104 is input, the CPU 51 ends the magnification and sheet set processing. In this case, the CPU 51 changes, to the basic screen 70, the set screen displayed in the display section 22. It is to be noted that in the basic screen 70, the first display area 72a displays the draft graphical image O set in the magnification and sheet set processing, and the second display area 72b displays the finished graphical image P set in the magnification and sheet set processing.

Next, draft setting will be described.

The draft setting includes the draft size, the draft direction (setting direction), and the direction of the image (portrait or landscape) in the draft. The draft size and direction are detectable by the ADF draft size detecting function. That is, when the ADF draft size detecting function is valid, the size and setting direction of the draft set in the ADF 31 are judged by the ADF draft size detecting function. Therefore, as to the draft setting, there will be described a case where the ADF draft size detecting function is valid and a case where the ADF draft size detecting function is invalid.

First, there will be described the draft setting in a case where the ADF draft size detecting function is valid.

Figure 10:
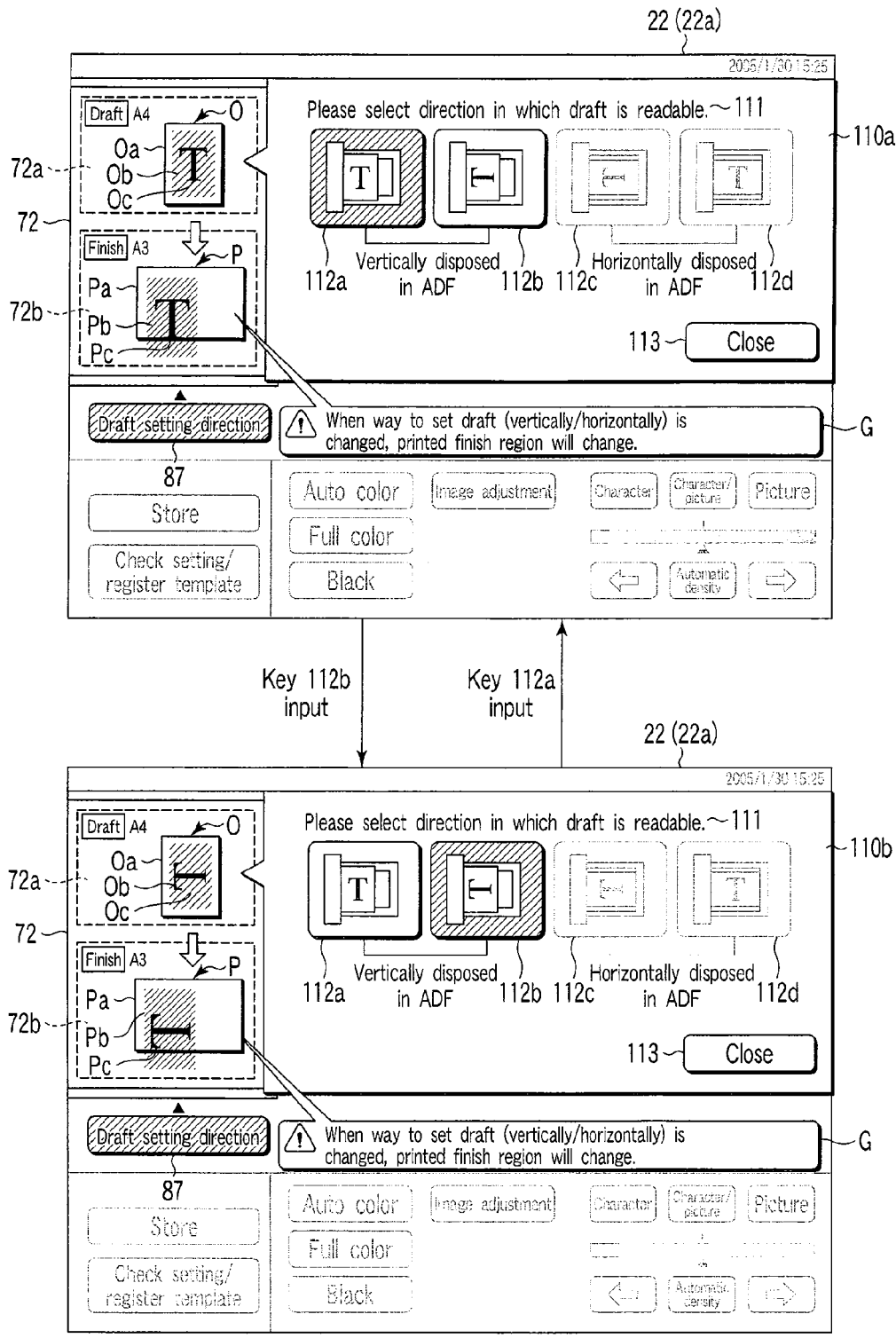
FIG. 10 is a diagram showing a display example of a draft direction setting screen in a case where a draft vertically set in an ADF is detected.
Figure 11:
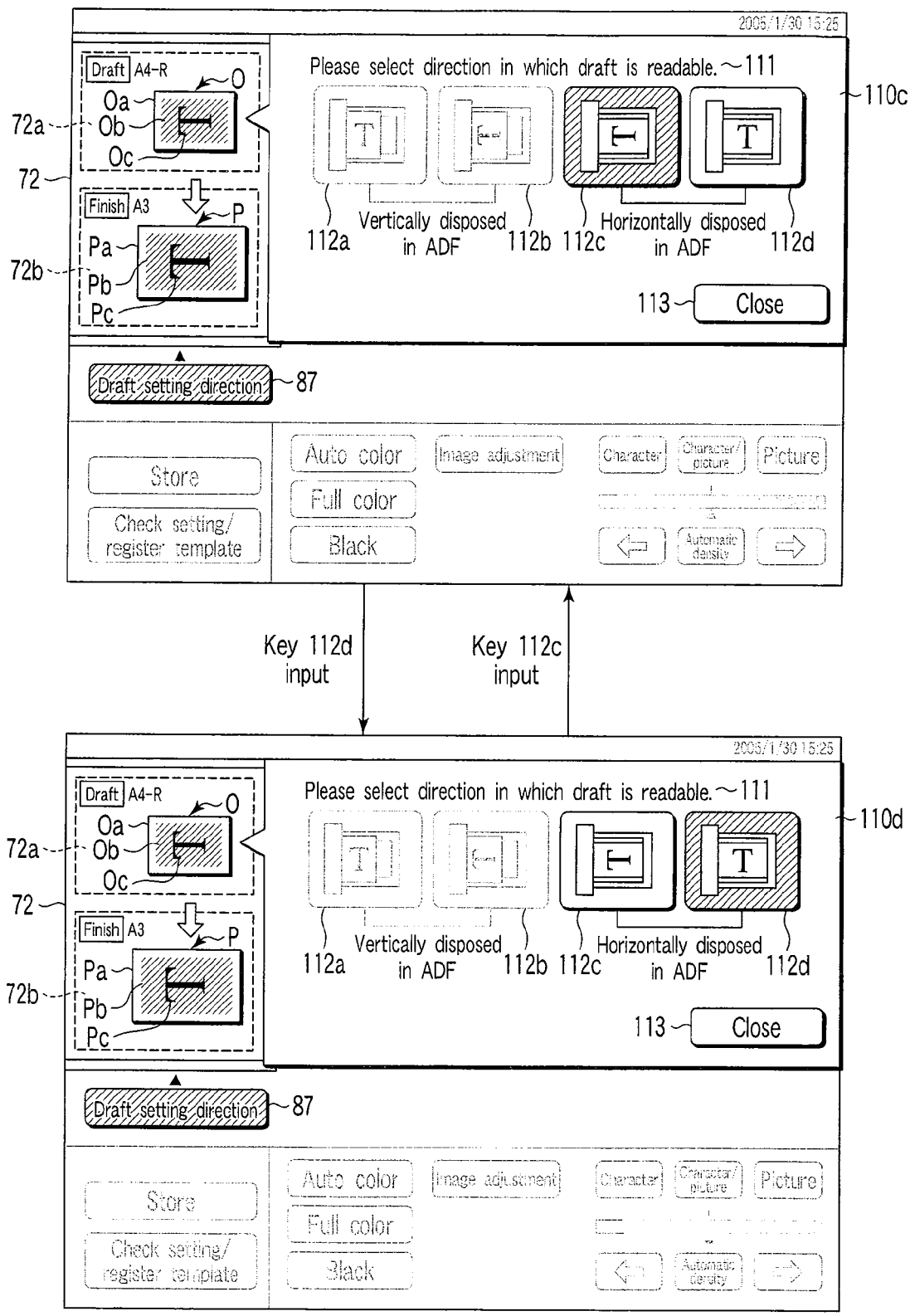
FIG. 11 is a diagram showing a display example of a draft direction setting screen in a case where a draft horizontally set in the ADF is detected.

FIGS. 10 and 11 are diagrams showing display examples of a draft direction setting screen 110 in a case where the ADF draft size detecting function is valid.

FIG. 10 is a diagram showing a display example of the draft direction setting screen 110 (110a, 110b) in a case where the draft setting as the detection result of the ADF draft size detecting function is "A4 and vertical (vertically disposed)" and the sheet setting is "A3 and horizontal". Here, it is assumed that the vertically disposing means a state in which the draft is set in the ADF 31 so that the direction of the draft conveyed by the ADF 31 is perpendicular to a longitudinal direction of the draft.

Moreover, FIG. 11 is a diagram showing a display example of the draft direction setting screen 110 (110c, 110d) in a case where the draft setting is "A4 and horizontal (horizontal disposed)" which is the detection result of the ADF draft size detecting function and the sheet setting is "A3 and horizontal". Here, it is assumed that the horizontally disposing means a state in which the draft is set in the ADF 31 so that the direction of the draft conveyed by the ADF 31 is parallel to the longitudinal direction of the draft.

The draft direction setting screen 110 (110a, 110b, 110c, and 110d) is displayed as a popup window in a partial area of the basic screen 70 as shown in FIGS. 10 and 11. The draft direction setting screen 110 displays a guidance display area 111, a vertically disposed portrait key 112a, a vertically disposed landscape key 112b, a horizontally disposed portrait key 112c, a horizontally disposed landscape key 112d, and a close key 113.

The draft direction setting screen 110 is displayed as the popup window in a state in which the first display area 72a, the second display area 72b and the draft setting key 87 of the basic screen 70 remain to be displayed. Furthermore, the draft direction setting screen 110 is associated with the first display area 72a by symbols, graphics or the like. In the first display area 72a, the draft graphical image O is displayed in accordance with the draft setting described later. In the second display area 72b, the finished graphical image P is displayed in accordance with the sheet setting.

The guidance display area 111 displays a guidance indicating that the direction of the image in the draft be selected. The close key 113 is touched in a case where the setting is ended. When the close key 113 is touched, in the display section 22, the draft direction setting screen 110 is closed, and the basic screen 70 is displayed in which the set contents are reflected.

It is to be noted that in a case where the draft direction setting screen 110 is displayed, the storage key, color mode setting section, image adjustment key, draft mode setting section, density setting portion and the like in the basic screen 70b are displayed to be thin, and displayed in a state (whiteout) in which they cannot be selected.

Moreover, in the display example shown in FIGS. 10 and 11, the sheet setting is set to be "A3 and horizontal". Therefore, in a case where the draft is set to be "A4 and vertical", that is, the draft having the size "A4" is "vertically disposed", as shown in FIG. 10, the printed image area image Pb protrudes from a region of the finished state image Pa in the finished graphical image P displayed in the second display area 72b.

On the other hand, in a case where the draft is set to be "A4 and horizontal", that is, the draft having the size "A4" is "horizontally disposed", as shown in FIG. 11, the printed image area image Pb falls in a region of the finished state image Pa in the finished graphical image P displayed in the second display area 72b.

To notify the user of the finished state with respect to such draft setting direction, in a case where the printed image area image Pb protrudes from the region of the finished state image Pa, the CPU 51 displays the guidance display section G as shown in FIG. 10. As shown in FIG. 10, the guidance display section G displays an operation guidance so that the whole draft image falls in the sheet. In the example shown in FIG. 10, the guidance display section G displays a guidance indicating "when the way (vertical/horizontal) to set the draft is changed, the finished print region changes". This guidance is an operation guidance to change the draft setting direction so that the whole draft image is printed on the sheet.

It is to be noted that there will be described later in detail the set processing of the draft graphical image O and the set processing of the finished graphical image including the guidance display section G.

Moreover, in a case where the ADF draft size detecting function is valid in the draft direction setting screen 110, as shown in FIG. 10 or 11, a selectable key is limited based on the draft setting direction detected by the ADF draft size detecting function.

For example, as shown in FIG. 10, in a case where the draft vertically set in the ADF 31 is detected, the vertically disposed portrait key 112a and the vertically disposed landscape key 112b are displayed in selectable states (become valid). In this case, the horizontally disposed portrait key 112c and the horizontally disposed landscape key 112d are displayed to be thin, and displayed in non-selectable states (whiteout).

Moreover, as shown in FIG. 11, in a case where the draft horizontally set in the ADF 31 is detected, the horizontally disposed portrait key 112c and the horizontally disposed landscape key 112d are displayed in the selectable states (become valid) in the draft direction setting screen 110 (110c, 110d). In this case, the vertically disposed portrait key 112a and the vertically disposed landscape key 112b are displayed to be thin, and displayed in non-selectable states (whiteout).

The vertically disposed portrait key 112a is a key to be selected in a case where the direction of the image in the draft vertically disposed in the ADF 31 is that of the portrait. When the vertically disposed portrait key 112a is touched, the draft (set in the ADF 31) is set to the vertically disposed portrait. In this case, the draft graphical image O displayed in the display area 72a indicates "the draft size and the vertically disposed portrait". It is to be noted that in the draft graphical image O, the draft size and setting direction are indicated by the draft state image Oa, and the direction of the image in the draft is indicated by the draft image area image Ob and the image direction mark Oc.

For example, in the draft direction setting screen 110a shown in FIG. 10, the vertically disposed portrait key 112a is brought into the selected state. In this draft direction setting screen 110a, the first display area 72a displays the draft graphical image O indicating "A4, vertically disposed, and portrait", and the second display area 72b displays the finished graphical image P indicating "A3, horizontal, and portrait" and corresponding to the draft graphical image O. Furthermore, in the finished graphical image P of the draft direction setting screen 110a, the printed image area image Pb protrudes from the finished state image Pa, and the guidance display section G is displayed.

The vertically disposed landscape key 112b is a key to be selected in a case where the direction of the image in the draft vertically disposed in the ADF 31 is that of the landscape. When the vertically disposed landscape key 112b is touched, the draft (set in the ADF 31) is set to the vertically disposed landscape draft. In this case, the draft graphical image O displayed in the display area 72a indicates "draft size, the vertically disposed, and landscape".

For example, in the draft direction setting screen 110b shown in FIG. 10, the vertically disposed landscape key 112b is brought into the selected state. In this draft direction setting screen 110b, the first display area 72a displays the draft graphical image O indicating "A4, vertically disposed, and landscape", and the second display area 72b displays the finished graphical image P indicating "A3, horizontal, and landscape (corresponding to draft)" and corresponding to the draft graphical image O. Furthermore, in the finished graphical image P of the draft direction setting screen 110b, the printed image area image Pb protrudes from the finished state image Pa, and the guidance display section G is displayed.

The horizontally disposed portrait key 112c is a key to be selected in a case where the direction of the image in the draft horizontally disposed in the ADF 31 is that of the portrait. When the horizontally disposed portrait key 112c is touched, the draft (set in the ADF 31) is set to a horizontally disposed portrait draft. In this case, the draft graphical image displayed in the display area 72a indicates "draft size, horizontally disposed, and portrait".

For example, in the draft direction setting screen 11c shown in FIG. 11, the horizontally disposed portrait key 112c is brought into the selected state. In this draft direction setting screen 110c, the first display area 72a displays the draft graphical image O indicating "A4, horizontally disposed, and portrait", and the second display area 72b displays the finished graphical image P indicating "A3, horizontal, and portrait" and corresponding to the draft graphical image O. In the finished graphical image P of the draft direction setting screen 110c, the printed image area image Pb is displayed in the finished state image Pa. Therefore, the guidance display section G is not displayed.

The horizontally disposed landscape key 112d is a key to be selected in a case where the direction of the image in the draft horizontally disposed in the ADF 31 is that of the landscape. When the horizontally disposed landscape key 112d is touched, the draft (set in the ADF 31) is set to the horizontally disposed landscape draft. In this case, the draft graphical image O displayed in the display area 72a indicates "draft size, horizontally disposed, and landscape".

For example, in the draft direction setting screen 110d shown in FIG. 11, the horizontally disposed landscape key 112d is brought into the selected state. In this draft direction setting screen 110d, the first display area 72a displays the draft graphical image O indicating "A4, horizontally disposed, and landscape", and the second display area 72b displays the finished graphical image P indicating "A3, horizontal, and landscape (corresponding to the draft)" and corresponding to the draft graphical image O. In the finished graphical image P of the draft direction setting screen 110d, the printed image area image Pb is displayed in the finished state image Pa. Therefore, the guidance display section G is not displayed.

It is to be noted that as to the direction of the image in the draft, a default may be set to the portrait or the landscape. For example, in a case where the direction of the image in the draft is set as the default to the portrait, when the ADF draft size detecting function detects the vertically disposed draft, the draft setting is set as default setting to the vertically disposed portrait draft.

Next, there will be described draft setting in a case where the ADF draft size detecting function is invalid.

Figure 12:
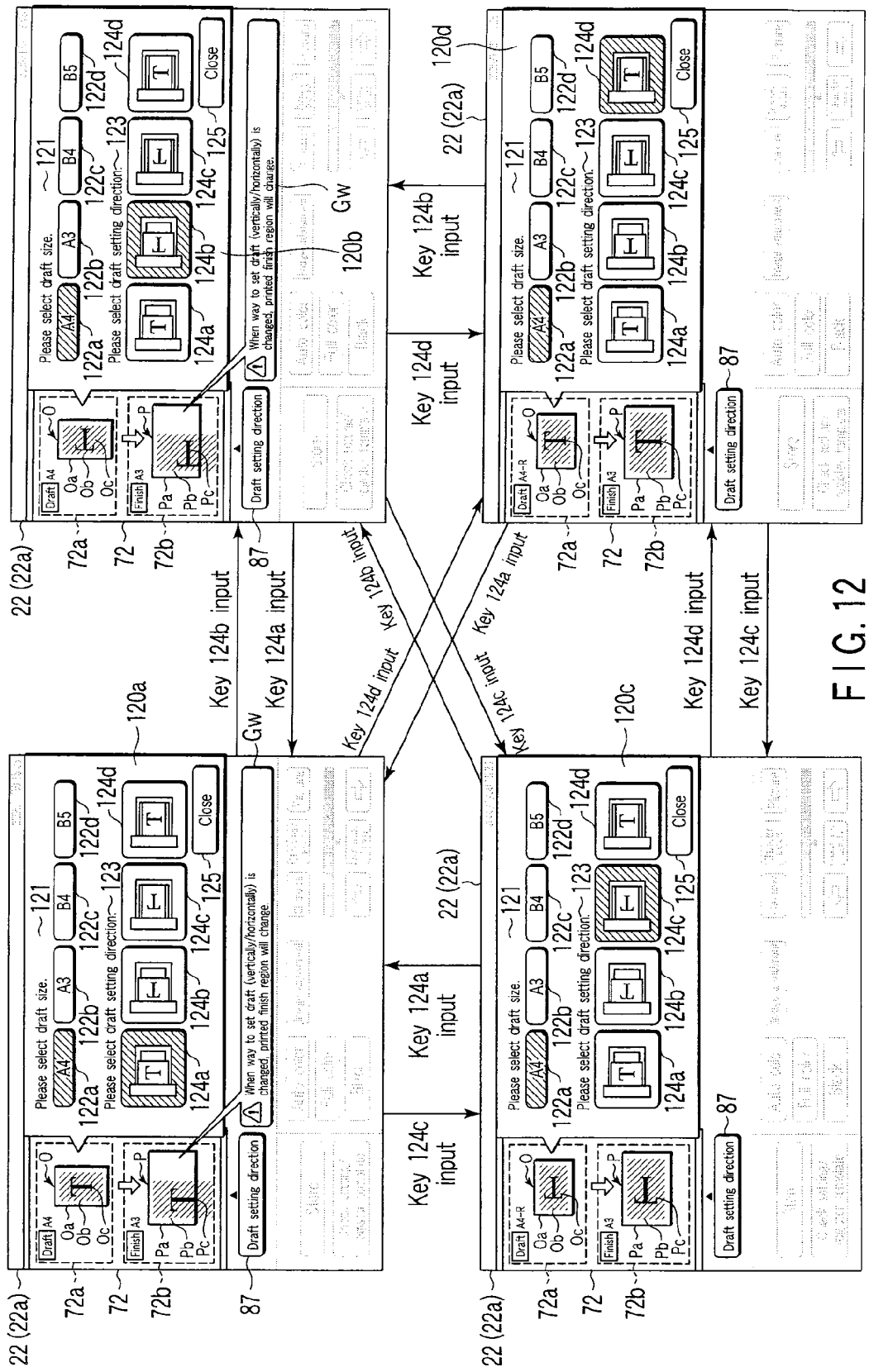
FIG. 12 is a diagram showing a display example of a draft setting screen in a case where an ADF draft size detecting function is invalid.

FIG. 12 is a diagram showing display examples of a draft direction setting screen 120 (120a, 120b, 120c, and 120d) in a case where a draft size detecting function is invalid which detects the size of the draft set in the ADF 31. When the draft size detecting function of detecting the size of the draft set in the ADF is invalid, the size and the direction of the draft set in the ADF 31 are set in the draft direction setting screens 120 (120a, 120b, 120c, and 120d) shown in FIG. 12.

As shown in FIG. 12, the draft direction setting screen 120 is displayed as a popup window in the basic screen 70. The draft direction setting screen 120 displays: a guidance display area 121; a draft size selection key 122 (an "A4" key 122a, an "A3" key 122b, a "B4" key 122c, and a "B5" key 122d); a guidance display area 123; a draft setting direction key 124 (a vertically disposed portrait key 124a, a vertically disposed landscape key 124b, a horizontally disposed portrait key 124c, and a horizontally disposed landscape key 124d); and a close key 125.

Moreover, the draft direction setting screen 120 is displayed as the popup window so that the first display area 72a, the second display area 72b and the draft setting key 87 in the basic screen 70 remain to be displayed. Furthermore, the draft direction setting screen 120 is displayed in association with the first display area 72a by marks, graphics or the like. It is to be noted that when the draft direction setting screen 120 is displayed, the ADF draft size detecting function is invalid. Therefore, the draft setting key 87 is constituted of an icon in which "draft size/direction" is displayed.

It is to be noted that in a state in which the draft direction setting screen 120 is displayed, keys, guidance displays and the like other than the first display area 72a, the second display area 72b and the draft setting key 87 in the basic screen 70 are displayed to be thin, and they are displayed in a state in which they cannot be selected (whiteout).

The guidance display area 121 displays a guidance indicating that the draft size be selected. The draft size selection key 122 is constituted of the "A4" key 122a, the "A3" key 122b, the "B4" key 122c, and the "B5" key 122d. The "A4" key 122a, the "A3" key 122b, the "B4" key 122c and the "B5" key 122d are keys for selecting "A4", "A3", "B4", and "B5" as the draft sizes, respectively.

The draft setting direction key 124 is constituted of the vertically disposed portrait key 124a, the vertically disposed landscape key 124b, the horizontally disposed portrait key 124c, and the horizontally disposed landscape key 124d.

The vertically disposed portrait key 124a is a key to be selected in a case where the draft set in the ADF 31 is vertically disposed, and the direction of the image in the draft is that of the portrait. When the vertically disposed portrait key 124a is touched, the draft (set in the ADF 31) is set to "vertically disposed portrait". In this case, the first display area 72a displays the graphical image O indicating the vertically disposed draft of the portrait.

For example, in the draft direction setting screen 120a shown in FIG. 12, the vertically disposed portrait key 124a is brought into the selected state. In this draft direction setting screen 120a, the first display area 72a displays the draft graphical image O indicating "A4, vertically disposed, and portrait", and the second display area 72b displays the finished graphical image P indicating "A3, horizontal, and portrait" and corresponding to the draft graphical image O. Furthermore, in the finished graphical image P of the draft direction setting screen 120a, the printed image area image Pb protrudes from the finished state image Pa, and the guidance display section G is displayed.

The vertically disposed landscape key 124b is a key to be selected in a case where the draft set in the ADF 31 is vertically disposed, and the direction of the image in the draft is that of the landscape. When the vertically disposed landscape key 124b is touched, the draft (set in the ADF) is set to the vertically disposed landscape draft. In this case, the first display area 72a displays the graphical image O indicating the vertically disposed draft of the landscape.

For example, in the draft direction setting screen 120b shown in FIG. 12, the vertically disposed landscape key 124b is brought into the selected state. In this draft direction setting screen 120b, the first display area 72a displays the draft graphical image O indicating "A4, vertically disposed, and landscape", and the second display area 72b displays the finished graphical image P indicating "A3, horizontal, and landscape (corresponding to the draft)" and corresponding to the draft graphical image O. Furthermore, in the finished graphical image P of the draft direction setting screen 120b, the printed image area image Pb protrudes from the finished state image Pa, and the guidance display section G is displayed.

The horizontally disposed portrait key 124c is a key to be selected in a case where the draft set in the ADF is horizontally disposed and the direction of the image in the draft is that of the portrait. When the horizontally disposed portrait key 124c is touched, the draft (set in the ADF) is set to the horizontally disposed portrait draft. In this case, the first display area 72a displays the graphical image O of the horizontally disposed draft of the portrait.

The horizontally disposed portrait key 124c is a key to be selected in a case where the direction of the image in the draft horizontally disposed in the ADF 31 is that of the portrait. When the horizontally disposed portrait key 124c is touched, the draft (set in the ADF 31) is set to the horizontally disposed portrait draft. In this case, the draft graphical image displayed in the first display area 72*a* indicates "draft size, horizontally disposed, and portrait".

For example, in the draft direction setting screen 120*c* shown in FIG. 12, the horizontally disposed portrait key 124*c* is brought into the selected state. In this draft direction setting screen 120*c*, the first display area 72*a* displays the draft graphical image O indicating "A4, horizontally disposed, and portrait", and the second display area 72*b* displays the finished graphical image P indicating "A3, horizontal, and portrait (corresponding to the draft)" and corresponding to the draft graphical image O. In the finished graphical image P of the draft direction setting screen 120*c*, the printed image area image Pb is displayed in the finished state image Pa. Therefore, the guidance display section G is not displayed.

The horizontally disposed landscape key 124*d* is a key to be selected in a case where the draft set in the ADF 31 is horizontally disposed and the direction of the image in the draft is that of the landscape. When the horizontally disposed landscape key 124*d* is touched, the draft (set in the ADF) is set to "horizontally disposed and landscape". In this case, the first display area 72*a* displays the draft graphical image O indicating "draft size, horizontally disposed, and landscape".

For example, in the draft direction setting screen 120*d* shown in FIG. 12, the horizontally disposed landscape key 124*d* is brought into the selected state. In this draft direction setting screen 120*d*, the first display area 72*a* displays the draft graphical image O indicating "A4, horizontally disposed, and landscape", and the second display area 72*b* displays the finished graphical image P indicating "A3, horizontal, and landscape (corresponding to the draft)" and corresponding to the draft graphical image O. Furthermore, in the finished graphical image P of the draft direction setting screen 120*d*, the printed image area image Pb is displayed in the finished state image Pa. Therefore, the guidance display section G is not displayed.

Next, there will be described a processing example of draft set processing.

Here, as the processing example of the draft set processing, there will be described the draft set processing in a case where the ADF draft size detecting function is valid.

Figure 13:
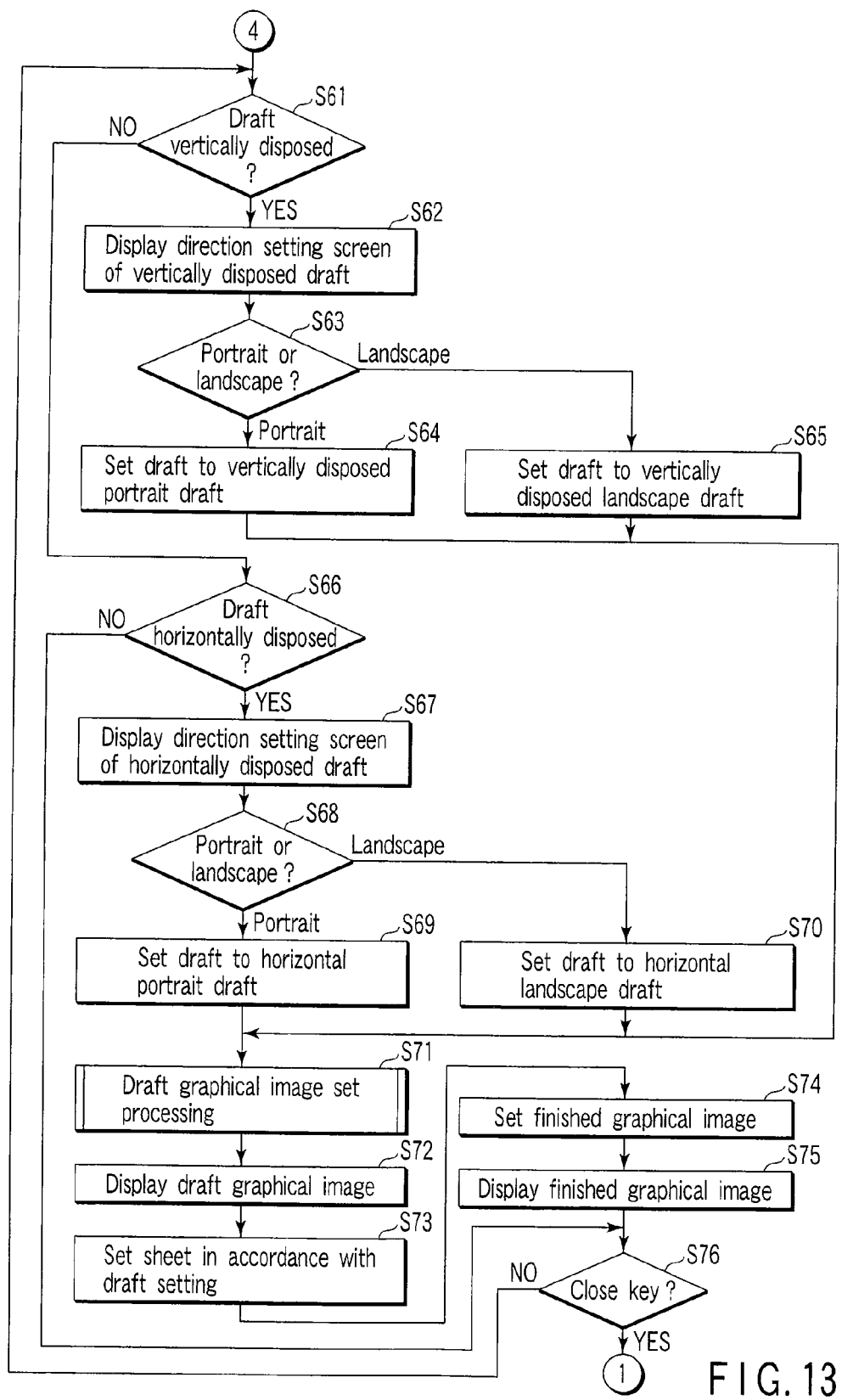
FIG. 13 is a flowchart showing a processing example of draft set processing.

FIG. 13 is a flowchart showing a processing example of the draft set processing in a state in which the draft setting screen 110 shown in FIG. 10 or 11 is displayed.

When the draft setting key 87 is touched in the basic screen 70, the CPU 51 of the system control unit 11 performs the draft set processing in response to user's instruction. As described above, when the ADF draft size detecting function is valid, the CPU 51 selectively displays, in the display section 22, a draft setting direction setting screen in accordance with a way to set the draft in the ADF 31, which is judged by the ADF draft size detecting function.

That is, in a case where the draft setting key 87 is touched, when the ADF draft size detecting function detects the "vertically disposed" draft (step S61, YES), the CPU 51 displays, in the display section 22, the setting screen 110 (110*a* or 110*b*) for setting the direction of the image in the vertically disposed draft (step S62).

In a case where the portrait is selected as the direction of the image in the vertically disposed draft, that is, the user touches the vertically disposed portrait key 112*a* in the draft direction setting screen 110*b* (step S63, portrait), the CPU 51 sets the direction of the image in the draft to that of the portrait (step S64).

When the direction of the image in the draft is set to that of the portrait, the CPU 51 sets the graphical image corresponding to the present draft setting (step S71). In this case, as the draft setting, at least the draft size, the vertically disposed draft, and the portrait are set. Therefore, the CPU 51 sets, as the draft graphical image, a graphical image indicating at least the draft size, the vertically disposed draft, and the portrait. In this case, the CPU 51 displays the set graphical image as the draft graphical image O in the first display area 72*a* (step S72).

Moreover, in a case where the landscape is selected as the direction of the image in the vertically disposed draft, that is, the user touches the vertically disposed landscape key 112*b* in the draft direction setting screen 110*a* (step S63, landscape), the CPU 51 sets the direction of the image in the draft to that of the landscape (step S65).

When the direction of the image in the draft is set to that of the landscape, the CPU 51 sets the graphical image corresponding to the draft setting (step S71). In this case, as the draft setting, at least the draft size, the vertically disposed draft and the landscape are set. Therefore, the CPU 51 sets, as the draft graphical image O, a graphical image indicating at least the draft size, the vertically disposed draft and the landscape. In this case, the CPU 51 displays the set graphical image as the draft graphical image O in the first display area 72*a* (step S72).

Moreover, in a case where the draft setting key 87 is touched, when the ADF draft size detecting function detects the horizontally disposed draft (step S66, YES), the CPU 51 displays, in the display section 22, the setting screen 110*c* or 110*d* for setting the direction of the image in the horizontally disposed draft as shown in FIG. 11 (step S67). It is to be noted that in a case where the draft setting key 87 is touched, when the draft is horizontally disposed, the CPU 51 displays either the draft direction setting screen 110*c* or 110*d* based on default setting.

In a case where the portrait is selected as the direction of the image in the horizontally disposed draft, that is, the user touches the horizontally disposed portrait key 112*c* in the draft direction setting screen 110*d* (step S68, portrait), the CPU 51 sets the direction of the image in the draft to that of the portrait (step S69).

When the direction of the image in the draft is set to that of the portrait, the CPU 51 sets the graphical image corresponding to the present draft setting (step S71). In this case, as the draft setting, at least the draft size, the horizontally disposed draft and the portrait are set. Therefore, the CPU 51 sets, as the draft graphical image O, a graphical image indicating at least the draft size, the horizontally disposed draft and the portrait. In this case, the CPU 51 displays the set graphical image as the draft graphical image O in the first display area 72*a* (step S72).

Moreover, in a case where the landscape is selected as the direction of the image in the horizontally disposed draft, that is, the user touches the horizontally disposed landscape key 112*d* in the draft direction setting screen 110*c* (step S68, landscape), the CPU 51 sets the direction of the image in the draft to that of the landscape (step S70).

When the direction of the image in the draft is set to that of the landscape, the CPU 51 sets the graphical image corresponding to the draft setting (step S71). IN this case, as the draft setting, at least the draft size, the horizontal disposed draft and the landscape are set. Therefore, the CPU 51 sets, as the draft graphical image O, a graphical image indicating at least the draft size, the horizontally disposed draft and the landscape. When such draft graphical image O is set, the CPU 51 displays the set graphical image as the draft graphical image O in the first display area 72*a* (step S72).

Moreover, when the draft setting is changed in the step S64, S65, S69 or S70, the CPU 51 also changes the sheet setting in accordance with the change of the draft setting (step S73). For example, when the draft setting direction (vertically or horizontally disposed draft) is changed, an area of the sheet to be printed is changed as the sheet setting. This is reflected in the printed image area image of the finished graphical image P. In a case where the direction of the image in the draft (portrait or landscape) is changed, as the sheet setting, the direction of the printed image is changed to a direction corresponding to the direction of the draft image (portrait or landscape), which is set contents to be reflected in the printed image direction mark Pc of the finished graphical image P.

When the sheet setting is changed in accordance with the change of the draft setting, the CPU 51 sets the finished graphical image (step S74). When the finished graphical image P is set by this set processing, the CPU 51 displays the set finished graphical image P in the second display area 72*b* (step S75).

The processing of the steps S61 to S75 is exited until the close key 113 is touched. That is, when the user touches the close key 113 (step S76, YES), the CPU 51 closes the draft direction setting screen 110 (110*a*, 110*b*, 110*c* or 110*d*), and displays, in the display section 22, the basic screen 70*b* in which the present set contents are reflected.

Next, there will be described setting of a photocopy side.

Here, the photocopy side means the surface of the draft to be read (single-sided or double-sided) and the surface of the sheet to be printed (single-sided or double-sided). That is, photocopy side set processing sets the surface of the draft to be read (single-sided or double-sided) and the surface of the sheet to be printed (single-sided or double-sided).

Figure 14:
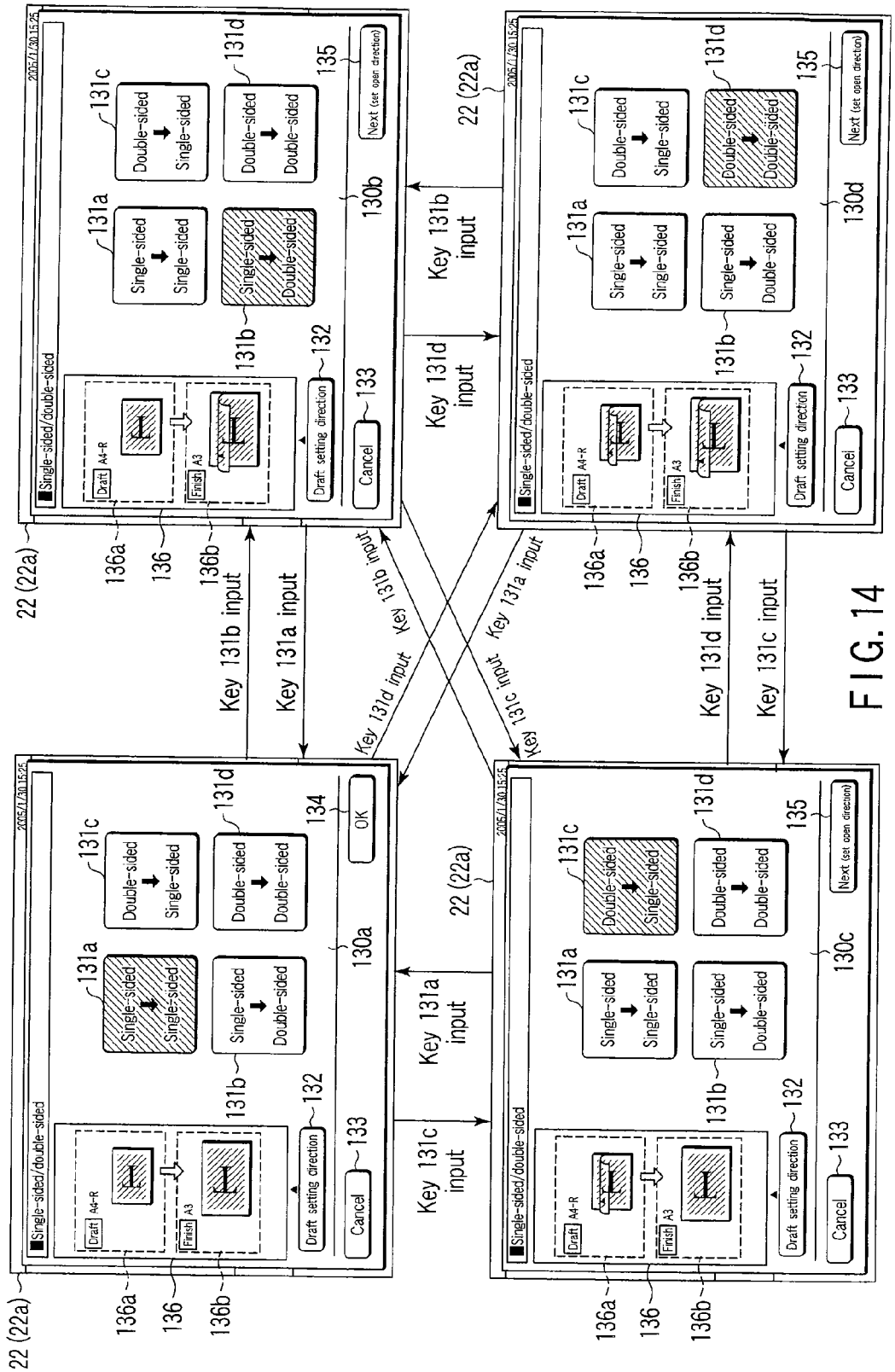
FIG. 14 is a diagram showing a display example of a photocopy side setting screen for setting a photocopy side.

FIG. 14 is a diagram showing display examples of a photocopy side setting screen 130 (130*a*, 130*b*, 130*c*, and 130*d*) for setting the photocopy side. It is to be noted that the draft setting is "A4 and horizontal" and the sheet setting is "A3 and horizontal" in the display examples of the respective photocopy side setting screens 130*a*, 130*b*, 130*c* and 130*d* shown in FIG. 14.

In the photocopy side setting screen 130, as shown in FIG. 14, there are displayed touch keys such as: a single-sided to single-sided key 131*a*; a single-sided to double-sided key 131*b*; a double-sided to single-sided key 131*c*; a double-sided to double-sided key 131*d*; a draft setting key 132; a cancel key 133; an "OK" key 134; and an "next (open direction setting)" key 135. Furthermore, the photocopy side setting screen 130 is provided with a display area 136 having a first display area 136*a* and a second display area 136*b*.

The single-sided to single-sided key 131*a* is a touch key for instructing a mode to successively photocopy an image of the single side of the draft to the single side of the sheet. The single-sided to double-sided key 131*b* is a touch key for instructing a mode to successively photocopy the image of the single side of the draft to the double sides of the sheet. The double-sided to single-sided key 131*c* is a touch key for instructing a mode to successively photocopy images of the double sides of the draft to the single side of the sheet. The double-sided to double-sided key 131*d* is a touch key for instructing a mode to successively photocopy the images of the double sides of the draft to the double sides of the sheet.

The draft setting key 132 is a key to be touched in a case where the direction of the image in the draft is set. The cancel key 133 is a key to be touched in a case where the setting of the photocopy side is stopped. The "OK" key 134 is a key to be touched in a case where the setting of the photocopy side is completed. The "next" key 135 is constituted of an icon in which "next (open direction setting)" is displayed. The open direction setting key 135 is a key to be touched in a case where an open direction of the double-sided draft or an open direction of the double-sided sheet is set.

It is to be noted that either the "OK" key 134 or the "next" key 135 is selectively displayed. That is, in a case where both of the draft setting and the sheet setting are single-sided, in the photocopy side setting screen 130, the "next" key 135 is not displayed, and the "OK" key 134 is displayed. When either the draft setting or the sheet setting is double-sided, in the photocopy side setting screen 130, the "OK" key 134 is not displayed, and the "next" key 135 is displayed.

The display area 136 has a constitution similar to that of the display area 72 of the basic screen 70. A position (upper left area in a screen) of the display area 136 in the photocopy side setting screen 130 is substantially similar to that (upper left area in a screen) of the display area 72 in the basic screen 70.

In the first display area 136*a*, the draft graphical image O and the like are displayed as information indicating the present draft setting in the same manner as in the first display area 72*a*. In the second display area 136*b*, the finished graphical image P and the like are displayed as information indicating the present sheet setting in the same manner as in the second display area 72*b*.

For example, when the draft is set to be single-sided, that is, the single-sided to single-sided key 131*a* or the single-sided to double-sided key 131*b* is selected, in the first display area 136*a*, the draft graphical image O is displayed which indicates that the draft is single-sided as shown in the photocopy side setting screen 130*a* or 130*b* of FIG. 14. When the draft is set to be double-sided, that is, the double-sided to single-sided key 131*c* or the double-sided to double-sided key 131*d* is selected, in the first display area 136*a*, the draft graphical image O is displayed which indicates that the draft is double-sided as shown in the photocopy side setting screen 130*c* or 130*d* of FIG. 14.

Moreover, in a case where a sheet (finish) is set to be single-sided, that is, the single-sided to single-sided key 131*a* or the double-sided to single-sided key 131*c* is selected, in the second display area 136*b*, the finished graphical image P is displayed which indicates that the sheet is single-sided as shown in the photocopy side setting screen 130*a* or 130*c* of FIG. 14. In a case where the sheet (finish) is set to be double-sided, that is, the single-sided to double-sided key 131*b* or the double-sided to double-sided key 131*d* is selected, in the second display area 136*b*, the finished graphical image P is displayed which indicates that the draft is double-sided as shown in the photocopy side setting screen 130*b* or 130*d* of FIG. 14.

Next, there will be described a processing example of the photocopy side set processing.

Figure 15:
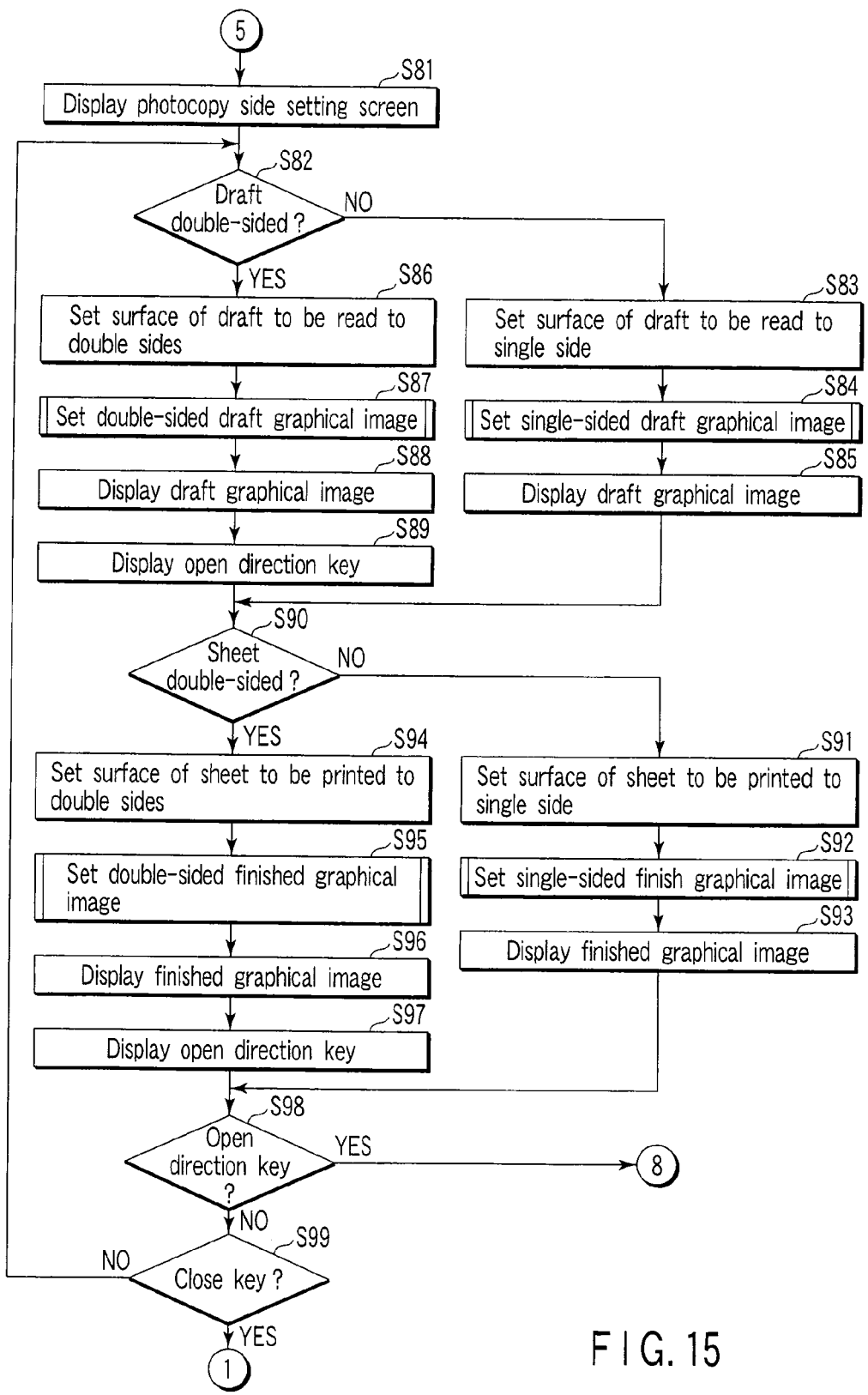
FIG. 15 is a flowchart showing a processing example of photocopy side set processing.

FIG. 15 is a flowchart showing a processing example of the photocopy side set processing in a state in which the photocopy side setting screen 130 is displayed as shown in FIG. 14.

When the single-sided/double-sided key 83 is touched in the basic screen 70, the CPU 51 of the system control unit 11 displays the photocopy side setting screen 130 in the display section 22 (step S81). For example, when the draft setting is "A4, horizontal" and the sheet setting is "A3, horizontal", the display section 22 displays the photocopy side setting screen 130 (the photocopy side setting screen 130*a*, 130*b*, 130*c* or 130*d* shown in FIG. 14 and corresponding to the present photocopy side setting) corresponding to the pressure photocopy side setting. For example, in a case where the default setting is that the draft is single-sided and the sheet is single-sided, when the single-sided/double-sided key 83 is touched in the default set state, the display section 22 displays the photocopy side setting screen 130*a*. In a state in which such photocopy side setting screen 130 is displayed, the CPU 51 sets the photocopy side in response to an input into each key.

When the single-sided to single-sided key 131a or the single-sided to double-sided key 131b is brought into the selected state (the user touches the single-sided to single-sided key 131a or the single-sided to double-sided key 131b) in the photocopy side setting screen 130c or 130d shown in FIG. 14, the CPU 51 judges that the single side is selected as the surface of the draft to be read (step S82, NO). When it is judged that the single side is selected as the surface of the draft to be read, the CPU 51 sets, as the draft setting, the surface of the draft to be read to the single side (step S83).

When the surface of the draft to be read is set to the single side, that is, the draft setting is changed, the CPU 51 sets the draft graphical image O in accordance with the present draft setting (step S84). In this case, the CPU 51 sets the single-sided graphical image as the draft graphical image O. When the draft graphical image O is set, the CPU 51 displays the set draft graphical image O in the first display area 136a (step S85).

Moreover, when the double-sided to single-sided key 131c or the double-sided to double-sided key 131d is brought into the selected state (the user touches the double-sided to single-sided key 131c or the double-sided to double-sided key 131d) in the photocopy side setting screen 130c or 130d shown in FIG. 14, the CPU 51 judges that double sides are selected as the surfaces of the draft to be read (step S82, YES). When it is judged that the double sides are selected as the surfaces of the draft to be read, the CPU 51 sets, as the draft setting, the surfaces of the draft to be read to the double sides (step S83).

When the surface of the draft to be read is set to the double sides, that is, the draft setting is changed, the CPU 51 sets the draft graphical image O in accordance with the present draft setting (step S84). In this case, the CPU 51 sets the double-sided graphical image as the draft graphical image O. When the draft graphical image O is set, the CPU 51 displays the set graphical image O in the first display area 136a (step S85).

Furthermore, when the surface of the draft to be read is set to the double sides, the CPU 51 displays the "next" key 135 as shown in the photocopy side setting screen 130c or 130d of FIG. 14 (step S86).

When the single-sided to single-sided key 131a or the double-sided to single-sided key 131c is brought into the selected state (the user touches the single-sided to single-sided key 131a or the double-sided to single-sided key 131c) in the photocopy side setting screen 130a or 130c shown in FIG. 14, the CPU 51 judges that the single side is selected as the surface of the sheet to be printed (step S90, NO). When it is judged that the single side is selected as the surface of the sheet to be printed, the CPU 51 sets, as the sheet setting, the surface of the sheet to be printed to the single side (step S91).

When the surface of the sheet to be printed is set to the single side, the CPU 51 sets the finished graphical image P in accordance with the present sheet setting (step S92). In this case, the CPU 51 sets the single-sided graphical image as the finished graphical image P by the set processing of the finished graphical image P. When the finished graphical image P is set, the CPU 51 displays the set finished sheet graphical image in the second display area 136b (step S93).

In addition, when the single-sided to double-sided key 131b or the double-sided to double-sided key 131d is brought into the selected state (the user touches the single-sided to double-sided key 131b or the double-sided to double-sided key 131d) in the photocopy side setting screen 130b or 130d shown in FIG. 14, the CPU 51 judges that the double sides are selected as the surfaces of the sheet to be printed (step S90, YES). When it is judged that the double sides are selected as the surfaces of the sheet to be printed, the CPU 51 sets, as the sheet setting, the surfaces of the sheet to be printed to the double sides (step S94).

When the surface of the sheet to be printed is set to the double sides, that is, the sheet setting is changed, the CPU 51 sets the finished graphical image P in accordance with the present sheet setting. In this case, the CPU 51 sets the double-sided graphical image as the finished sheet graphical image P by the set processing of the finished graphical image P (step S95). When the finished graphical image P is set, the CPU 51 displays the set finished graphical image P in the second display area 136b (step S96).

Furthermore, when the surface of the sheet to be printed is set to the double sides, the CPU 51 displays the "next" key 135 the screen as shown by the photocopy side setting screen 130b or 130d of FIG. 14 (step S97).

Moreover, when the "next" key 135 is touched in the photocopy side setting screen 130 in the step S89 or S97 (step S98, YES), the CPU 51 performs the open direction set processing as described later. When the cancel key 133 is touched, the CPU 51 closes the photocopy side setting screen 130 to end the photocopy side set processing, and displays the basic screen 70 in the display section 22.

Next, there will be described open direction set processing.

Figure 16:
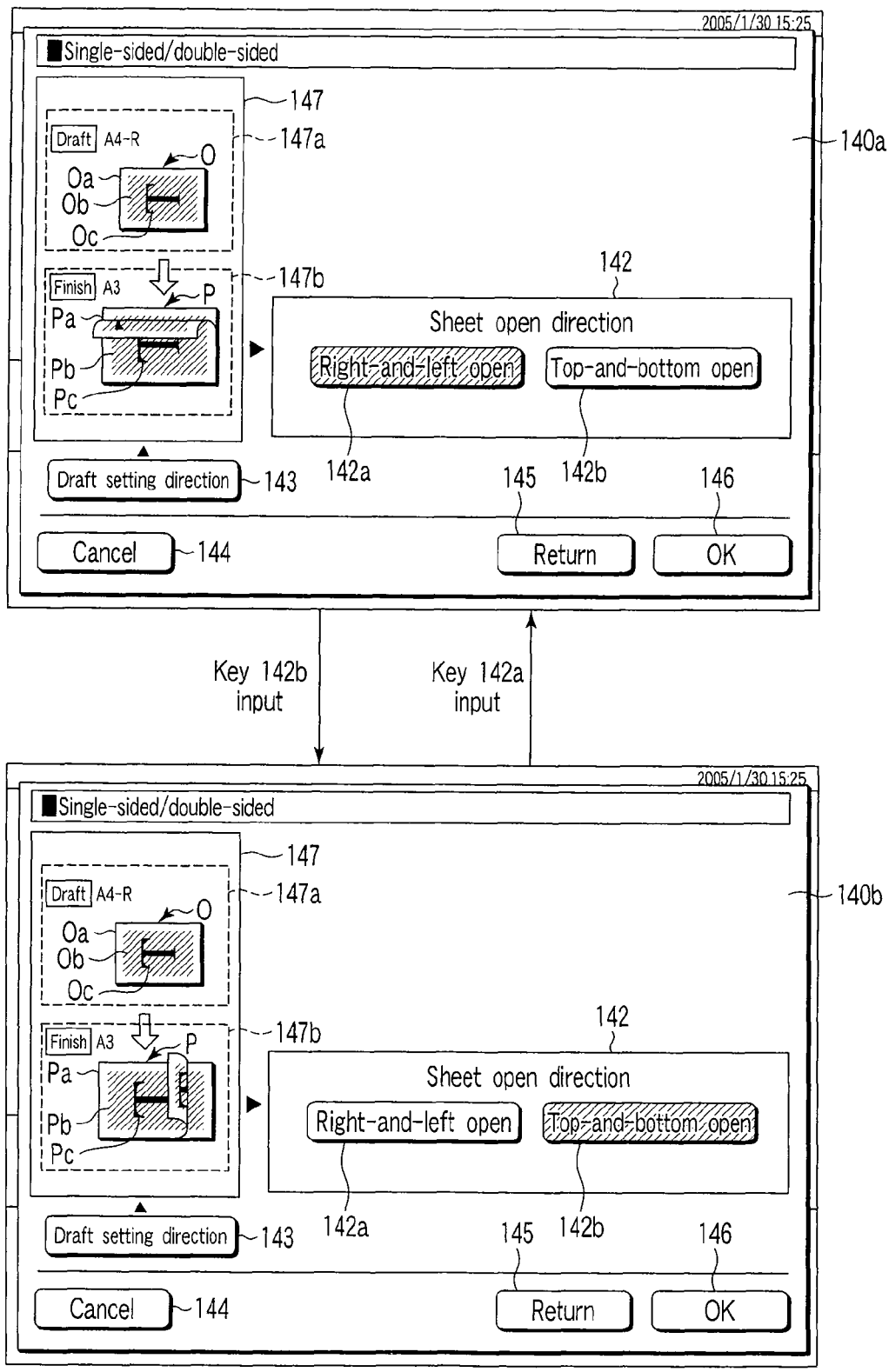
FIG. 16 is a diagram showing a display example of an open direction setting screen for setting an open direction.

FIG. 16 is a diagram showing display examples of an open direction setting screen 140 (140a, 140b) for setting an open direction. It is assumed that in FIG. 16, the draft setting is "A4, horizontal and single-sided", and the sheet setting is "A3, horizontal and double-sided".

In the display example shown in FIG. 16, the open direction setting screen 140 displays: a draft open direction setting portion 141; a sheet open direction setting portion 142; a draft setting key 143; a cancel key 144; a "return" key 145; an "OK" key 146; a display area 147 and the like.

The sheet open direction setting portion 142 is a display area for setting an open direction of a sheet which is set to be double-sided. The sheet open direction setting portion 142 is displayed only in a case where the sheet is set to be double-sided. That is, when the draft is set to be double-sided and the sheet is set to be single-sided, the sheet open direction setting portion 142 is not displayed in the open direction setting screen. The sheet open direction setting portion 142 displays a right-and-left open key 142a and a top-and-bottom open key 142b together with a guidance "sheet open direction". Furthermore, the open direction setting screen 140 displays the sheet open direction setting portion 142 which is associated with a second display area 147b where the finished (sheet) graphical image P is displayed.

The draft setting key 143 is a key to be touched in a case where the direction of the image in the draft is set in the same manner as in the draft setting key 87. The cancel key 144 is a key to be touched in a case where the setting of the photocopy side is stopped. The "return" key 145 is a key to be touched in returning to the photocopy side setting screen 130. The "OK" key 146 is a key to be touched in completing the setting of the photocopy side.

The display area 147 has a constitution similar to that of the display area 136 (or the first display area 72a). The first display area 147a displays the draft graphical image O and the like as information indicating the present draft setting in the same manner as in the first display area 136a (or the first display area 72a). The second display area 147b displays the finished graphical image P and the like as information indicating the present sheet setting in the same manner as in the second display area 136b (or the second display area 72b).

In a case where the draft (finish) open direction is set to a right-and-left open direction, that is, the right-and-left open key 142*a* is selected, the second display area 147*b* displays the finished graphical image P indicating that the sheet is right-and-left open and double-sided as shown in the open direction setting screen 140*a* of FIG. 16. When the sheet (finish) open direction is set to a top-and-bottom open direction, that is, the top-and-bottom open key 142*b* is selected, the second display area 147*b* displays the finished graphical image P indicating that the sheet is top-and-bottom open and double-sided as shown in the open direction setting screen 140*b* of FIG. 16.

It is to be noted that when the surfaces of the draft to be read are the double sides, there is displayed, in the open direction setting screen, the draft open direction setting portion for selecting the draft open direction. This draft open direction setting portion is provided with a right-and-left open key for setting the draft to be right-and-left open and a top-and-bottom open key for setting the draft to be top-and-bottom open in the same manner as in the sheet open direction setting portion 142.

That is, when the draft is set to be single-sided and the sheet is set to be double-sided, the draft open direction setting portion is not displayed, and the sheet open direction setting portion is displayed in the open direction setting screen. When the draft is set to be double-sided and the sheet is set to be single-sided, the sheet open direction setting portion is not displayed and the draft open direction setting portion is displayed in the open direction setting screen. When the draft is set to be double-sided and the sheet is set to be double-sided, both of the draft open direction setting portion and the sheet open direction setting portion are displayed in the open direction setting screen.

Next, there will be described a processing example of open direction set processing.

Figure 17:
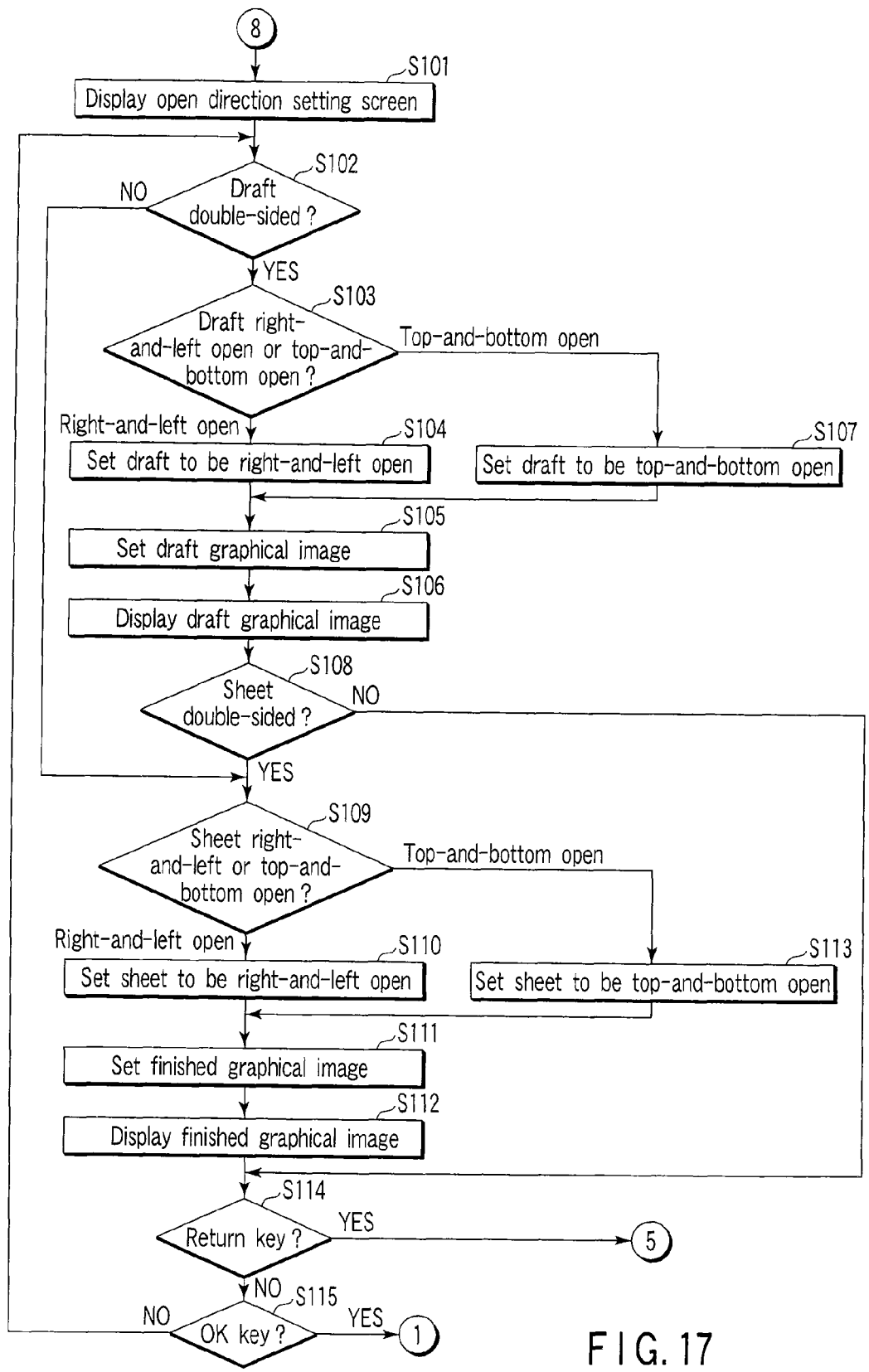
FIG. 17 is a flowchart showing a processing example of open direction set processing.

FIG. 17 is a flowchart showing a processing example of the open direction set processing in a state in which the open direction setting screen 140 is displayed as shown in FIG. 16.

In the open direction set processing, there are presumed: a case where the draft only is set to be double-sided; a case where the sheet only is set to be double-sided; and a case where both of the draft and the sheet are set to be double-sided. In the following open direction set processing, it is assumed that the user selects the draft open direction by use of a right-and-left open key (not shown) of the draft open direction setting portion (not shown) for setting the draft to be right-and-left open or a top-and-bottom open key (not shown) of the draft open direction setting portion (not shown) for setting the draft to be top-and-bottom open. It is also assumed that the user selects the sheet open direction by the right-and-left open key 142*a* or the top-and-bottom open key 142*b* of the sheet open direction setting portion 142.

When the open direction setting key 135 is touched in the photocopy side setting screen 130, the CPU 51 of the system control unit 11 displays the open direction setting screen 140 in the display section 22 (step S101). In this open direction setting screen 140, the draft open direction setting processing (not shown) is displayed in the case where the draft only is double-sided, the sheet open direction setting portion 142 is displayed in the case where the sheet only is double-sided, and both of the draft open direction setting portion (not shown) and the sheet open direction setting portion 142 are displayed in the case where both of the draft and the sheet are double-sided.

Here, in a case where the draft is set to be double-sided (step S102, YES), when the right-and-left open key is brought into a selected state in the draft open direction setting portion of the open direction setting screen, the CPU 51 judges that the right-and-left open direction is selected as the draft open direction (step S103, right-and-left open). When it is judged that the right-and-left open direction is selected as the draft open direction, the CPU 51 sets the draft open direction to the right-and-left open direction as the draft setting (step S104).

When the draft open direction is set to the right-and-left open direction, that is, the draft setting is changed, the CPU 51 sets the draft graphical image O in accordance with the present draft setting (step S105). In this case, the CPU 51 sets, as the draft graphical image O, a graphical image indicating the right-and-left open double-sided draft. When the draft graphical image O is set, the CPU 51 displays the set draft graphical image O in the first display area 147*a* (step S106).

Moreover, in a case where the draft is set to be double-sided (step S102, YES), when the top-and-bottom open key is brought into the selected state in the draft open direction setting portion of the open direction setting screen, the CPU 51 judges that the top-and-bottom open direction is selected as the draft open direction (step S103, top-and-bottom open). When it is judged that the top-and-bottom open direction is selected as the draft open direction, the CPU 51 sets the draft open direction to the top-and-bottom open direction as the draft setting (step S107).

When the draft open direction is set to the top-and-bottom open direction, that is, the draft setting is changed, the CPU 51 sets the draft graphical image O in accordance with the present draft setting (step S105). In this case, the CPU 51 sets, as the draft graphical image O, a graphical image indicating a top-and-bottom open and double-sided draft. When the draft graphical image O is set, the CPU 51 displays the set draft graphical image O in the first display area 147*a* (step S106).

Moreover, in a case where the sheet is set to be double-sided (NO in step S102 or YES in step S108), when the right-and-left open key 142*a* is brought into the selected state in the sheet open direction setting portion 142 of the open direction setting screen, the CPU 51 judges that the right-and-left open direction is selected as the sheet open direction (step S109, right-and-left open). When it is judged that the right-and-left open direction is selected as the sheet open direction, the CPU 51 sets the sheet open direction to the right-and-left open direction as the sheet setting (step S110).

When the sheet open direction is set to the right-and-left open direction, that is, the sheet setting is changed, the CPU 51 sets the finished graphical image P in accordance with the present sheet setting (step S111). In this case, the CPU 51 sets, as the finished graphical image P, a graphical image indicating a right-and-left open and double-sided sheet. When the finished graphical image P is set, the CPU 51 displays the set finished graphical image P in the second display area 147*b* (step S112).

Moreover, in a case where the sheet is set to be double-sided (NO in step ss102 or YES in step S108), when the top-and-bottom open key 142*b* is brought into the selected state in the sheet open direction setting portion 142 of the open direction setting screen, the CPU 51 judges that the top-and-bottom open direction is selected as the sheet open direction (step S109, top-and-bottom open). When it is judged that the top-and-bottom open direction is selected as the sheet open direction, the CPU 51 sets the sheet open direction to the top-and-bottom open direction as the sheet setting (step S113).

When the sheet open direction is set to the top-and-bottom open direction, that is, the sheet setting is changed, the CPU 51 sets the finished graphical, image P in accordance with the present sheet setting (step S111). In this case, the CPU 51 sets, as the finished graphical image P, a graphical image indicating a top-and-bottom open and double-sided sheet. When the finished graphical image P is set, the CPU 51 displays the set finished graphical image P in the second display area 147b (step S112).

Furthermore, when the user touches the return key 145 (step S114, YES), the CPU 51 closes the open direction setting screen 140, and returns to the step S81. In this case, the display section 22 displays the photocopy side setting screen 130 in which the set open direction is reflected. When the user touches the "OK" key 146 (step S115, YES), the CPU 51 closes the open direction setting screen, and completes the open direction set processing and the photocopy side set processing. In this case, the display section 22 displays the basic screen 70 in which the photocopy side setting and the open direction setting are reflected.

Next, there will be described staple set processing as one of the finishing functions.

Figure 18:
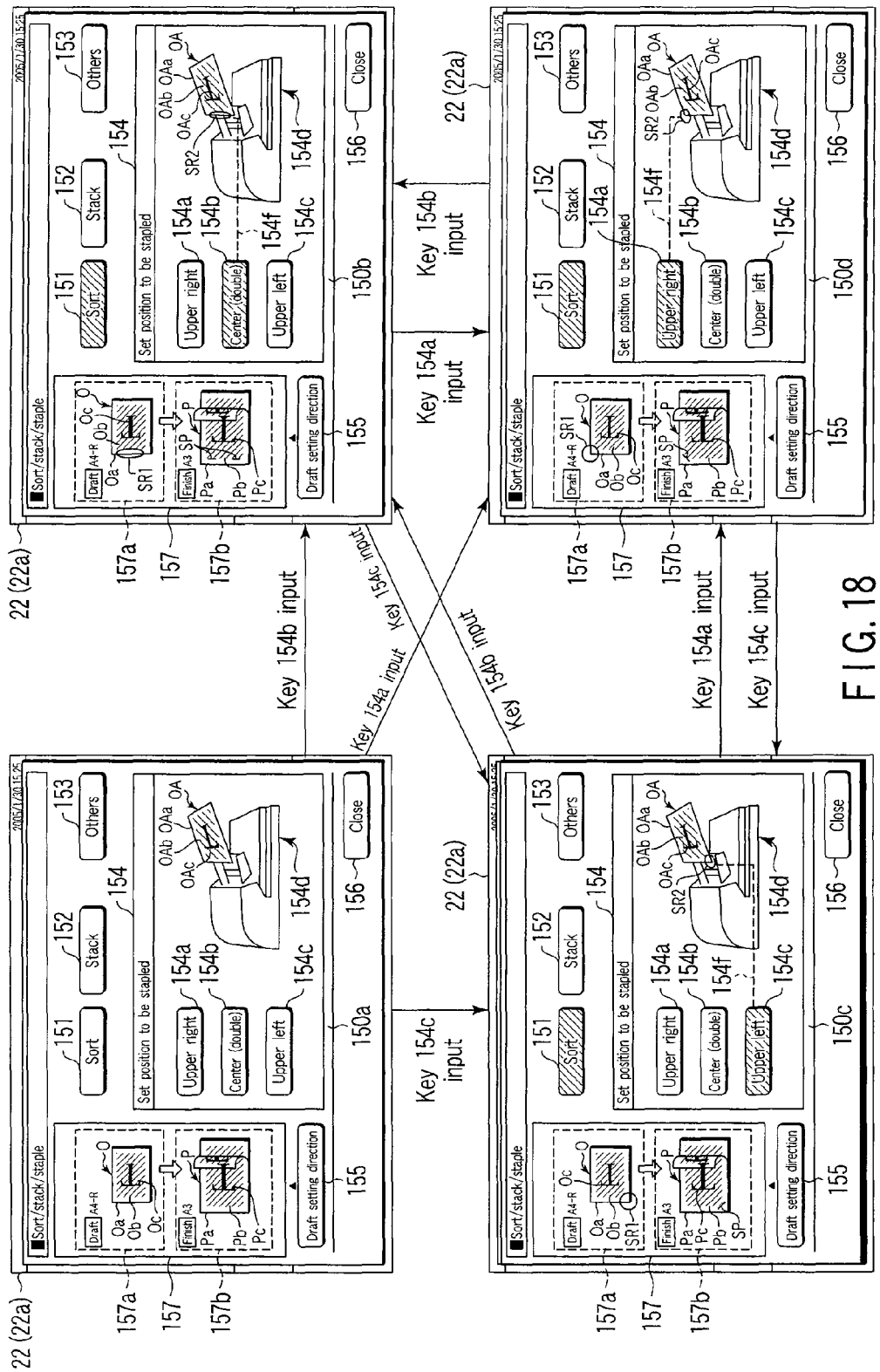
FIG. 18 is a diagram showing a display example of a finishing setting screen for performing a finishing function setting including a staple setting.

FIG. 18 is a diagram showing display examples of a finishing setting screen 150 (150a, 150b, 150c, and 150d) for performing a finishing function setting including a staple setting. FIG. 18 shows display examples of the finishing setting screens 150a, 150b, 150c, and 150d displayed in the display section 22 in a case where the draft setting is "A4, horizontal, and single-sided", and the sheet setting is "A3, horizontal, and double-sided".

In the display example shown in FIG. 18, the finishing setting screen 150 displays: a sort key 151; a stack key 152; another key 153; a staple position setting portion (staple position setting screen) 154; a draft setting key 155; a "close" key 156; a display area 157 and the like.

The sort key 151 is a key to be touched in setting a sorting function. The stack key 152 is a key to be touched in setting a stacking function. The other key 153 is a key to be touched in setting another finishing function. The draft setting key 155 is a key to be touched in setting a direction of an image in the draft in the same manner as in the draft setting key 87. The close key 156 is a key to be touched in completing the finishing setting (completing the setting of the position to be stapled).

The staple position setting portion 154 is a display area for setting the position to be stapled. The staple position setting portion 154 displays an upper right key 154a, a center (double) key 154b, and an upper left key 154c together with a guidance "staple position setting". The staple position setting portion 154 displays an ADF graphical image 154d, a draft graphical image OA, a staple region mark SR2, and a dot line 154f.

The upper right key 154a, the center (double) key 154b, and the upper left key 154c are setting keys for setting the position to be stapled. The upper right key 154a is a key to be touched in setting the vicinity of upper right to the position to be stapled with respect to the direction of the image in the sheet. The center (double) key 154b is a key to be touched in setting the vicinity of the center of an upper part of the sheet to the position to be stapled with respect to the direction of the image in the sheet. The center key 154b sets two portions to be stapled in the vicinity of the center of the upper part of the sheet with respect to the direction of the image in the sheet. The upper left key 154c is a key to be touched in setting the vicinity of upper left to the position to be stapled with respect to the direction of the image in the sheet.

The ADF graphical image 154d displays a graphical image of the ADF 31. The draft graphical image OA is superimposed and displayed on the ADF graphical image 154d. The ADF graphical image 154d and the draft graphical image OA allow the user to visually and intuitively recognize a state of the draft disposed on the ADF 31.

Moreover, the draft graphical image OA is constituted of a draft state image OAa, an image area image OAb, an image direction mark OAc and the like. The draft state image OAa is an image indicating the state of the draft disposed on the ADF 31. The image area image OAb is an image indicating an area of an image which is valid as a draft image to be printed. The image direction mark OAc is a mark indicating the direction of the image in the draft. The draft graphical image OA is set by set processing similar to that of the draft graphical image O displayed in the first display area 157a. Therefore, there is omitted detailed description of the set processing of the draft graphical image OA.

The staple region mark SR2 is superimposed and displayed on the draft graphical image OA. The staple region mark SR2 indicates a region corresponding to the position to be stapled in the draft. Therefore, the staple region mark SR2 is superimposed and displayed on a region of the draft graphical image OA corresponding to the position to be stapled.

The dot line 154f shows an association of the staple region mark SR2 with the staple position setting key (154a, 154b, or 154c). The dot line 154f is displayed to connect the selected staple position setting key to the staple region mark SR2.

It is to be noted that the position to be stapled is set in accordance with a position which can be stapled by the stapler 41. Therefore, the staple position setting portion 154 in the finishing setting screen 150 is designed in accordance with the position which can be stapled by the stapler 41. For example, when the stapler 41 can staple the upper right, the center, and the upper left, the finishing setting screen 150 is designed as shown in FIG. 18. In other words, in the finishing setting screen, the staple position setting portion 154 displays the staple position setting key in accordance with the function of the stapler 41.

The display area 157 has a constitution similar to that of the display area 72. A first display area 157a displays the draft graphical image O and the like as information indicating the present draft setting in the same manner as in the first display area 72a. A second display area 157b displays the finished graphical image P as information indicating the present sheet setting in the same manner as in the second display area 72b.

Next, there will be described a display example in accordance with a set state of the position to be stapled.

First, when the position to be stapled is set to the center, that is, the center key 154b is selected, the staple region mark SR1 is superimposed and displayed on the vicinity of the center of the upper part of the draft graphical image O with respect to the direction of the image, and the staple position marks SP are superimposed and displayed on the vicinity of the center of the upper part of the finished graphical image P with respect to the direction of the image as shown in the finishing setting screen 150b of FIG. 18. In this case, in the staple position setting portion 154, the staple region mark SR2 indicating a region corresponding to the position to be stapled in the draft is superimposed and displayed on the vicinity of the center of the upper part of the draft graphical image OA with respect to the direction of the image, and the dot line 154f is disposed to connect the center key 154b to the staple region mark SR2 by the dot line.

Next, when the position to be stapled is set to the upper left, that is, the upper left key 154c is selected, as shown in the finishing setting screen 150c of FIG. 18, the staple region mark SR1 is superimposed and displayed on the vicinity of the upper left of the draft graphical image O with respect to the direction of the image, and the staple position mark SP is superimposed and displayed on the vicinity of the upper left of the finished graphical image P with respect to the direction of the image. In this case, in the staple position setting portion 154, the staple region mark SR2 is superimposed and displayed on the vicinity of the upper left of the draft graphical image OA with respect to the direction of the image, and the dot line 154f is displayed to connect the upper left key 154c to the staple region mark SR2 by the dot line.

Next, when the position to be stapled is set to the upper right, that is, the upper right key 154a is selected, as shown in the finishing setting screen 150d of FIG. 18, the staple region mark SR1 is superimposed and displayed on the vicinity of the upper right of the draft graphical image O with respect to the direction of the image, and the staple position mark SP is superimposed and displayed on the vicinity of the upper right of the finished graphical image P with respect to the direction of the image. In this case, in the staple position setting portion 154, the staple region mark SR2 indicating the region corresponding to the position to be stapled in the draft is superimposed and displayed on the vicinity of the upper right of the draft graphical image OA with respect to the direction of the image, and the dot line 154f is disposed to connect the upper right key 154a to the staple region mark SR2 by the dot line.

In the above-described finishing setting screen, the marks indicating the positions to be stapled are displayed on the draft graphical image and the sheet graphical image. Furthermore, the mark is displayed even on the graphical image of the draft which is set in the ADF. Accordingly, the user can visually and intuitively recognize the position to be stapled, and the position to be stapled can be set as imaged.

Next, there will be described a processing example of staple set processing.

Figure 19:
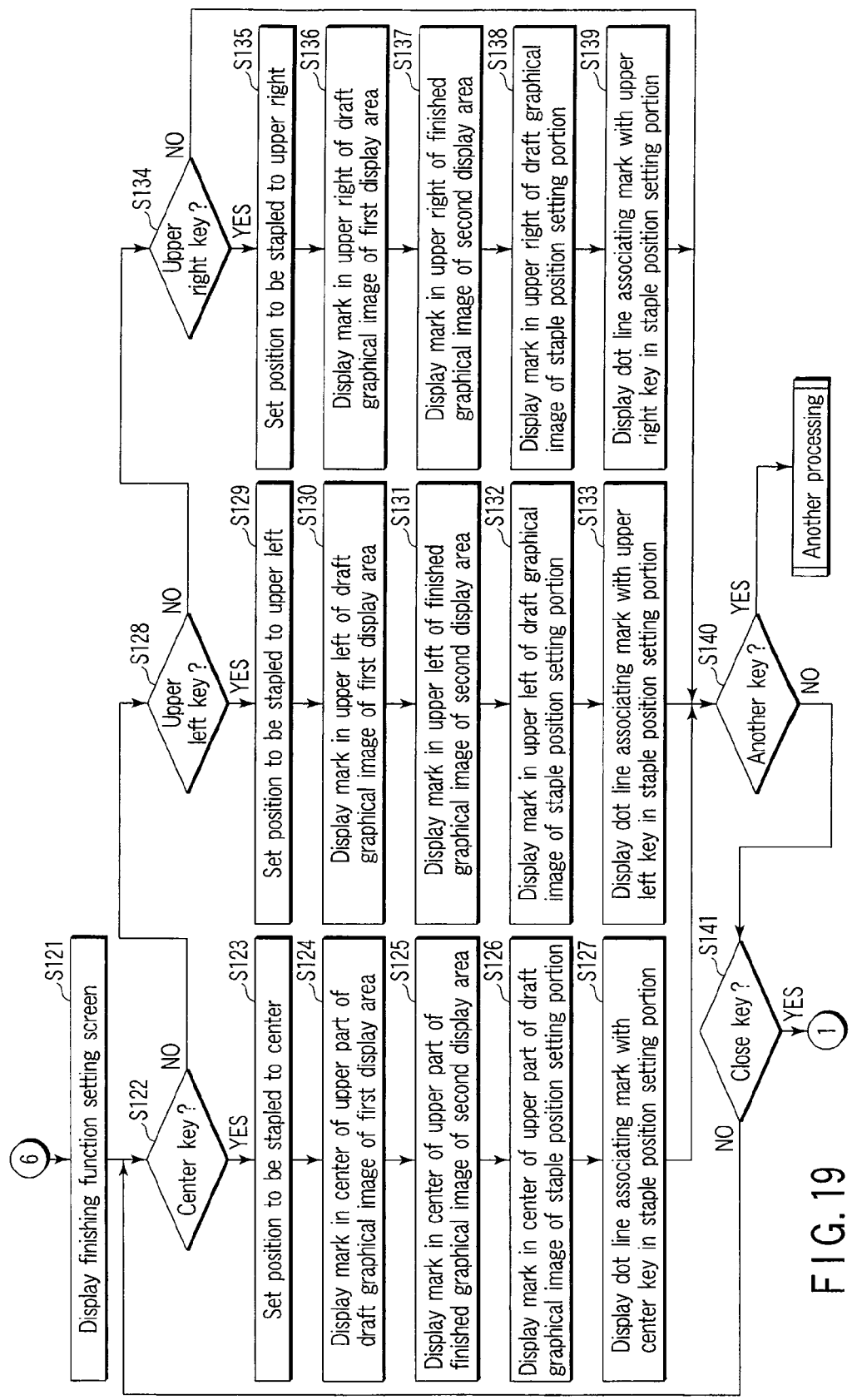
FIG. 19 is a diagram showing a display example of staple set processing.

FIG. 19 is a flowchart showing the processing example of the staple set processing.

When the finishing setting key 84 is touched in the basic screen 70, the CPU 51 of the system control unit 11 displays the finishing setting screen 150 in the display section 22 (step S121). For example, when the draft is set to be "A4, horizontal, and single-sided", and the sheet is set to be "A4, horizontal, and single-sided", the display section 22 displays the finishing setting screen 150a shown in FIG. 18.

When the center key 154b is brought into the selected state in the finishing setting screen (the user touches the center key 154b), the CPU 51 judges that the center is selected as the position to be stapled (step S122, YES). On judging that the center is selected as the position to be stapled, the CPU 51 sets the position to be stapled to the center as the staple setting (step S123).

On setting the position to be stapled to the center, the CPU 51 superimposes and displays the staple region mark SR1 on the central region of the upper part of the draft graphical image O with respect to the image direction, the mark indicating a region corresponding to the position to be stapled in the draft (step S124). The CPU 51 superimposes and displays the staple position mark SP on the center of the upper part of the finished graphical image P with respect to the image direction, the mark indicating the position to be stapled in the sheet (step S125). In the staple position setting portion 154, the CPU 51 superimposes and displays the staple region mark SR2 on the upper central region of the draft graphical image OA with respect to the image direction, the mark indicating a region corresponding to the position to be stapled in the draft (step S126). Furthermore, in the staple position setting portion 154, the CPU 51 displays the dot line 154f which connects the staple region mark SR2 to the center key 154b (step S127).

Moreover, when the upper left key 154c is brought into the selected state (the user touches the upper left key 154c), the CPU 51 judges that the upper left is selected as the position to be stapled (step S128, YES). On judging that the upper left is selected as the position to be stapled, the CPU 51 sets the position to be stapled to the upper left as the staple setting (step S129).

On setting the position to be stapled to the upper left, the CPU 51 superimposes and displays the staple region mark SR1 on the upper left region of the draft graphical image O with respect to the image direction, the mark indicating the region corresponding to the position to be stapled in the draft (step S130). The CPU 51 superimposes and displays the staple position mark SP on the upper left position of the finished graphical image P with respect to the image direction, the mark indicating the position to be stapled in the sheet (step S131). In the staple position setting portion 154, the CPU 51 superimposes and displays the staple region mark SR2 on the upper left region of the draft graphical image OA with respect to the image direction, the mark indicating the region corresponding to the position to be stapled in the draft (step S132). Furthermore, in the staple position setting portion 154, the CPU 51 displays the dot line 154f which connects the selected upper left key 154c to the staple region mark SR2 superimposed and displayed on the draft graphical image OA (step S133).

Moreover, when the upper right key 154a is brought into the selected state (the user touches the upper right key 154a), the CPU 51 judges that the upper right is selected as the position to be stapled (step S134, YES). On judging that the upper right is selected as the position to be stapled, the CPU 51 sets the position to be stapled to the upper right as the staple setting (step S135).

On setting the position to be stapled to the upper right, the CPU 51 superimposes and displays the staple region mark SR1 on the upper right region of the draft graphical image O with respect to the image direction, the mark indicating the region corresponding to the position to be stapled in the draft (step S136). The CPU 51 superimposes and displays the staple position mark SP on the upper right position of the finished graphical image P with respect to the image direction, the mark indicating the position to be stapled in the sheet (step S137). In the staple position setting portion 154, the CPU 51 superimposes and displays the staple region mark SR2 on the upper right region of the draft graphical image OA with respect to the image direction, the mark indicating the region corresponding to the position to be stapled in the draft (step S138). Furthermore, in the staple position setting portion 154, the CPU 51 displays the dot line 154f which connects the staple region mark SR2 to the selected upper right key 154a (step S139).

Furthermore, when the user touches a key such as the sort key 151, the stack key 152 or the other key 153 in the finishing setting screen 150 (step S140, YES), the CPU 51 performs various types of processing in response to the input key. When the user touches the return key 145 (step S141, YES), the CPU 51 closes the finishing setting screen 150. In this case, the CPU 51 completes the finishing set (staple set) processing, and displays, in the display section 22, the basic screen 70 in which the set contents of the set finishing function are reflected.

The finishing setting screen 150 displays the draft graphical image O in accordance with the draft setting, the finished graphical image P in accordance with the sheet setting, and the graphical image OA of the draft set in the ADF. When the user designates the position to be stapled in such finishing setting screen 150, the staple region mark SR1 is superimposed and displayed on the region corresponding to the position to be stapled in the draft graphical image O in accordance with the draft setting. The staple position mark SP is superimposed and displayed on a position corresponding to the position to be stapled in the finished graphical image in accordance with the sheet setting, and the staple region mark SR1 is superimposed and displayed on the region corresponding to the position to be stapled in the graphical image of the draft set in the ADF.

Accordingly, the user can check the position to be stapled in three portions: the draft graphical image; the finished graphical image; and the graphical image of the draft set in the ADF. As a result, there can be provided a user interface capable of precisely and easily checking the setting of the position to be stapled.

Next, there will be described setting of Nin1 photocopy.

Here, Nin1 photocopy is a mode to photocopy a plurality of pages (N pages) of images on one side of one sheet. The Nin1 photocopy includes modes of 2in1, 4in1, 8in1 and the like. In the following description, the setting of 2in1 photocopy will be described as an example of the Nin1 photocopy.

Figure 20:
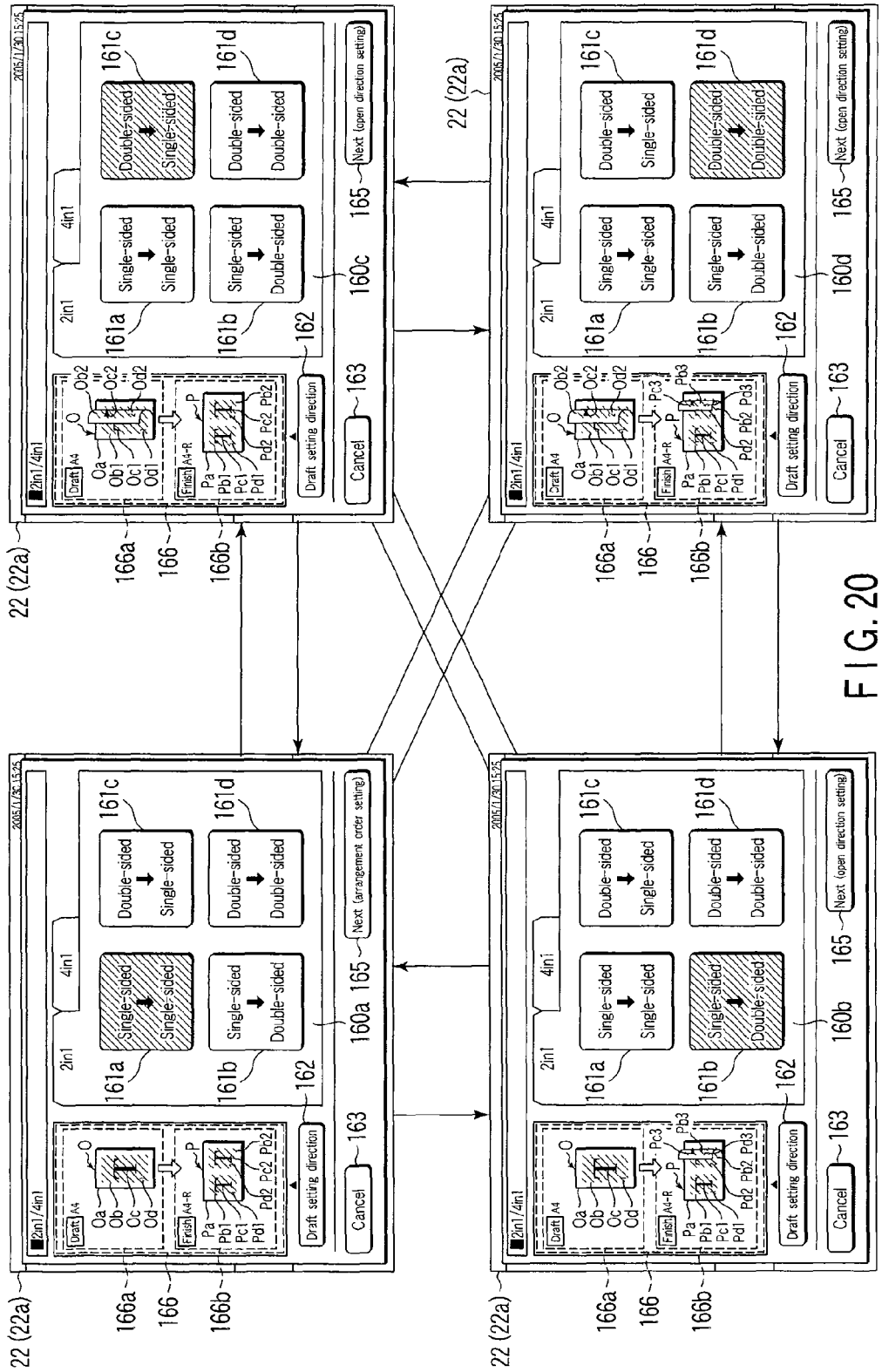
FIG. 20 is a diagram showing a display example of an Nin1 setting screen.

FIG. 20 is a diagram showing display examples of an Nin1 setting screen 160 (160a, 160b, 160c, and 160d) to be displayed in a case where an Nin1 key is input. It is to be noted that in each of the display examples of the Nin1 setting screens 160a, 160b, 160c and 160d shown in FIG. 20, it is assumed that the draft setting is "A4, horizontal", and the sheet setting is "automatic sheet".

As shown in FIG. 20, a 2in1 tab and a 4in1 tab are displayed in the Nin1 setting screen 160. To select the 2in1 photocopy, the 2in1 tab is touched. To select the 4in1 photocopy, the 4in1 tab is touched. It is to be noted that FIG. 20 shows a display example of an Nin1 (2in1) setting screen 160 in a state in which the 2in1 tab is selected. As shown in FIG. 20, the Nin1 setting screen 160 displays touch keys such as a single-sided to single-sided key 161a, a single-sided to double-sided key 161b, a double-sided to single-sided key 161c, a double-sided to double-sided key 161d, a draft setting key 162, a cancel key 163 and a "next" key 165. Furthermore, the Nin1 setting screen 160 is provided with a display area 166 having a first display area 166a and a second display area 166b.

The single-sided to single-sided key 161a, the single-sided to double-sided key 161b, the double-sided to single-sided key 161c and the double-sided to double-sided key 161d are similar to the single-sided to single-sided key 131a, the single-sided to double-sided key 131b, the double-sided to single-sided key 131c and the double-sided to double-sided key 131d of the photocopy side setting screen 130, respectively. That is, the single-sided to single-sided key 161a, the single-sided to double-sided key 161b, the double-sided to single-sided key 161c and the double-sided to double-sided key 161d are keys for the user to indicate the surface of the draft to be read and the surface of the sheet to be printed.

Moreover, the draft setting key 162 is a key to be touched in a case where the direction of the image in the draft is set in the same manner as in the draft setting key 132. When the draft setting key 162 is touched, the display section 22 displays the draft direction setting screen 110 as a popup screen on the Nin1 setting screen 160. The cancel key 163 is a key to be touched in a case where the Nin1 setting is discontinued.

The "next" key 165 is constituted of an icon in which "next (open direction setting)" or "next (arrangement order setting)" is displayed. The "next" key 165 is a key to be touched in a case where an arrangement order of images in the sheet, an open direction of the double-sided draft or an open direction of the double-sided sheet is set.

It is to be noted that as the "next" key 165, there is selectively displayed the icon in which "next (open direction setting)" or "next (arrangement order setting)". That is, in a case where both of the draft setting and the sheet setting are single-sided, the Nin1 setting screen 160 displays, as the "next" key 165, the icon in which "next (arrangement order setting)" is displayed. In a case where one of the draft setting and the sheet setting is double-sided, the Nin1 setting screen 160 displays, as the "next" key 165, the icon in which "next (open direction setting)" is displayed.

The display area 166 has a constitution similar to that of the display area 72 of the basic screen 70. A position (upper left area of the screen) of the display area 166 of the Nin1 setting screen 160 is substantially similar to a position (upper left area of the screen) of the display area 72 of the basic screen 70.

The first display area 166a displays the draft graphical image O and the like as information indicating the present draft setting in the same manner as in the first display area 72a. The second display area 166b displays the finished graphical image P and the like as information indicating the present sheet setting in the same manner as in the second display area 72b.

For example, in a case where the draft is set to be single-sided, that is, the single-sided to single-sided key 161a or the single-sided to double-sided key 161b is selected, the first display area 166a displays the draft graphical image O indicating that the draft is single-sided as shown in the 2in1 setting screen 160a or 160b of FIG. 20. In a case where the draft is set to be double-sided, that is, the double-sided to single-sided key 161c or the double-sided to double-sided key 161d is selected, the first display area 166a displays the draft graphical image O indicating that the draft is double-sided as shown in the 2in1 setting screen 160c or 160d of FIG. 20.

Moreover, in a case where the sheet (finish) is set to be single-sided, that is, the single-sided to single-sided key 161a or the double-sided to single-sided key 161c is selected, the second display area 166b displays the finished graphical image P indicating that the sheet is single-sided as shown in the 2in1 setting screen 160a or 160c of FIG. 20. In a case where the sheet (finish) is set to be double-sided, that is, the single-sided to double-sided key 161b or the double-sided to double-sided key 161d is selected, the second display area 166b displays the finished graphical image P indicating that the sheet is double-sided as shown in the 2in1 setting screen 160b or 160d of FIG. 20.

Furthermore, in a case where the Nin1 photocopy is set, in the draft graphical image O, a character (numeral) indicating a page number is displayed together with the image direction mark Oc in the draft image area image Ob.

For example, in a case where the draft setting is single-sided in the 2in1 photocopy, as shown in the 2in1 setting screens 160a and 160c of FIG. 20, the draft graphical image O displays the draft image area image Ob of a first page on a surface image of the draft state image Oa of the first page. The draft image area image Ob displays "1" as a numeral Od indicating the page number together with the image direction mark Oc.

Moreover, in a case where the draft setting is double-sided in the 2in1 photocopy, as shown in the 2in1 setting screens 160b and 160d of FIG. 20, the draft graphical image O displays a draft image area image Ob1 on the surface image of the draft state image Oa of the first page. A draft image area image Ob2 is displayed on a back-surface image of the first-page draft state image Oa. Furthermore, the draft image area images Ob1 and Ob2 display "1" and "2" as numerals Od1 and Od2 indicating the page numbers together with image direction marks Pc1 and Pc2, respectively.

Furthermore, in the Nin1 photocopy, the finished graphical image P displays N printed image area images Pb1, . . . , PbN in one sheet state image Pa. The printed image area images Pb1, . . . , PbN display characters (numerals) Pd1, . . . PdN indicating the page numbers corresponding to draft page numbers together with image direction marks Pc1, . . . , PcN, respectively.

For example, in a case where the sheet setting is single-sided in the 2in1 photocopy, as shown in the 2in1 setting screens 160a and 160b of FIG. 20, the finished graphical image P displays two printed image area images Pb1 and Pb2 in one sheet state image Pa. Furthermore, the printed image area images Pb1 and Pb2 display "1" and "12" as numerals Pd1 and Pd2 indicating page numbers together with image direction marks Pc1 and Pc2, respectively.

Moreover, in a case where the sheet setting is double-sided in the 2in1 photocopy, as shown in the 2in1 setting screens 160c and 160d of FIG. 20, the finished graphical image P displays two printed image area images Pb1 and Pb2 on the surface image of one sheet state image Pa. One printed image area image Pb3 is displayed on the back-surface image of the first-page sheet state image Pa. Furthermore, the printed image area images Pb1, Pb2 and Pb3 display "1", "2" and "3" as numerals Pd1, Pd2 and Pd3 indicating the page numbers together with image direction marks Pc1, Pc2 and Pc3, respectively.

It is to be noted that in the sheet state image Pa shown in FIG. 20, an image of a back surface can be displayed in an approximately ¼ area only. Therefore, the first-page sheet state image Pa displays, as the graphical image of the back surface, a part of the printed image area image Pb3 corresponding to one of two images to be printed on the back surface.

It is to be noted that in a state in which the Nin1 setting screen is displayed as shown in FIG. 20, the photocopy side set processing is realized by a procedure similar to that of the photocopy side set processing described with reference to FIG. 15.

Next, there will be described a display example of a draft setting screen in a case where the draft setting key 162 is touched in the Nin1 setting screen 160.

Figure 21:
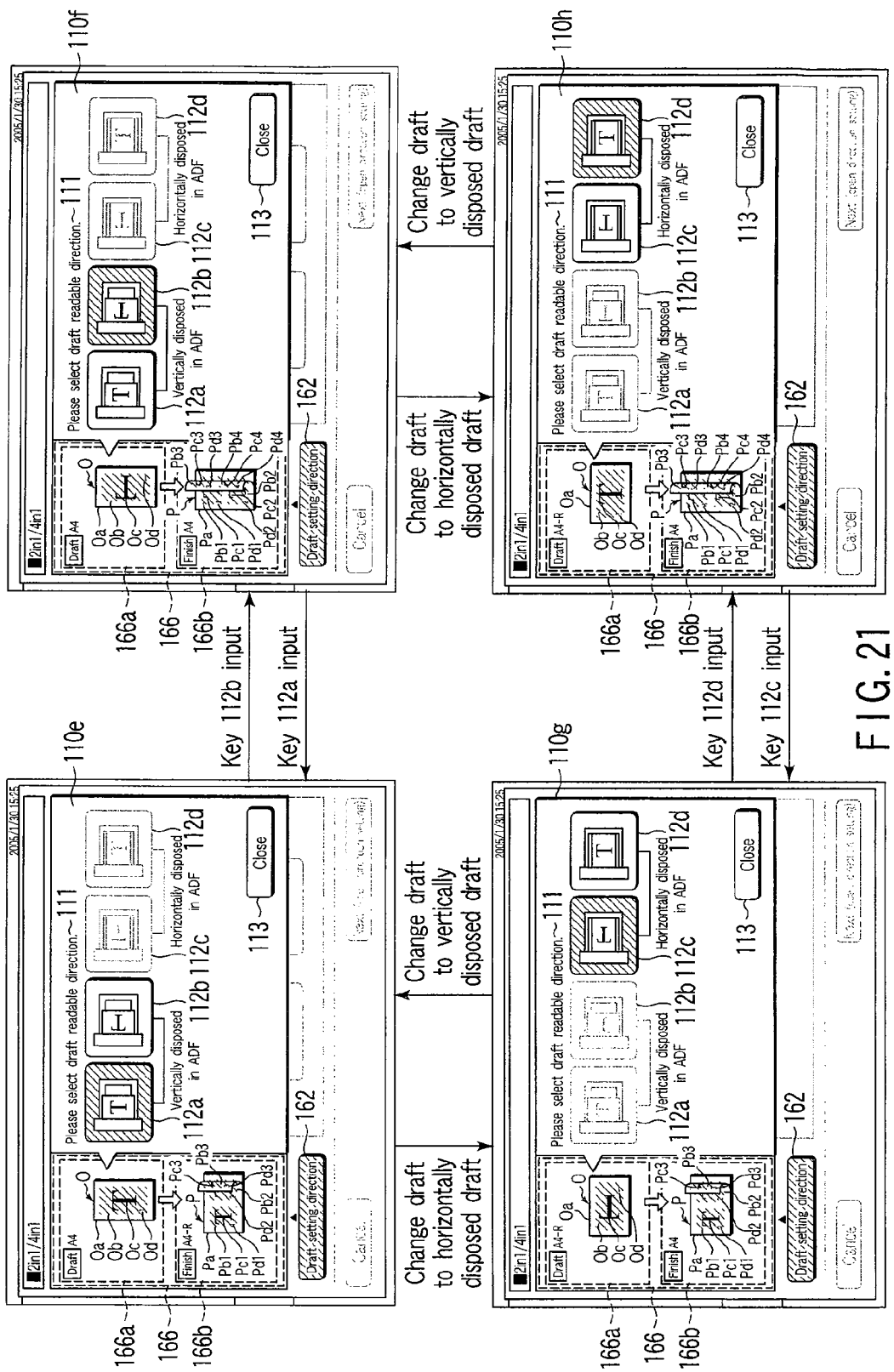
FIG. 21 is a diagram showing a display example of an open direction setting screen in a state in which Nin1 is set.

FIG. 21 shows a display example of the draft direction setting screen 110 to be displayed in a case where the draft setting key 162 is touched in the 2in1 photocopy setting screen 160b shown in FIG. 20. FIG. 21 is a diagram showing a display example of the draft direction setting screen 110 in a case where the ADF draft size detecting function is valid. It is to be noted that the draft direction setting screen 110 shown in FIG. 21 has a constitution similar to that of the draft direction setting screen 110 shown in FIG. 10 or 11.

FIG. 21 shows draft direction setting screens 110e and 110f as display examples in a case where the ADF draft size detecting function detects an "A4 vertical (vertically disposed)" draft. FIG. 21 shows draft direction setting screens 110g and 110h as display examples in a case where the ADF draft size detecting function detects an "A4 horizontal (horizontally disposed)" draft.

As shown in FIG. 21, the draft direction setting screen 110 (110e, 110f, 110g, or 110h) is displayed as a popup window in a partial area of the Nin1 setting screen 160. In the display example shown in FIG. 21, the draft direction setting screen 110 is displayed as the popup window to achieve a state in which the first display area 166a, the second display area 166b and the draft setting key 162 of the Nin1 setting screen 160 remain to be displayed. In a state in which the draft direction setting screen 110 is displayed, a portion other than the display area 166 and the draft setting key 162 of the Nin1 setting screen 160 is displayed to be thin in a non-selectable state (whiteout). When the close key 113 is touched, the draft direction setting screen 110 shown in FIG. 21 is closed. In this case, the display section 22 displays the Nin1 setting screen 160 in which the set contents have been reflected.

It is to be noted that in a case where the ADF draft size detecting function is invalid, the draft direction setting screen shown in FIG. 12 may be displayed as a popup window in the Nin1 setting screen 160 in the same manner as in FIG. 21.

The draft direction setting screen 110 is associated and displayed with the first display area 166a by symbols, graphics or the like. This means that the draft direction setting screen 110 displays the draft setting. The first display area 166a displays the draft graphical image O in accordance with the draft setting. The second display area 166b displays the finished graphical image P in accordance with the sheet setting.

In FIG. 21, the draft direction setting screen 11e shows a display example in a case where an "A4" draft is "vertically disposed" in the ADF 31, and the vertically disposed portrait key 112a is selected. This draft direction setting screen 110e displays, in the first display area 166a, the draft graphical image O indicating "A4, vertically disposed, portrait, and single-sided". In this case, since 2in1 is further set, "1" is displayed as the numeral Od indicating the image page number in the image area image Ob of the draft graphical image O.

Moreover, the draft direction setting screen 110e displays, in the second display area 166b, the finished graphical image P indicating "A3, horizontal, and double-sided" in association with the draft graphical image O. In this case, since 2in1 is further set, the finished graphical image P displays two printed image area images Pb1, Pb2 on the surface of the finished graphical image, and displays the printed image area image Pb3 on the back surface of the finished graphical image in the same manner as in the Nin1 setting screen 160b of FIG. 20. In these printed image area images Pb1, Pb2 and Pb3, there are displayed "1", "2" and "3" as the numerals Pd1, Pd2 and Pd3 indicating the image page numbers, respectively.

It is to be noted that in the draft direction setting screen 110e, an "A4 horizontal" sheet is set as a sheet to be 2in1-photocopied with respect to the "A4 vertical portrait" draft. Furthermore, it is assumed that in the draft direction setting screen 110e, a finish open direction is "right-and-left open", and an image arrangement order is "from the left".

In FIG. 21, the draft direction setting screen 110f shows a display example in a case where the "A4" draft is "vertically disposed" in the ADF 31, and the vertically disposed landscape key 112b is brought into a selected state. In this draft direction setting screen 110f, the first display area 166a displays the draft graphical image O indicating "A4, vertically disposed, landscape, and single-sided". In this case, since 2in1 is further set, "1" is displayed as the numeral Od indicating the image page number in the image area image Ob of the draft graphical image O.

Moreover, the draft direction setting screen 110f displays, in the second display area 166b, the finished graphical image P indicating "A4, vertical, and double-sided" in association with the draft graphical image O. In this case, since 2in1 is further set, the finished graphical image P displays two printed image area images Pb1, Pb2 on the surface of the finished graphical image, and displays two printed image area images Pb3, Pb4 on the back surface of the finished graphical image. In these printed image area images Pb1, Pb2, Pb3 and Pb4, there are displayed "1", "2", "3" and "4" as the numerals Pd1, Pd2, Pd3 and Pd4 indicating the image page numbers, respectively.

It is to be noted that in the draft direction setting screen 110f, the "A4 horizontal" sheet is set as the sheet to be 2in1-photocopied with respect to the "A4 vertical landscape" draft. Furthermore, it is assumed that in the draft direction setting screen 110*f*, the finish open direction is "right-and-left open", and the image arrangement order is "from above".

In FIG. 21, the draft direction setting screen 110*g* shows a display example in a case where the "A4" draft is "vertically disposed" in the ADF 31, and the horizontally disposed portrait key 112*c* is brought into a selected state. In this draft direction setting screen 110*g*, the first display area 166*a* displays the draft graphical image O indicating "A4, horizontally disposed, portrait, and single-sided". In this case, since 2in1 is further set, "1" is displayed as the numeral Od indicating the image page number in the image area image Ob of the draft graphical image O.

Moreover, the draft direction setting screen 110*g* displays, in the second display area 166*b*, the finished graphical image P indicating "A4, horizontal, and double-sided" in association with the draft graphical image O. In this case, since 2in1 is further set, the finished graphical image P displays two printed image area images Pb1, Pb2 on the surface of the finished graphical image, and displays the printed image area image Pb3 on the back surface of the finished graphical image in the same manner as in the Nin1 setting screen 160*b* of FIG. 20. In these printed image area images Pb1, Pb2 and Pb3, there are displayed "1", "2" and "3" as the numerals Pd1, Pd2 and Pd3 indicating the image page numbers, respectively.

It is to be noted that in the draft direction setting screen 110*g*, the "A4 horizontal" sheet is set as the sheet to be 2in1-photocopied with respect to the "A4 horizontal portrait" draft. Furthermore, it is assumed that in the draft direction setting screen 110*g*, the finish open direction is "right-and-left open", and the image arrangement order is "from the left".

In FIG. 21, the draft direction setting screen 110*h* shows a display example in a case where the "A4" draft is "horizontally disposed" in the ADF 31, and the horizontally disposed landscape key 112*d* is brought into a selected state. In this draft direction setting screen 110*h*, the first display area 166*a* displays the draft graphical image O indicating "A4, horizontally disposed, landscape, and single-sided". In this case, since 2in1 is further set, "1" is displayed as the numeral Od indicating the image page number in the image area image Ob of the draft graphical image O.

Moreover, the draft direction setting screen 110*h* displays, in the second display area 166*b*, the finished graphical image P indicating "A4, vertical, and double-sided" in association with the draft graphical image O. In this case, since 2in1 is further set, the finished graphical image P displays two printed image area images Pb1, Pb2 on the surface of the image, and displays two printed image area images Pb3, Pb4 on the back surface of the image. In these printed image area images Pb1, Pb2, Pb3 and Pb4, there are displayed "1", "2", "3" and "4" as the numerals Pd1, Pd2, Pd3 and Pd4 indicating the image page numbers, respectively.

It is to be noted that in the draft direction setting screen 110*h*, the "A4 vertical" sheet is set as the sheet to be 2in1-photocopied with respect to the "A4 horizontal landscape" draft. Furthermore, it is assumed that in the draft direction setting screen 110*h*, the finish open direction is "right-and-left open", and the image arrangement order is "from above".

It is to be noted that in a state in which the Nin1 draft direction setting screen is displayed as shown in FIG. 21, the draft direction set processing is realized by a procedure similar to that of the draft direction set processing described with reference to FIG. 13.

Next, there will be described a display example of a draft setting screen in a case where the draft setting key 162 is touched in the Nin1 setting screen 160.

Figure 22:
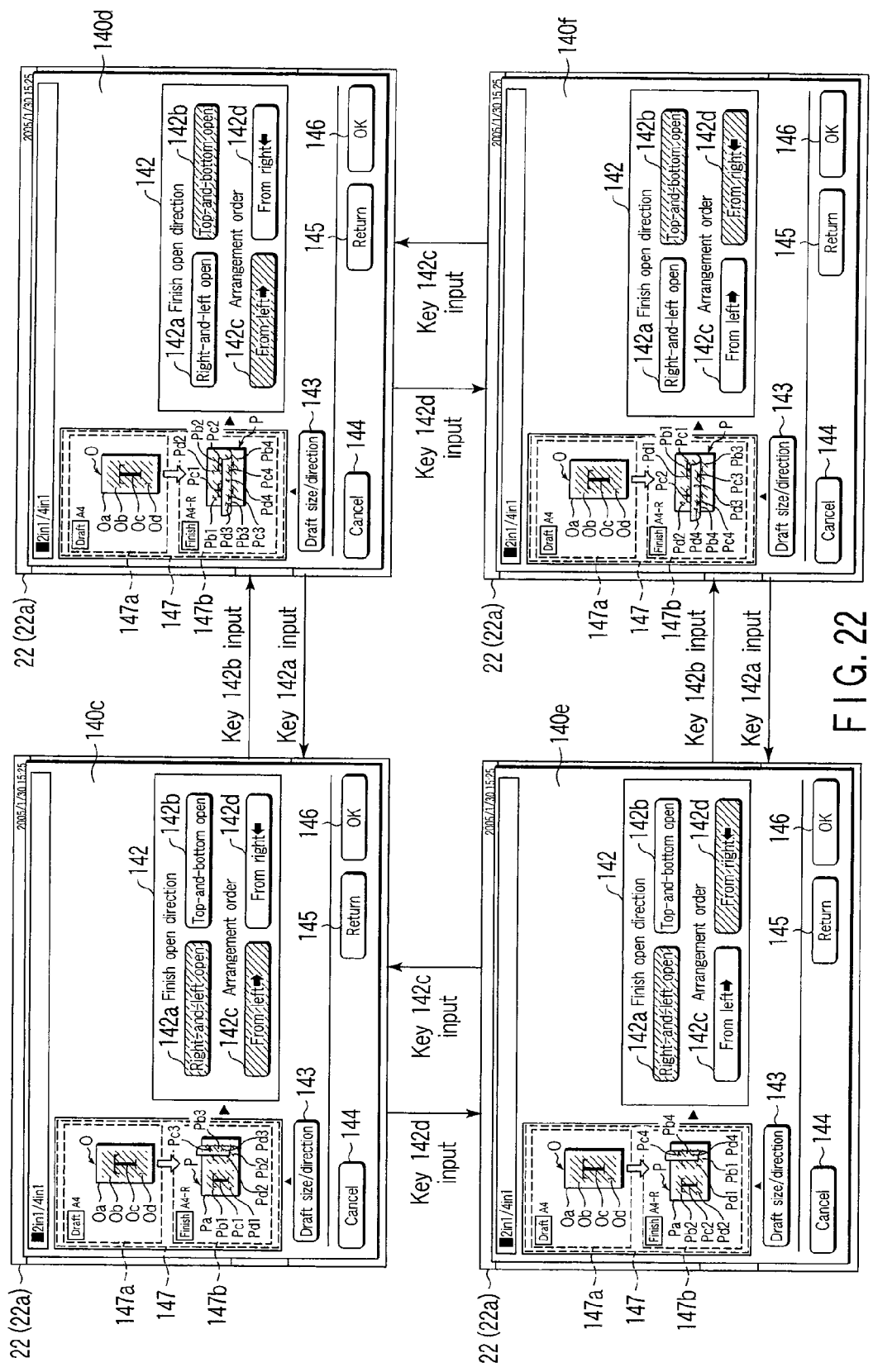
FIG. 22 is a diagram showing a display example of an open direction and arrangement order setting screen in a state in which Nin1 is set.

FIG. 22 shows a display example of an open direction and arrangement order setting screen 170 to be displayed in a case where the "next" key 165 is touched in the 2in1 photocopy setting screen 160*b* shown in FIG. 20. FIG. 22 is a diagram showing a display example of the draft direction setting screen 110 in a case where the ADF draft size detecting function is valid. It is to be noted that the open direction and arrangement order setting screen 170 shown in FIG. 22 has a layout similar to that of the open direction setting screen 140 shown in FIG. 16. The setting screen 170 shown in FIG. 22 has a constitution in which a "from left" key 142*c* and a "from right" key 142*d* are added as keys for selecting an arrangement order to the sheet open direction setting portion 142 of the open direction setting screen 140 shown in FIG. 16.

That is, in the display example shown in FIG. 22, the sheet open direction setting portion 142 sets the open direction of the sheet set to be double-sided, and an arrangement order of two images to be printed on one surface of the sheet. It is to be noted that in a case where the sheet is set to be single-sided, the sheet open direction setting portion 142 is constituted of the only keys (e.g., the "from left" key 142*c* and the "from right" key 142*d*) for selecting the arrangement order of two images to be printed on one surface of the sheet.

In the open direction setting screen 140 shown in FIG. 22, the sheet open direction setting portion 142 displays a "right-and-left open" key 142*a* and a "top-and-bottom" open key 142*b* together with a guidance "finish open direction", and further displays the "from left" key 142*c* and the "from right" key 142*d* together with a guidance "arrangement order".

Moreover, as described above, in the open direction setting screen 140, a first display area 147*a* displays a draft graphical image O and the like as information indicating the present draft setting, and a second display area 147*b* displays a finished graphical image P and the like as information indicating the present sheet setting.

For example, in a case where the sheet (finish) open direction is set to a right-and-left open direction, and the arrangement order is set to an order "from the left", that is, the "right-and-left open" key 142*a* and the "from left" key 142*c* are selected, the second display area 147*b* displays the finished graphical image P indicating that the sheet is right-and-left open and double-sided and that the image is arranged from the left as shown in an open direction setting screen 140*c* of FIG. 22.

Moreover, in a case where the sheet (finish) open direction is set to a top-and-bottom open direction, and the arrangement order is set to the order "from the left", that is, the "top-and-bottom" open key 142*b* and the "from left" key 142*c* are selected, the second display area 147*b* displays the finished graphical image P indicating that the sheet is top-and-bottom open and double-sided and that the image is arranged from the left as shown in an open direction setting screen 140*d* of FIG. 22.

Furthermore, in a case where the sheet (finish) open direction is set to the right-and-left open direction, and the arrangement order is set to an order "from the right", that is, the "right-and-left open" key 142*a* and the "from right" key 142*d* are selected, the second display area 147*b* displays the finished graphical image P indicating that the sheet is right-and-left open and double-sided and that the image is arranged from the right as shown in an open direction setting screen 140*e* of FIG. 22.

In addition, in a case where the sheet (finish) open direction is set to the top-and-bottom open direction, and the arrangement order is set to the order "from the right", that is, the "top-and-bottom" open key 142*b* and the "from right" key 142*d* are selected, the second display area 147*b* displays the finished graphical image P indicating that the sheet is topand-bottom open and double-sided and that the image is arranged from the right as shown in an open direction setting screen 140f of FIG. 22.

It is to be noted that in a state in which the Nin1 open direction setting screen is displayed as shown in FIG. 22, open direction set processing is realized by setting the arrangement order in response to an input into the key (the "from right" key or the "from left" key) for setting the arrangement order, in addition to the open direction set processing described with reference to FIG. 17.

As shown in the display examples of FIGS. 20, 21 and 22, in a setting screen such as the Nin1 photocopy setting screen in which it is not easy to imagine the finish, there are displayed a pair of the draft graphical image and the finished graphical image. Accordingly, the user can visually and intuitively recognize the draft state and the finished state. Even if the meaning of the operation key (icon) is not well seen, the user can perform desired setting while referring to the graphical images indicating the draft state and the finished state, respectively. Especially in the Nin1 photocopy setting screen, the user can visually recognize the arrangement of the images in the sheet, which is difficult to represent by a verbal message.

Moreover, the above-described various types of set processing can be performed in an arbitrary order. The contents set by each set processing are reflected in the draft graphical image O and the finished graphical image P displayed in each setting screen of the display section 22 every time the contents are set. In other words, every time the draft setting or the sheet setting is changed, the draft graphical image O or the sheet graphical image P is set to update the draft graphical image O and the finished graphical image P. In consequence, the user can perform various settings while visually referring to the present set contents.

Next, there will be described set processing of the draft graphical image O and set processing of the finished graphical image P.

First, there will be described the set processing of the draft graphical image.

Figure 23:
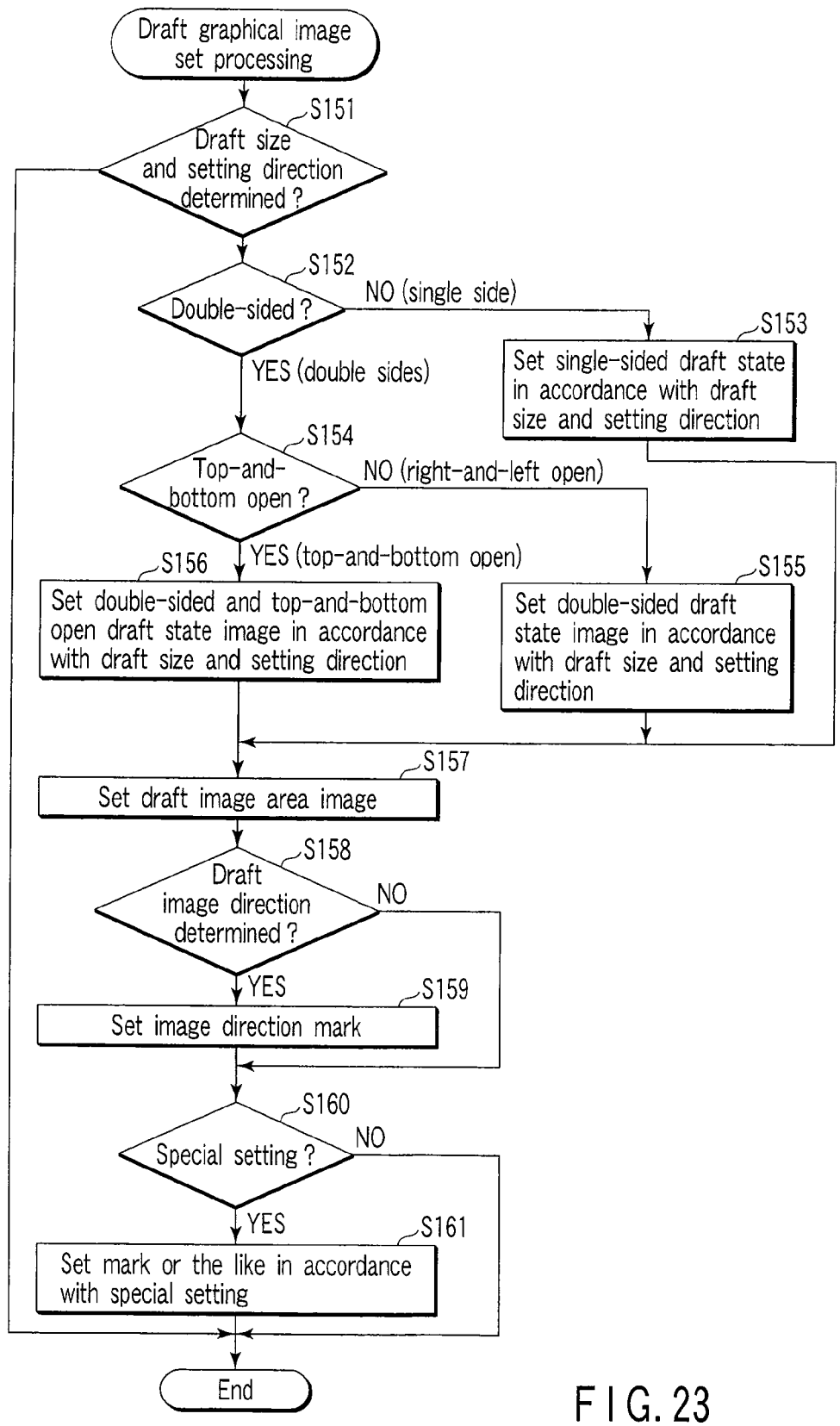
FIG. 23 is a flowchart showing a processing example of draft graphical image set processing.

FIG. 23 is a flowchart showing a processing example of the set processing of the draft graphical image O.

When the draft setting is changed by the various types of set processing as described above, the CPU 51 judges whether or not the draft size and the draft direction (setting direction) are determined (step S151). In a case where this judgment results in judgment that the draft size and the draft setting direction are not determined (step S151, NO), the CPU 51 assumes that the draft graphical image is displayed in the whiteout state (thinly displayed state) in the first display area 72a. For example, since the draft size and the draft setting direction are not determined in a standby state, as shown in the basic screen 70a of FIG. 4, the CPU 51 sets the draft graphical image O so that the draft state image Oa of the default setting is displayed in the whiteout state.

In a case where it is judged that the draft size and the draft setting direction are determined (step S151, YES), the CPU 51 sets the draft state image Oa (steps S151 to S155).

That is, in a case where it is judged that the draft size and the draft setting direction are determined (step S151, YES), the CPU 51 judges whether or not the draft is set to be double-sided (step S152). In a case where it is judged that the draft is not set to be double-sided, that is, it is judged that the draft is set to be single-sided (step S152, NO), the CPU 51 sets the single-sided graphical image as the draft state image Oa in accordance with the draft size and the setting direction (step S153).

Moreover, in a case where it is judged that the draft is set to be double-sided (step S152, YES), the CPU 51 judges whether the open direction of the double-sided draft is set to be right-and-left open or top-and-bottom open (step S154). When the open direction of the double-sided draft is set to be right-and-left open (step S154, NO (right-and-left open)), the CPU 51 sets a right-and-left open and double-sided graphical image as the draft state image Oa in accordance with the draft size and the setting direction (step S155). When the open direction of the double-sided draft is set to the top-and-bottom open direction (step S154, YES (top-and-bottom open)), the CPU 51 sets the top-and-bottom open and double-sided graphical image as the draft state image Oa in accordance with the draft size and setting direction (step S156).

Here, it is assumed that various graphical images settable (displayable) as the finished state image Pa are stored beforehand in a storage section such as the HDD 55, the nonvolatile memory 54 or the ROM 53. For example, a storage section such as the HDD 55, the nonvolatile memory 54 or the ROM 53 may store beforehand: single-sided graphical images having various sizes and directions; right-and-left open and double-sided graphical images having various sizes and directions; top-and-bottom open and double-sided graphical images having various sizes and directions and the like.

Therefore, in the step S153, the CPU 51 selects, from various single-sided graphical images, the single-sided graphical image having the size and direction matched with the draft size and setting direction. In the step S155, the CPU 51 selects, from various right-and-left open and double-sided graphical images, the right-and-left open and double-sided graphical image having the size and direction matched with the draft size and setting direction. In the step S156, the CPU 51 selects, from various top-and-bottom open and double-sided graphical images, the top-and-bottom open and double-sided graphical image having the size and direction matched with the draft size and setting direction.

Moreover, the CPU 51 may select, as the draft state image Oa, the graphical image having the size associated with a certain draft size (e.g., A3, A4, B4, . . . ). The CPU 51 may determine the size of the graphical image selected as the draft state image Oa based on a relative draft size (photocopy magnification) with respect to the sheet size. The CPU 51 may select the graphical image matched with the draft size, and rotate the selected graphical image in accordance with the draft setting direction to thereby set the image as the draft state image Oa.

On setting the draft state image Oa, the CPU 51 sets the draft image area image Ob (step S157). Here, it is assumed that the CPU 51 superimposes (synthesizes) the draft image area image Ob on the set draft state image Oa. A draft area which is valid as the image of the draft to be printed is usually a predetermined area of the whole draft. Therefore, the draft image area image Ob is set to the predetermined area with respect to the draft state image Oa.

Moreover, the draft image area image Ob may be synthesized with the draft state image Oa beforehand. In this case, a storage section such as the HDD 55, the nonvolatile memory 54 or the ROM 53 may store beforehand a graphical image in which the draft image area image Ob is synthesized with the draft state image Oa. In this case, it is assumed that the CPU 51 sets the graphical image from the graphical image in which the draft state image Oa is synthesized with the draft image area image Ob in accordance with the draft setting.

On setting the draft image area image Ob, the CPU 51 sets the draft image direction mark Oc indicating the direction of the image in the draft (steps S158, S159). That is, the CPU 51 judges whether or not the direction of the image in the draft (portrait or landscape is set (step S158). When this judgment results in judgment that the direction of the image in the draft is set, the CPU 51 sets the draft image area image Ob (step S159). Here, it is assumed that the CPU 51 superimposes (synthesizes) the image direction mark Oc in accordance with the set draft image direction on the draft image area image Ob.

Moreover, the draft image area image Ob and the image direction mark Oc may be synthesized beforehand. In this case, a storage section such as the HDD 55, the nonvolatile memory 54 or the ROM 53 may store beforehand various graphical images in which the draft image area images Ob are synthesized with the image direction marks Oc, respectively. In this case, the CPU 51 sets the graphical image in accordance with the draft setting (draft size, draft setting direction and image direction) from various graphical images in which the draft image area images Ob are synthesized with the image direction marks Oc.

The processing of the steps S151 to S159 sets the draft graphical image O in which the draft state image Oa, the draft image area image Ob and the image direction mark Oc are set. On setting such draft graphical image O, the CPU 51 judges whether or not there is set a function (hereinafter referred to as the special setting) of adding a mark to the draft graphical image O to be stapled or finished otherwise (step S160).

In a case where this judgment results in judgment that the special setting is set (step S160, YES), the CPU 51 sets the mark or the like in accordance with the set contents on the draft graphical image O (step S161). For example, when the staple is set, as shown in FIG. 18, the CPU 51 adds the staple region mark SR1 to a region corresponding to the set position to be stapled in the draft graphical image O.

The above-described processing sets the draft graphical image O in which the present set contents have been reflected every time the set contents are changed. In other words, every time the set contents of the photocopy processing are changed, the draft graphical image O set by such set processing is displayed in the first display area 72*a*, 105*a*, 136*a*, 147*a* or 157*a*.

Next, there will be described set processing of the finished graphical image P.

Figure 24:
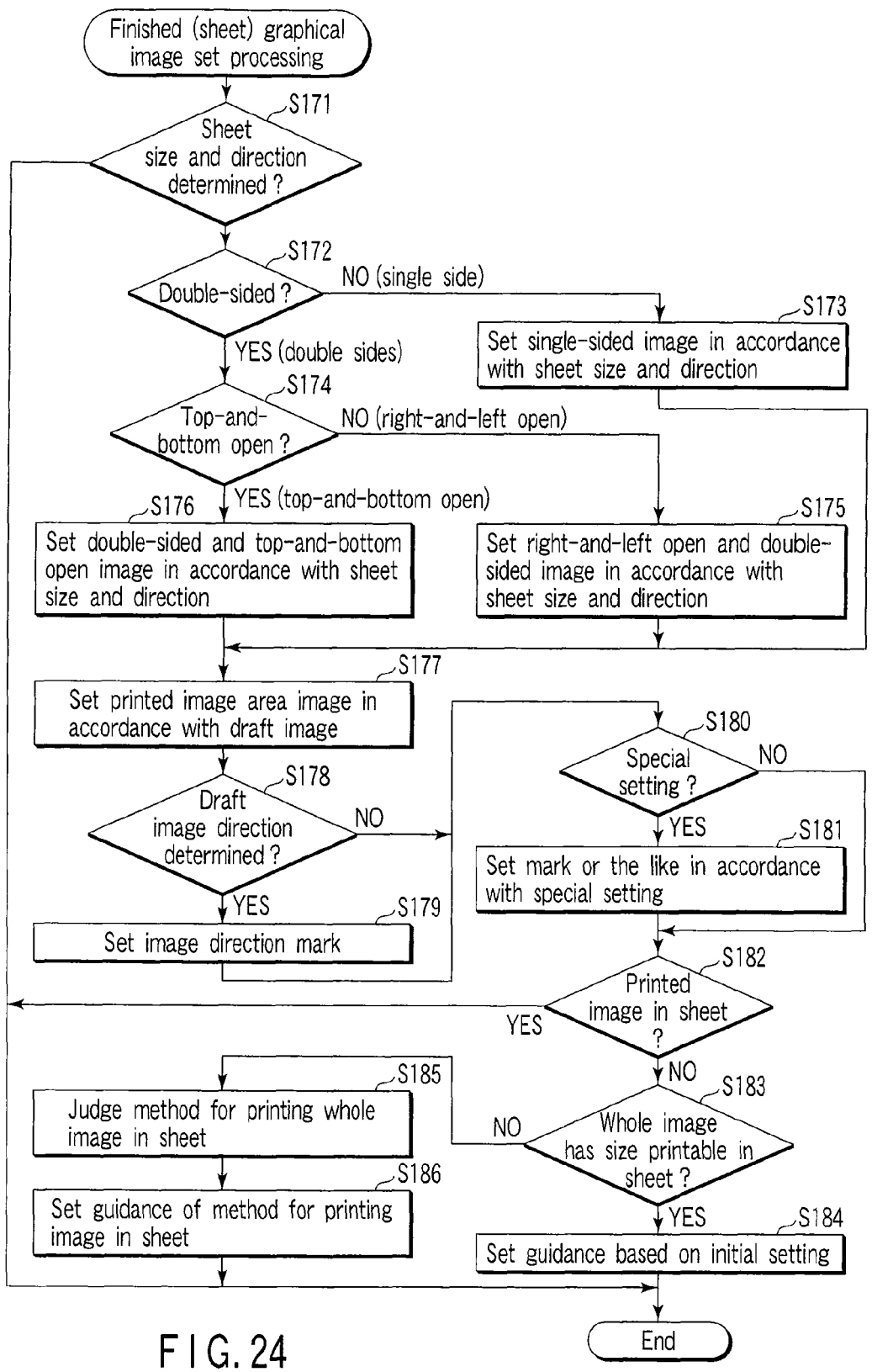
FIG. 24 is a flowchart showing a processing example of finished graphical image set processing.

FIG. 24 is a flowchart showing a processing example of the set processing of the finished graphical image P.

When the sheet setting is changed by the various types of set processing as described above, the CPU 51 judges whether or not the sheet size and the sheet direction are determined (step S171). In a case where this judgment results in judgment that the sheet size and the sheet setting direction are not determined (step S171, NO), the CPU 51 assumes that the finished graphical image is displayed in the whiteout state (thinly displayed state) in the second display area 72*b* in the same manner as in the draft graphical image. For example, since the sheet size and the sheet direction are not determined in a standby state as shown in the basic screen 70*a* of FIG. 4, the CPU 51 sets the finished graphical image P so that the only finished state image Pa of the default setting is displayed in the whiteout state.

In a case where it is judged that the sheet size and the sheet direction are determined (step S171, YES), the CPU 51 sets the finished state image Pa indicating a sheet state such as the sheet size, the sheet direction or the surface to be printed (single-sided or double-sided) (steps S171 to S175).

That is, in a case where it is judged that the sheet size and the sheet direction are determined (step S171, YES), the CPU 51 judges whether or not the sheet is set to be double-sided (step S172). In a case where it is judged that the sheet is not set to be double-sided, that is, it is judged that the sheet is set to be single-sided (step S172, NO), the CPU 51 sets the single-sided graphical image as the sheet state image Pa in accordance with the sheet size and the sheet direction (step S173).

Moreover, in a case where it is judged that the sheet is set to be double-sided (step S172, YES), the CPU 51 judges whether the open direction of the double-sided sheet is set to be right-and-left open or top-and-bottom open (step S174). When the open direction of the double-sided sheet is set to be right-and-left open (step S174, NO (right-and-left open)), the CPU 51 sets a right-and-left open and double-sided graphical image as the sheet state image Pa in accordance with the sheet size and the sheet direction (step S175). When the open direction of the double-sided sheet is set to the top-and-bottom open direction (step S174, YES (top-and-bottom open)), the CPU 51 sets the top-and-bottom open and double-sided graphical image as the sheet state image Pa in accordance with the sheet size and sheet direction (step S176).

Here, it is assumed that various graphical images settable (displayable) as the sheet state image Pa are stored beforehand in a storage section such as the HDD 55, the nonvolatile memory 54 or the ROM 53. For example, a storage section such as the HDD 55, the nonvolatile memory 54 or the ROM 53 may store beforehand: single-sided graphical images having various sizes and directions; right-and-left open and double-sided graphical images having various sizes and directions; top-and-bottom open and double-sided graphical images having various sizes and directions and the like.

Therefore, in the step S173, the CPU 51 selects, from various single-sided graphical images, the single-sided graphical image having the size matched with the sheet size and direction. In the step S175, the CPU 51 selects, from right-and-left open and double-sided graphical images having various sizes, the right-and-left open and double-sided graphical image having the size matched with the sheet size and direction. In the step S176, the CPU 51 selects, from top-and-bottom open and double-sided graphical images having various sizes, the top-and-bottom open and double-sided graphical image having the size matched with the sheet size and direction.

Moreover, the CPU 51 may select, as the sheet state image Pa, the graphical image having the size associated with a sheet size (e.g., A3, A4, B4, . . . ). The CPU 51 may determine the size of the graphical image selected as the sheet state image Pa based on a relative draft size (photocopy magnification) with respect to the draft size. The CPU 51 may select the graphical image matched with the sheet size, and rotate the selected graphical image in accordance with the sheet direction to thereby set the image as the sheet state image Pa.

On setting the sheet state image Pa, the CPU 51 sets the printed image area image Pb (step S177). It is assumed that in this step S177, the CPU 51 superimposes (synthesizes) the printed image area image Pb on the set sheet state image Pa. That is, the CPU 51 sets, as the printed image area image Pb, an image showing a printed image generated based on set contents such as the draft image and photocopy magnification. The CPU 51 superimposes the printed image area image on the sheet state image Pa in accordance with a position of the sheet to be printed. For example, in a case where a printing start position is the upper left of the sheet, the CPU 51 aligns an upper left position of the printed image area image with the upper left position of the sheet state image Pa which is a reference, and superimposes the printed image area image Pb on the sheet state image Pa.

On setting the printed image area image Pb, the CPU 51 sets the image direction mark Pc indicating the direction of the image to be printed on the sheet (steps S178, S179). That is, the CPU 51 judges whether or not the direction of the image to be printed on the sheet (portrait or landscape is set (step S178). When this judgment results in judgment that the direction of the image to be printed on the sheet is set (step S178, YES), the CPU 51 sets the printed image area image Pb (step S179). It is assumed that in this step S179, the CPU 51 superimposes (synthesizes), on the printed image area image Pb, the image direction mark Pc in accordance with the set direction of the image to be printed. That is, the CPU 51 superimposes the image direction mark Pc in a direction corresponding to the direction of the image to be printed on the basis of the central position of the printed image area image Pb.

Moreover, the printed image area image Pb may be synthesized beforehand with the image direction mark Pc. In this case, a storage section such as the HDD 55, the nonvolatile memory 54 or the ROM 53 may store beforehand various graphical images in which the printed image area images OP are synthesized with the image direction marks Pc, respectively. In this case, the CPU 51 sets the graphical image in accordance with the sheet setting (sheet size, sheet direction and image direction) from various graphical images in which the printed image area images Pb are synthesized with the image direction marks Pc.

The processing of the steps S171 to S179 sets the finished graphical image P in which the sheet state image Pa, the printed image area image Pb and the image direction mark Pc are set. On setting such finished graphical image, the CPU 51 judges whether or not there is set a function (hereinafter referred to as the special setting) of adding a mark such as the staple to the graphical image P stapled or finished otherwise (step S180).

In a case where this judgment results in judgment that the special setting is set (step S180, YES), the CPU 51 sets the mark or the like in accordance with the set contents on the finished graphical image P (step S181). For example, when the staple is set, as shown in FIG. 18, the CPU 51 adds the staple position mark SP to a position corresponding to the set position to be stapled in the finished graphical image P.

The above-described processing of the steps S171 to S181 sets the sheet graphical image P in which the present set contents have been reflected every time the set contents are changed. In other words, every time the set contents of the photocopy processing are changed, the sheet graphical image P set by such set processing is displayed in the second display area 72b, 105b, 136b, 147b or 157b.

Moreover, on setting the finished graphical image P as described above, the CPU 51 further judges whether or not the whole printed image (the image of the draft) falls in the sheet (step S182). This judges whether or not the printed image area image Pb protrudes from the sheet state image Pa.

In a case where this judgment results in judgment that the whole printed image does not fall in the sheet (step S182, NO), the CPU 51 judges whether or not the whole printed image has a size printable on the sheet (step S183). This is judged based on the draft size and direction as the draft setting and the sheet size and direction as the sheet setting. In the judgment, for example, when the draft image to be printed on the sheet is rotated, it is judged whether or not the whole printed image falls in the sheet (step S183).

In a case where the judgment results in judgment that the whole printed image has a size printable on the sheet (step S183, YES), the CPU 51 sets a message to be displayed in the guidance display section G based on initial setting (step S184).

Here, the nonvolatile memory 54 stores a plurality of types of messages that can be displayed in the guidance display section G. Among the messages stored in the nonvolatile memory 54, the message to be displayed in the guidance display section G is judged in accordance with the set contents. Furthermore, in a case where a plurality of types of messages are stored, in the nonvolatile memory 54, as messages which can be displayed on the same conditions (with the same set contents), the message to be displayed in the guidance display section G is determined based on the initial setting stored in the initial setting storage section 54a.

Here, it is assumed that a plurality of types of messages are stored, in the nonvolatile memory 54, as messages to be displayed in a case where the set contents indicate that the whole image to be printed has a size printable on the sheet but that a part of the image to be printed protrudes from the sheet (i.e., YES in the step S183). Examples of the message to be displayed in such case include: a message which urges the user to change the way to set the draft; and a message which urges the user to rotate the draft image and change the setting so that the image is printed on the sheet.

As the message which urges the user to change the way to set the draft, as shown in, for example, FIG. 10, the message has contents indicating "when the way to set the draft (vertically or horizontally) is changed, a printed finish region will change". As the message which urges the user to rotate the draft image and change the setting so that the image is printed on the sheet, the message has contents indicating, for example, "when the draft image is rotated, the printed finish region will change". In this case, it is to be noted that an icon for instructing the rotation of the image to be printed (the draft image) may be displayed together with the message.

Moreover, in a case where a plurality of types of messages are stored, in the nonvolatile memory 54, as the messages which can be displayed on the same conditions (with the same set contents), the message to be displayed (set) is determined based on the initial setting. It is assumed that this initial setting is set in accordance with an operation situation of the digital multifunction peripherals 1, user's idea or the like. It is assumed that the initial setting is stored in the initial setting storage section 54a of the nonvolatile memory 54.

For example, it is assumed that as the messages to be displayed in a case where the set contents indicate that the whole image to be printed has the size printable on the sheet but that a part of the image to be printed protrudes from the sheet (i.e., YES in the step S183), there are stored, in the nonvolatile memory 54, the message which urges the user to change the way to set the draft and the message which urges the user to rotate the draft image and change the setting so that the image is printed on the sheet. In this case, the message to be displayed is determined based on the initial setting stored in the initial setting storage section 54a.

Moreover, in the above-described example, when the digital multifunction peripherals performs a complicated setting during the photocopying in many cases, a preferable initial setting is a setting that the message be displayed which urges the user to change the way to set the draft. On the other hand, when the digital multifunction peripherals only performs simple photocopying in many cases, the preferable initial setting is a setting that the message be displayed which urges the user to rotate the draft image and change the setting for printing the image on the sheet. As described above, in the digital multifunction peripherals, it is possible to display the message in accordance with the operation situation of the digital multifunction peripherals or the user's idea.

Furthermore, when the above judgment results in judgment that the whole image to be printed does not have a printable size with respect to the sheet (step S183, NO), the CPU 51 judges a method for printing the whole image to be printed in the sheet (step S185). Accordingly, on judging the method for printing the whole image to be printed in the sheet, the CPU 51 sets a guidance of the judged method for printing the whole image to be printed in the sheet as the guidance to be displayed in the guidance display section G (step S186).

It is to be noted that in a case where it is judged as an operation configuration in the step S182 that the whole image to be printed does not fall in the sheet (step S182, NO), the CPU 51 may set a guidance indicating that the whole image to be printed does not fall in the sheet as the guidance to be displayed in the guidance display section G regardless of whether or not the whole image to be printed falls in the sheet in a case where the draft setting direction is changed. In this case, the CPU 51 may set, as the guidance to be displayed in the guidance display section G, a guidance indicating "when the way to set the draft (vertically/horizontally) is changed, the printed finish region will change" as shown in FIG. 10.

As described above, in the set processing of the finished graphical image, every time the set contents of the photocopy processing are changed, the sheet state image indicating the sheet state and the printed image area image indicating the image to be printed are set based on the set contents. The finished graphical image is set in which the sheet state image is superimposed on the printed image area image on the basis of the printing start position of the image to be printed with respect to the sheet. The finished graphical image set by the set processing of the finished graphical image as described above is displayed in the second display area of each type of setting screen.

In consequence, the user can visually, intuitively and simply recognize a state in which the image is printed on the sheet (finished sheet). As a result, a mistake in photocopy operation is not easily generated, and a photocopy result is not easily output which is different from user's intention.

Moreover, in a case where the set contents are contradictory or the set contents indicate that the whole draft image cannot be printed on the sheet, the guidance which urges the user to change the setting is displayed in the setting screen. In consequence, the photocopy processing can be prevented from being performed contrary to the user's intention.

Especially in a case where the set contents indicate that the whole image to be printed has the size printable on the sheet but that a part of the image to be printed protrudes from the sheet, there is displayed, as a guidance, a message which urges the user to change the way to set the draft or rotate the image. In consequence, the draft image can be prevented from being printed on the sheet in a deviating state contrary to the user's intention.

Assuming that the basic screen is regarded as a first layer of setting screen in the above-described embodiment, in the present digital multifunction peripherals, the first display area and the second display area are also disposed in a second layer of setting screen to be displayed in a case where the key displayed in the basic screen is touched, or a setting screen of or after a third layer to which the second layer of setting screen has shifted. That is, the draft graphical image and the finished graphical image are displayed in accordance with the present set contents in the first and second display areas of the setting screens of and after the second layer.

Consequently, even when a special setting is performed, the user can visually recognize the draft set state and the sheet (finish) set state during the setting operation. As a result, even if the special setting that is not usually used is performed, the user can easily perform the setting.

For example, even in screens of settings such as a binding margin setting, a border erase setting, a booklet center joint elimination setting, a continuous page photocopy setting, a magazine sorting (bookbinding mode) setting, a mirror image setting, a negative/positive reverse setting, an independent scaling setting, a date and time addition setting and a page addition setting, there may be displayed a draft graphical image and a finished graphical image in which the present set contents are reflected in real time in response to user's operation. Therefore, the user can intuitively, easily and securely set various functions, even if the functions are not usually used well.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
a scanner which reads an image of a draft;
a printer which prints the image on an image forming medium;
a display unit which displays a draft graphical image in a first display area and a finished graphical image in a second display area;
a display control unit which displays in an arrangement order pop-up window associated with the second display area, an arrangement order setting screen which sets an order of arrangement of a plurality of the draft images, if the plurality of draft images read by the scanner are printed on one side of the image forming medium, and displays in a draft direction pop-up window associated with the first display area, a draft direction setting screen which sets a direction of the image on the draft, if the direction of the image on the draft is indicated;
an operation unit which inputs a designation of whether the plurality of draft images are to be arranged from right to left or from left to right, when the arrangement order setting screen is displayed by the display control unit;
a draft graphical image setting unit which sets the draft graphical image displayed in the first display area, on which a synthesized image indicating the set direction of the image on the draft is arranged; and;
a finished graphical image setting unit which sets the finished graphical image displayed in the second display area, on which the plurality of the draft images are arranged in one of the right to left direction or the left to right direction, as designated, on one side of the image forming medium.

2. The image forming apparatus according to claim 1, wherein the display control unit displays the draft graphical image in a predetermined first display area of a display screen of the display unit, and displays the finished graphical image in a predetermined second display area associated with the first display area of the display screen of the display unit.

3. The image forming apparatus according to claim 1, wherein the finished graphical image setting unit sets each of the plurality of draft images to be arranged in a matrix form on the one side of the image forming medium.

4. The image forming apparatus according to claim 1, wherein the draft graphical image setting unit sets the draft graphical image to indicate that a draft is printed on both sides.

5. The image forming apparatus according to claim 1, wherein the finished graphical image setting unit sets, in a case where both sides of the image forming medium are to be printed, the finished graphical image to indicate that the plurality of draft images are to be arranged in a matrix form on both sides of the image forming medium.

6. The image forming apparatus according to claim 1, wherein the finished graphical image setting unit sets the finished graphical image to indicate that the plurality of draft images are to be arranged on both sides of the image forming medium, and further sets the finished graphical image to indicate a finish open direction.

7. The image forming apparatus according to claim 1, wherein the finished graphical image setting unit sets the finished graphical image to indicate an image arrangement order of each of the draft images that are to be arranged on the image forming medium.

8. An image forming apparatus having: a scanner which reads an image of a draft; a printer which prints the image on an image forming medium; and a display unit which displays a draft graphical image in a first display area and a finished graphical image in a second display area, the apparatus comprising:
- a display control means which displays in an arrangement order pop-up window associated with the second display area, an arrangement order setting screen which sets an order of arrangement of a plurality of the draft images, if the plurality of draft images read by the scanner are printed on one side of the image forming medium, and displays in a draft direction pop-up window associated with the first display area, a draft direction setting screen which sets a direction of the image on the draft, if the direction of the image on the draft is indicated;
- an operation unit which inputs a designation of whether the plurality of draft images are arranged from right to left or from left to right, when the arrangement order setting screen is displayed by the display control means,
- draft graphical image setting means for setting the draft graphical image displayed in the first display area, on which a synthesized image indicating the set direction of the image on the draft is arranged; and;
- finished graphical image setting means for setting the finished graphical image displayed in the second display area, on which the plurality of the draft images are arranged in one of the right to left direction or the left to right direction, as designated, on one side of the image forming medium.

9. The image forming apparatus according to claim 8, wherein the display control means displays the draft graphical image in a predetermined first display area of a display screen of the display unit, and displays the finished graphical image in a predetermined second display area associated with the first display area of the display screen of the display unit.

10. The image forming apparatus according to claim 8, wherein the finished graphical image setting means sets each of the plurality of draft images to be arranged in a matrix form on the one side of the image forming medium.

11. The image forming apparatus according to claim 8, wherein the draft graphical image setting means sets the draft graphical image to indicate that a draft is printed on both sides.

12. The image forming apparatus according to claim 8, wherein the finished graphical image setting means sets, in a case where both sides of the image forming medium are to be printed, the finished graphical image to indicate that the plurality of draft images are to be arranged in a matrix form on both sides of the image forming medium.

13. The image forming apparatus according to claim 8, wherein the finished graphical image setting means sets the finished graphical image to indicate that the plurality of draft images are to be arranged on both sides of the image forming medium, and further sets the finished graphical image to indicate a finish open direction.

14. The image forming apparatus according to claim 8, wherein the finished graphical image setting means sets the finished graphical image to indicate an image arrangement order of each of the draft images that are to be arranged on the image forming medium.

15. A method of setting an image forming apparatus having: a scanner which reads an image of a draft; a printer which prints the image on an image forming medium; a display unit which displays a draft graphical image in a first display area and a finished graphical image in a second display area; and an operation unit which inputs a designation of whether a plurality of draft images are arranged from right to left or from left to right, when the arrangement order setting screen is displayed by the display unit, the method comprising:
- providing in an arrangement order pop-up window associated with the second display area, an arrangement order setting screen which sets an order of arrangement of a plurality of the draft images, if the plurality of draft images read by the scanner are printed on one side of the image forming medium;
- providing in a draft direction pop-up window associated with the first display area, a draft direction setting screen which sets a direction of the image on the draft, if the direction of the image on the draft is indicated;
- setting the draft graphical image displayed in the first display area, on which a synthesized image indicating the set direction of the image on the draft is arranged; and;
- setting the finished graphical image displayed in the second display area, on which the plurality of the draft images are arranged in one of the right to left direction or the left to right direction, as designated, on one side of the image forming medium.

16. The method of setting the image forming apparatus according to claim 15, wherein the draft graphical image is displayed in a predetermined first display area of a display screen of the display unit; and the finished graphical image is displayed in a predetermined second display area of the display screen of the display unit.

17. The method of setting the image forming apparatus according to claim 15, wherein the finished graphical image is set to indicate each of the plurality of draft images to be arranged in a matrix form on the one side of the image forming medium.

18. The method of setting the image forming apparatus according to claim 15, wherein the draft graphical image is set to indicate that a draft is printed on both sides.

19. The method of setting the image forming apparatus according to claim 15, wherein the finished graphical image is set to indicate, in a case where both sides of the image forming medium are to be printed, that the plurality of draft images are to be arranged in a matrix form on both sides of the image forming medium.

20. The method of setting the image forming apparatus according to claim 15, wherein the finished graphical image is set to indicate that the plurality of draft images are to be arranged on both sides of the image forming medium, and to indicate a finish open direction.

21. The method of setting the image forming apparatus according to claim 15, wherein the finished graphical image is set to indicate an image arrangement order of each of the draft images that are to be arranged on the image forming medium.

* * * * *